US007416281B2

(12) United States Patent
Nishimura et al.

(10) Patent No.: US 7,416,281 B2
(45) Date of Patent: Aug. 26, 2008

(54) ELECTROSTATIC ACTUATOR FORMED BY A SEMICONDUCTOR MANUFACTURING PROCESS

(75) Inventors: Manabu Nishimura, Hyogo (JP); Takahiko Kuroda, Hyogo (JP); Shuya Abe, Hyogo (JP); Makoto Tanaka, Kanagawa (JP); Mitsugu Irinoda, Miyagi (JP); Kenichiroh Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 500 days.

(21) Appl. No.: 10/521,055

(22) PCT Filed: Aug. 5, 2003

(86) PCT No.: PCT/JP03/09929

§ 371 (c)(1),
(2), (4) Date: Jan. 12, 2005

(87) PCT Pub. No.: WO2004/012942

PCT Pub. Date: Feb. 12, 2004

(65) Prior Publication Data

US 2005/0264617 A1 Dec. 1, 2005

(30) Foreign Application Priority Data

| | | |
|---|---|---|
| Aug. 6, 2002 | (JP) | 2002-228117 |
| Sep. 9, 2002 | (JP) | 2002-262345 |
| Sep. 10, 2002 | (JP) | 2002-264243 |
| Sep. 12, 2002 | (JP) | 2002-266332 |
| Sep. 17, 2002 | (JP) | 2002-270139 |
| Nov. 26, 2002 | (JP) | 2002-341752 |

(51) Int. Cl.
*B41J 2/04* (2006.01)
*H02N 1/00* (2006.01)
*G02B 26/00* (2006.01)

(52) U.S. Cl. .......................... 347/54; 310/309; 359/290

(58) Field of Classification Search .................... 347/54
See application file for complete search history.

(56) References Cited

U.S. PATENT DOCUMENTS 6,127,198 A * 10/2000 Coleman et al. .............. 438/21

(Continued)

FOREIGN PATENT DOCUMENTS

JP 5-229118 9/1993

(Continued)

OTHER PUBLICATIONS

Jul. 2, 2007 European Search Report in connection with corresponding European patent Application No. 03 76 6746.
Aug. 23, 2007 Japanese official action in connection with corresponding Japanese application No. 2002-262345.
Jan. 18, 2008 Japanese official action in connection with corresponding Japanese patent application No. 2002-228117.

(Continued)

*Primary Examiner*—Matthew Luu
*Assistant Examiner*—Shelby Fidler
(74) *Attorney, Agent, or Firm*—Cooper & Dunham, LLP

(57) ABSTRACT

An electrostatic actuator has high-reliability and less variation in characteristics. An electrode (12*a*) is formed on a substrate (1), and a plurality of partition parts (50*a*) are formed on the electrode. A vibration plate (19) is formed on the partition parts (50*a*), and is deformable by an electrostatic force generated by a voltage applied to the electrode (12*a*) so that an air gap (14*a*) is formed between the partition parts (50*a*) by etching a part of a sacrifice layer (14) formed between the electrode (12*a*) and the vibration plate (19). The partition parts (50*a*) are formed of remaining parts of the sacrifice layer (14) after the etching.

27 Claims, 41 Drawing Sheets

U.S. PATENT DOCUMENTS

| | | | | |
|---|---|---|---|---|
| 6,406,133 | B1 * | 6/2002 | Abe | 347/55 |
| 6,425,656 | B1 * | 7/2002 | Koeda | 347/54 |
| 6,508,539 | B2 * | 1/2003 | Tanaka | 347/54 |
| 6,572,218 | B2 * | 6/2003 | Gulvin et al. | 347/54 |
| 6,657,759 | B2 * | 12/2003 | Muller | 359/198 |
| 6,709,089 | B2 * | 3/2004 | Koeda | 347/54 |
| 7,185,972 | B2 * | 3/2007 | Tanikawa et al. | 216/27 |
| 2002/0054422 | A1 * | 5/2002 | Carr et al. | 359/291 |
| 2003/0107794 | A1 * | 6/2003 | Siekkinen et al. | 359/291 |

FOREIGN PATENT DOCUMENTS

| | | |
|---|---|---|
| JP | 6-71882 | 3/1994 |
| JP | 9-193375 | 7/1997 |
| JP | 10-291322 | 11/1998 |
| JP | 11-34319 | 2/1999 |
| JP | 11-291485 | 10/1999 |
| JP | 11-314363 | 11/1999 |
| JP | 2000-246895 | 9/2000 |
| JP | 2001-18383 | 1/2001 |
| JP | 2001-47624 | 2/2001 |
| JP | 2001-277505 | 10/2001 |
| JP | 2001-293863 | 10/2001 |
| JP | 2001-301173 | 10/2001 |
| JP | 2001-353889 | 12/2001 |
| JP | 2002-46284 | 2/2002 |
| JP | 2002-79669 | 3/2002 |
| JP | 2002-86718 | 3/2002 |
| JP | 2002-191180 | 7/2002 |
| JP | 2002-240302 | 8/2002 |
| WO | WO98/42513 | 10/1998 |
| WO | WO99/34979 | 7/1999 |

OTHER PUBLICATIONS

Jan. 29, 2008 Japanese official action in connection with corresponding Japanese patent application No. 2002-270139.

* cited by examiner

ELECTROSTATIC ACTUATOR FORMED BY A SEMICONDUCTOR MANUFACTURING PROCESS

TECHNICAL FIELD

The present invention relates to electrostatic actuators and, more particularly, to an electrostatic actuator used for a liquid-discharging mechanism such as an inkjet head of an inkjet recording apparatus.

BACKGROUND ART

An inkjet recording apparatus is used as an image recording apparatus or an image forming apparatus such as a printer, a facsimile machine, a copy machine, etc. An inkjet recording apparatus is equipped with an inkjet head as a droplet-discharging head. Generally, such an inkjet head comprises: a single or a plurality of nozzles for discharging droplets of ink; a discharge chamber connecting with the nozzles; and pressure generating means for generating a pressure to pressurize the ink in the discharge chamber. The discharge chamber may be referred to as a pressurizing chamber, an ink chamber, a liquid chamber, a pressurizing liquid chamber, a pressure chamber or an ink passage. Droplets of ink are discharged from the nozzles by pressurizing the ink in the discharge chamber using a pressure generated by the pressure generating means.

Generally, a piezoelectric type, a thermal type and an electrostatic type are used for the inkjet head as a droplet discharge head. The piezoelectric inkjet head discharges droplets of ink by deforming a vibration plate (a diaphragm) that forms a wall of the discharge chamber by using an electromechanical transducer such as a piezoelectric element as the pressure generating means. The thermal inkjet head discharges droplets of ink by film boiling using an electrothermal transducer such as a heat-generating resistor provided in the discharge chamber. The electrostatic inkjet head discharges droplets of ink by deforming a vibration plate that forms a wall of the discharge chamber by an electrostatic force.

In recent years, the thermal type and the electrostatic type, which do not use parts containing lead, have attracted attention from the viewpoint of environmental issues. Especially, several electrostatic inkjet heads have been suggested from the viewpoint of low power consumption in addition to the lead-free feature.

Japanese Laid-Open Patent Application No. 6-71882 discloses an electrostatic inkjet head provided with a pair of electrodes with an air gap formed therebetween. One of the two electrodes serves as a vibration plate, and an ink chamber to be filled with ink is formed on a side of the vibration plate opposite to the electrode facing the vibration plate. An electrostatic attraction force is generated between the pair of electrodes by applying a voltage across the electrodes (between the vibration plate and electrode), which results in deformation of the electrode (vibration plate). The vibration plate returns to the original position due to an elastic force when the voltage is canceled, and a droplet of ink is discharged due to the return force of the vibration plate.

Additionally, Japanese Laid-Open Patent Application No. 2001-18383 and WO99/34979 disclose a structure of an inkjet head in which a small air gap is formed between the vibration plate and the electrode by etching a sacrifice layer, and a liquid chamber substrate is joined thereon.

Further, Japanese Laid-Open Patent Application No. 11-314363 discloses an inkjet head which can be driven at a low voltage by forming a vibration plate of a cantilever beam or a straddle mounted beam with a gap into which ink can flow, and filling a high dielectric-constant ink in the gap.

Additionally, Japanese Laid-Open Patent Application No. 9-193375 discloses an inkjet head having a vibration plate and an electrode that are positioned nonparallel to each other.

Further, Japanese Laid-Open Patent Application No. 2001-277565 discloses an inkjet head, which attempts a low-voltage drive by varying a thickness of a dielectric insulating layer formed on the electrode so as to generate a nonparallel electric field.

In the electrostatic inkjet head containing the electrostatic actuator equipped with the vibration plate and the electrode facing the vibration plate, it is necessary to make the air gap between the electrodes very small so as to achieve a low-voltage drive.

However, in the head disclosed in the above-mentioned Japanese Laid-Open Patent Application No. 6-71882, since the air gap is formed by formation of a cavity by etching and bonding a vibration plate substrate by anode junction, it is very difficult to accurately form such a small air gap with little variation, which causes a problem that the yield rate is low.

Thus, in the head disclosed in the above-mentioned Japanese Laid-Open Patent Application No. 2001-18383, although the air gap is formed with sufficient accuracy in accordance with a gap-forming method using etching of the sacrifice layer, there is a problem in that a reliability of the vibration plate is low since etching holes for etching the sacrifice layer are formed in the vibration plate. Additionally, since the approach of sealing the etching holes by an insulating layer after etching the sacrifice layer is used, the insulating layer for sealing the etching holes must be thick. Thus, there is a problem in that the rigidity of the vibration plate increases and a drive voltage increases, which causes a fluctuation in the rigidity of the vibration plate. Further, there is unevenness in the surface of the actuator substrate due to the formation of the air gap, and high alignment accuracy is required when joining a liquid chamber substrate. Moreover, since the junction area is small, it tends to cause a work mistake such as destruction due to a contact at the time of joining etc., and there is also a problem that a reliability is decreased and the yield rate is decreased.

Moreover, in the head disclosed in the above-mentioned Japanese Laid-Open Patent Application, No. 11-314363, although the air gap is formed by etching the sacrifice layer, the vibration plate has a structure of a cantilever beam or a straddle mounted beam and the air gap is communicated with the liquid chamber. In this case, since there is no need of forming the etching holes for etching the sacrifice layer and ink is allowed to enter the air gap, it is possible to achieve a low-voltage drive by using a high dielectric-constant ink which reduces an effective air gap. However, a problem tends to occur that an ink component is subjected to condensation since a voltage is applied to the ink in the gap, and there is a problem in that a high-speed drive cannot be performed due to the conductance of the ink in the gap.

Moreover, the above-mentioned Japanese Laid-Open Patent Application No. 9-193375 and Japanese Laid-Open Patent Application No. 2001-277505 do not disclose any method of forming a nonparallel air gap or any specific method for varying the thickness of the dielectric insulating layer, and, thus, a problem that it is very difficult to form a small air gap with little variation is not solved.

In the electrostatic inkjet head, the dimensional accuracy of a distance between the vibration plate and the electrode greatly affects the performance of the electrostatic inkjet head. Especially, in the case of an inkjet head, if the variation in the characteristic of each actuator is large, accuracy in printing and reproducibility of image quality goes down remarkably. Moreover, in order to attain a low-voltage operation, the size of the air gap must be 0.2 μm to 2.0 μm, which requires higher dimensional accuracy.

Japanese Laid-Open Patent Application No. 2001-18383 and WO99/34979 disclose a head constituted by forming a small air gap between the vibration plate and the electrode by applying a sacrifice layer process (etching the sacrifice layer) and joining a flow passage substrate thereon. According to this approach, the size of the air gap is determined by variation in a process of forming the sacrifice layer, and, thus, variation in the size can be suppressed, thereby obtaining an actuator or a head having high accuracy and high reliability.

Moreover, when the air gap is formed using the sacrifice layer process as mentioned above, it is necessary to seal the through holes for removing the sacrifice layer (sacrifice layer removal holes). Thus, WO99/34979 disclose that the sacrifice layer removal holes are closed by a Ni film or $SiO_2$ film formed by a PVD or CVD method after the sacrifice layer is removed. However, if the sacrifice layer removal holes are sealed by such a film deposition method, the components of the film may enter the air gap. Additionally, the sacrifice layer removal holes also serve to maintain a strength of the partition wall, and they cannot be made small. Therefore, the sacrifice layer removal holes being sealed by the film deposition using a PVD or CVD method may influence the operation characteristic and reliability of the actuator and it cannot deal with densification.

Moreover, in the head disclosed in Japanese Laid-Open Patent Application No. 2001-18383, there is formed a step in the partition parts and the vibration plate, which requires high accuracy in joining the flow passage substrate. Moreover, since the thin vibration plate is floated on the surrounding parts after the sacrifice layer is removed, the vibration plate may be damaged in the subsequent process and it is difficult to manufacture the actuator with a sufficient yield rate.

Additionally, although the sacrifice layer removal holes are sealed by a film formed by a film deposition method using a vacuum device, the use of the vacuum device may cause a problem. If the film deposition is performed by the vacuum device, the film deposition process is performed in a vacuum environment and the air gap between the vibration plate and the electrode is sealed in vacuum. Therefore, there is a problem in that the vibration plate may be bent due to a negative pressure inside the air gap when the actuator is exposed to an atmosphere. Additionally, if there is variation in the bent of the vibration plate, there may occur variation in the displacement of the vibration plate. In addition, since the vacuum seal cannot provide a damping effect of a gas sealed in the air gap, variation in amplitude of vibration with respect to variation in the thickness of the vibration plate becomes large.

In order to solve such a problem, it is necessary to provide a structure or a process for opening the air to the atmosphere, which causes an increase in the cost and deterioration in the yield rate. Thus, if the conventional sacrifice layer process is used, it is difficult to obtain an electrostatic actuator having high-accuracy and reliability at a low cost.

In the meantime, in an inkjet recording apparatus, in order to achieve high-definition recording of a color image at high speed, high-density processing using a micro-machining technology is used to obtain a high-quality image. Thus, materials of parts constituting the head are shifted from metal or plastic to silicon, glass or ceramics. Especially, silicon is used as a material, which is suitable for the micro-processing.

Moreover, in respect of colorization, developments of ink and recording media are a main streams, and developments have been progressed with respect to components and compositions of ink so as to optimize absorbability, coloring characteristic and color-mixture prevention characteristic or improve a long-term storage of printed media and storage stability of ink itself.

In such a case, depending on a combination of ink and a material of component parts of the head, the component parts may be dissolved in the ink. Especially, if a flow passage formation member is formed of silicon, silicon is eluted in ink and is deposited on a nozzle part, which causes degradation of image quality due to nozzle clogging or deterioration of coloring of ink. Moreover, in the head using a vibration plate formed of a thin silicon film, if the silicon forming the vibration plate is eluted in ink, the vibration characteristic may be changed or the vibration plate cannot vibrates.

If the material of the component parts is changed to solve the problem, it is difficult to realize high-density processing or processing accuracy may be deteriorated in many cases. Moreover, the change in the material requires a large change in the fabrication process or assembly process, which results in decrease of nozzle density and consequently causing degradation of the print quality.

On the other hand, if the problem is solved by adjustment of components of ink, a high-quality image may be deteriorated since the components and composition of ink are originally adjusted so that permeability and coloring characteristics with respect to recording medium are optimized so as to improve the printing quality and storage stability is improved.

Thus, in the conventional inkjet head, a thin film having an ink resistance is formed on a surface of a flow passage forming member that is brought into contact with ink. For example, forming titanium, titanium compound, or aluminum oxide on the surface which contacts with ink is disclosed in WO98/42513. Forming an oxide film on the surface which contact with ink is disclosed in Japanese Laid-Open Patent Application No. 5-229118. Forming a thin film such as oxide, nitride or metal having an ink resistance on a surface of a silicon oxide film is disclosed in Japanese Laid-Open Patent Application No. 10-291322. Forming an organic resin film on a surface of the ink chamber formed of a piezoelectric material is disclosed in Japanese Laid-Open Patent Application No. 2000-246895.

In the above-mentioned head, an organic resin film such as paraxylene may be formed as a corrosion resistant film on sidewalls of an ink chamber having a complex three-dimensional configuration and the vibration plate. Since the organic resin film such as paraxylene is formed by the vacuum vapor deposition method, the covering characteristic of the film is not good due to its nature of deposition, and a large unevenness arises in the distribution of film thickness inside the liquid chamber or on the vibration plate.

When an area where the film thickness is small contacts with ink for a long time, there is a large problem arises in the long-time reliability since the corrosion resistant film is dissolved and finally the base material is subjected to corrosion. Moreover, a large bend is generated due to a distribution of internal stresses caused by variation of film thickness of the organic resin film on the vibration plate, which causes a large variation in the ink injection characteristic.

Moreover, in the head in which a metallic ink resistant film is formed on the vibration plate by a sputtering method or a vapor deposition method, the covering characteristic of the corrosion resistant film is poor similar to the above-mentioned organic resin film. Depending on the location, an area in which the corrosion resistant film is formed with a very small thickness, and when ink contacts such an area for long time, the corrosion resistant film is dissolved and finally the base material is subjected to corrosion. Therefore, a long-time reliability cannot be obtained, and further a large bent is generated in the vibration plate due to fluctuation in the thickness of the metallic ink-resistant film, which causes variation in the ink injection characteristic.

Especially, this problem is serious in the electrostatic head rather than the piezoelectric head since the distance between the vibration plate and the electrode varies due to the vibration plate being bent and the drive voltage differing from the design value.

Further, in the head in which the above-mentioned corrosion resistant film is formed, the reliability of operation is low such that the vibration plate contacts the electrode due to an influence of an external environment such as humidity since the air gap between the vibration plate and the electrode is not sealed.

Moreover, in the head in which the air gap between the vibration plate and the electrode is sealed so as not to receive an influence from an external environment, there is a restriction of pH value of ink that is usable since the corrosion resistant film is not formed on the vibration plate, and, thus, matching with ink must be maintained and a cost is increased.

DISCLOSURE OF THE INVENTION

It is a general object of the present invention to provide an improved and useful electrostatic actuator and apparatuses using the electrostatic actuator in which the above-mentioned problems are eliminated.

A more specific object of the present invention is to provide an electrostatic actuator having less variation in characteristics and having a high-reliability and various apparatuses using such an electrostatic actuator.

Another object of the present invention is to provide an electrostatic actuator which can be driven at a low voltage and various apparatuses using such an electrostatic actuator.

Still another object of the present invention is to provide an electrostatic actuator and apparatuses using such an electrostatic actuator which can provide a stable liquid discharge characteristic and a sufficient long-time reliability by preventing component parts from being corroded and preventing an influence of an external environment.

In order to achieve the above-mentioned objects, there is provided according to one aspect of the present invention an electrostatic actuator comprising: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

According to the above-mentioned invention, since the air gap between the vibration plate and the electrode is formed by etching the sacrifice layer, the distance between the vibration layer and the electrode can be accurately set to the thickness of the sacrifice layer. Additionally, the partition parts defining the air gap between the vibration plate and the electrode are formed by the remaining parts of the sacrifice layer after forming the air gap by etching, an upper surface of the vibration plate can be made flat. Thus, the electrostatic actuator according to the present invention is formed by a semiconductor manufacturing process, which results in a stable performance with less variation in characteristics.

In the electrostatic actuator according to the present invention, the substrate is preferably a silicon substrate.

The electrostatic actuator according to the present invention may further comprise dummy electrodes at positions corresponding to the partition parts, the dummy electrodes being electrically separated from the electrode by separation grooves.

In the electrostatic actuator according to the present invention, the sacrifice layer is preferably formed of a material selected from a group consisting of polysilicon, amorphous silicon, silicon oxide, aluminum, titanium nitride and polymer. Additionally, the electrode is preferably formed of a material selected from a group consisting of polysilicon, aluminum, titanium, titanium nitride, titanium silicide, tungsten, tungsten silicide, molybdenum, molybdenum silicide and ITO.

In the electrostatic actuator according to the present invention, an insulating layer may be formed on the electrode, and the separation grooves are filled with the insulating layer. A thickness of the insulating layer preferably equal to or greater than one half of a width of each of the separation grooves.

In the electrostatic actuator according to the present invention, the sacrifice layer may be divided by separation grooves, and an insulating layer may be formed on the sacrifice layer so that the separation grooves are filled with the insulating layer. A thickness of the insulating layer preferably is equal to or greater than one half of a width of each of the separation grooves.

In the electrostatic actuator according to the present invention, the sacrifice layer is preferably formed of a conductive material, and the remaining parts of the sacrifice layer may be electrically connected to one of the substrate, the electrode and the vibration plate so that the remaining parts are at the same potential with the one of the substrate, the electrode and the vibration plate. Additionally, the sacrifice layer is preferably formed of a conductive material, and at least one of the remaining parts of the sacrifice layer and the dummy electrodes may serve as a part of electric wiring.

The electrostatic actuator according to the present invention may further comprise insulating layers on the electrode and a surface of the vibration plate facing the electrode, wherein the sacrificing layer may be formed of one of polysilicon and amorphous silicon, and the insulating layers may be formed of silicon oxide.

In the electrostatic actuator according to the present invention, the sacrificing layer is formed of silicon oxide and the electrode may be formed of polysilicon.

In the electrostatic actuator according to the present invention, a through hole may be formed in the vibration plate for removing by etching the parts of the sacrifice layer through the through hole so as to form the air gap.

In the electrostatic actuator according to the present invention, the through hole may be located near the partition parts. The vibration plate may have substantially a rectangular shape, and a shorter side of the vibration plate may be substantially equal to or less than 150 μm. A distance of the air gap measured in a direction perpendicular to a surface of the electrode facing the vibration plate may be substantially 0.2 μm to 2.0 μm.

Additionally, in the electrostatic actuator according to the present invention, a plurality of the through holes may be arranged along a longer side of the vibration plate at an interval equal to or less than a length of the shorter side of the vibration plate.

The electrostatic actuator according to the present invention may further comprise: a through hole formed in the vibration plate for removing the parts of the sacrifice layer through the through hole so as to form the air gap; and a resin film formed on a surface opposite to a surface facing the electrode, wherein the through hole are sealed by a joining surface of the resin film. A cross-sectional area of each of the through holes may be substantially equal to or greater than 0.19 $\mu m^2$ and equal to or less than 10 $\mu m^2$. A thickness of an insulator layer in a periphery of an opening of the through hole may be substantially equal to or greater than 0.1 μm. The air gap between the electrode and the vibration plate may be substantially equal to or greater than 0.1 μm. The resin film may have a corrosion resistance with respect to a substance to be brought into contact with the vibration plate. The resin film may be formed of one of a polybenzaoxazole film and a polyimide film.

The electrostatic actuator according to the present invention may further comprise a member joined to an upper surface of the vibration plate, wherein the through holes are sealed by a joining surface of the member.

The electrostatic actuator according to the present may further comprise an insulating layer formed on a surface of the vibration plate facing the electrode, wherein a thickness of the insulating layer near a center between the partition parts adjacent to each other is larger than a thickness of the insulating layer near the partition parts.

The electrostatic actuator according to the present invention may further comprise an insulating layer formed on the electrode, wherein a thickness of the insulating layer near a center between the partition parts adjacent to each other is larger than a thickness of the insulating layer near the partition parts.

In the electrostatic actuator according to the present invention, a cavity may be formed between the electrode and the substrate, and the electrode may have a connection through hole connecting the cavity to the air gap.

The electrostatic actuator according to the present invention may further comprise insulating layers on both sides of the electrode, wherein a total thickness of the electrode and the insulating layers exceeds a thickness of the vibration plate.

Additionally, there is provided according to another aspect of the present invention a method for manufacturing an electrostatic actuator comprising the steps of: forming an electrode on a substrate; forming a sacrifice layer on the electrode; forming a vibration plate on the sacrifice layer, the vibration plated being deformable by an electrostatic force generated by a voltage applied to the electrode; and forming an air gap between the electrode and the vibration plate by removing a part of the sacrifice layer by etching so that remaining parts of the sacrifice layer after the etching form partition parts that define the air gap.

According to the above-mentioned invention, since the air gap between the vibration plate and the electrode is formed by etching the sacrifice layer, the distance between the vibration layer and the electrode can be accurately set to the thickness of the sacrifice layer. Additionally, the partition parts defining the air gap between the vibration plate and the electrode are formed by the remaining parts of the sacrifice layer after forming the air gap by etching, an upper surface of the vibration plate can be made flat. Thus, the electrostatic actuator according to the present invention is formed by a semiconductor manufacturing process, which results in a stable performance with less variation in characteristics.

In the method of an electrostatic actuator according to the present invention, the air gap forming step preferably includes etching the part of the sacrifice layer after forming the electrode and the vibration plate.

Additionally, the method of an electrostatic actuator according to the present invention may further comprise a step of forming an insulating layer on the electrode before forming the sacrificing layer, wherein the air gap forming step includes etching the insulating layer so that a thickness of the insulating layer near a center between the partition parts adjacent to each other is larger than a thickness of the insulating layer near the partition parts.

The method of an electrostatic actuator according to the present invention may further comprise a step of forming an insulating layer on a surface of the vibration plate facing the electrode after forming the sacrificing layer, wherein the air gap forming step includes etching the insulating layer so that a thickness of the insulating layer near a center between the partition parts adjacent to each other is larger than a thickness of the insulating layer near the partition parts.

The method of an electrostatic actuator according to the present invention may further comprise: a step of forming an insulating layer on the electrode; and a step of forming an insulating layer on a surface of the vibration plate facing the electrode, wherein the etching of the sacrifice layer is performed by one of a plasma-etching method using sulfur hexafluoride ($SF_6$) or xenon difluoride ($XeF_2$) and a wet-etching method using tetra-methyl-ammonium-hydroxide (TMAH).

The method for manufacturing an electrostatic actuator according to the present invention may further comprise the steps of: forming a through hole in the vibration plate for removing the part of the sacrifice layer; and forming a resin film on the vibration plate so as to seal the through hole.

In the method for manufacturing an electrostatic actuator according to the present invention, the vibration plate forming step may include a step of forming the vibration plate in a rectangular shape having a shorter side substantially equal to or smaller than 150 μm. The vibration plate forming step may include a step of forming a bend-preventing film that prevents the vibration plate from being bent. Additionally, the resin film forming step may include a step of changing a surface condition of the vibration plate by exposing a surface of the vibration plate, on which the resin film is formed, to a fluorine compound gas including sulfur hexafluoride ($SF_6$) and xenon difluoride ($XeF_2$). Further, the resin film forming step may include a step of changing a surface condition of the vibration plate by exposing to plasma a surface of the vibration plate on which the resin film is formed. The resin film forming step may include forming the resin film by a material having a corrosion resistance with respect to a liquid to be brought into contact with the vibration plate. The resin film forming step may include forming the resin film by a spin-coating method.

The method for manufacturing an electrostatic actuator according to the present invention may further comprise the steps of: forming a plurality of through holes in the vibration plate for removing the part of the sacrifice layer; and joining a sealing member to the surface of the vibration plate so as to seal the through holes.

Additionally, there is provided according to another aspect of the present invention a droplet discharging head comprising: a nozzle for discharging a droplet of a liquid; a liquid pressurizing chamber connecting with the nozzle and storing the liquid; and an electrostatic actuator for pressurizing the liquid stored in the liquid pressurizing chamber, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

In the droplet discharging head according to the present invention, a plurality of through holes may be formed in the vibration plate for removing by etching the parts of the sacrifice layer through the through holes so as to form the air gap, and a flow passage forming member forming the liquid pressurizing chamber may seal the through holes of the vibration plate. The through holes may be formed near the partition parts.

Further, there is provided according to another aspect of the present invention a liquid supply cartridge comprising: a droplet discharging head for discharging droplets of a liquid; and a liquid tank integrated with the droplet discharging head for supplying the liquid to the droplet discharging head, wherein the droplet discharging head comprises: a nozzle for discharging the droplets of the liquid; a liquid pressurizing chamber connecting with the nozzle and storing the liquid; and an electrostatic actuator for pressurizing the liquid stored in the liquid pressurizing chamber, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

Additionally, there is provided according to another aspect of the present invention an inkjet recording apparatus comprising: an inkjet head for discharging droplets of ink; and an ink tank integrated with the inkjet head for supplying the ink to the inkjet head, wherein the inkjet head comprises: a nozzle for discharging droplets of the ink; a liquid pressurizing chamber connecting with the nozzle and storing the ink; and an electrostatic actuator for pressurizing the ink stored in the liquid pressurizing chamber, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

Additionally, there is provided according to another aspect of the present invention a liquid jet apparatus comprising: a droplet discharge head for discharging droplets of a liquid; and a liquid tank integrated with the droplet discharging head for supplying the liquid to the droplet discharging head, wherein the droplet discharging head comprises: a nozzle for discharging the droplets of the liquid; a liquid pressurizing chamber connecting with the nozzle and storing the liquid; and an electrostatic actuator for pressurizing the liquid stored in the liquid pressurizing chamber, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

Additionally, there is provided according to another aspect of the present invention a micro pump comprising: a flow passage through which a liquid flows: an electrostatic actuator for deforming the flow passage so that the liquid flows in the flow passage, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching.

Additionally, there is provided according to another aspect of the present invention an optical device comprising: a mirror reflecting a light; and an electrostatic actuator for deforming the mirror, wherein the electrostatic actuator comprises: a substrate; an electrode formed on the substrate; a plurality of partition parts formed on the electrode; a vibration plate formed on the partition parts, the vibration plate being deformable by an electrostatic force generated by a voltage applied to the electrode; and an air gap formed between the plurality of partition parts by etching a part of a sacrifice layer formed between the electrode and the vibration plate, wherein the partition parts comprise remaining parts of the sacrifice layer after the etching, and the mirror is formed on the vibration plate so that the mirror is deformable by deformation of the vibration plate.

Other objects, features and advantages of the present invention will become more apparent from the following detailed description when read in conjunction with the accompanying drawings.

BEST MODE FOR CARRYING OUT THE INVENTION

First Embodiment

Figure 1A:
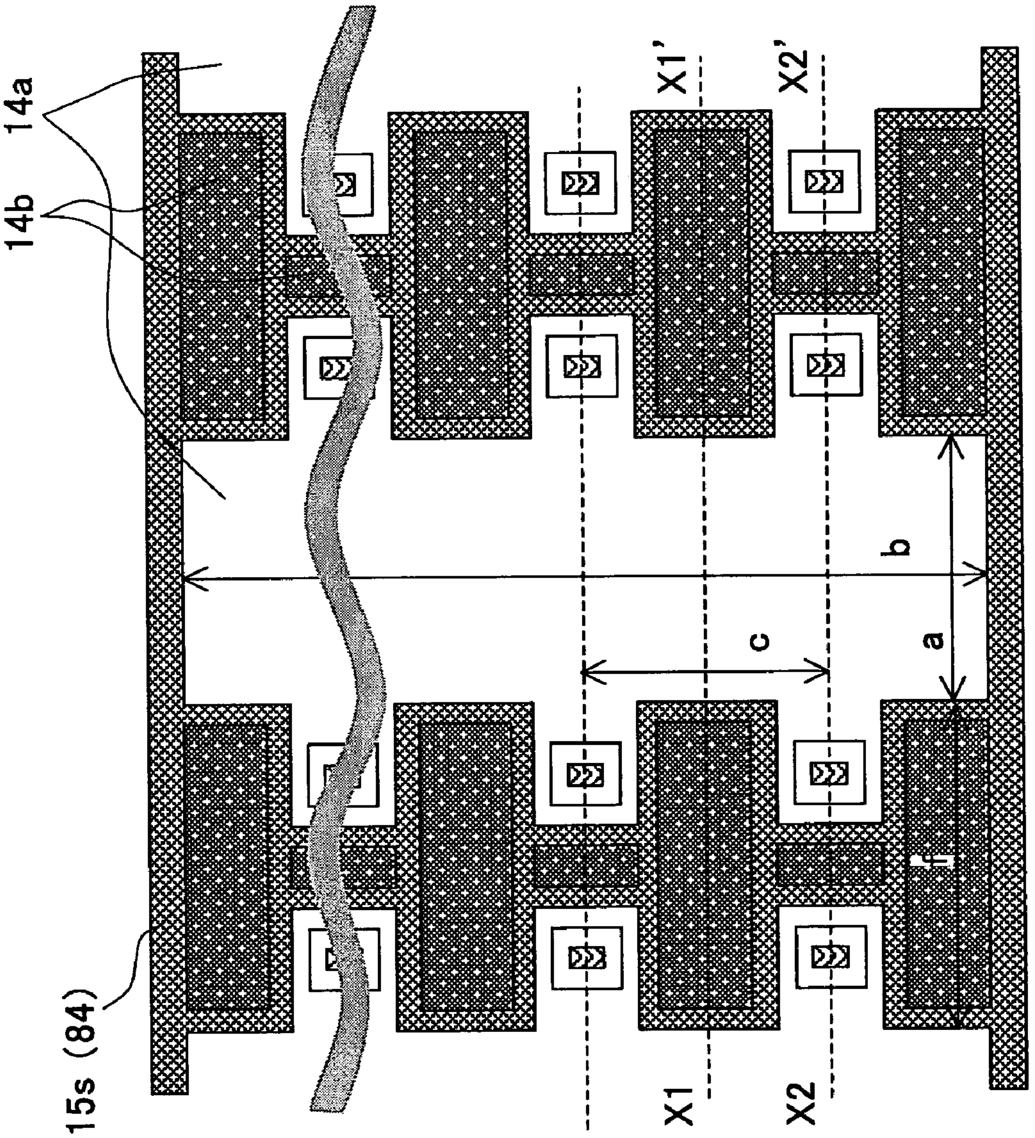
FIG. 1A is a plan view of an electrostatic actuator according to a first embodiment of the present invention.
Figure 1B:
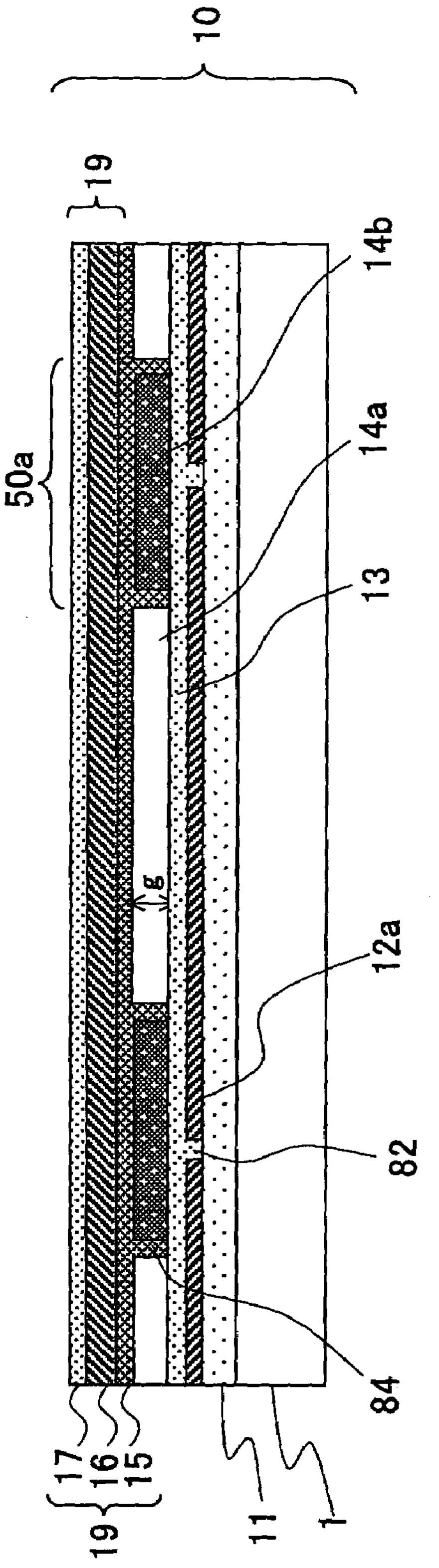
FIGS. 1B and 1C are cross-sectional views of the electrostatic actuator according to the first embodiment of the present invention.
Figure 1C:
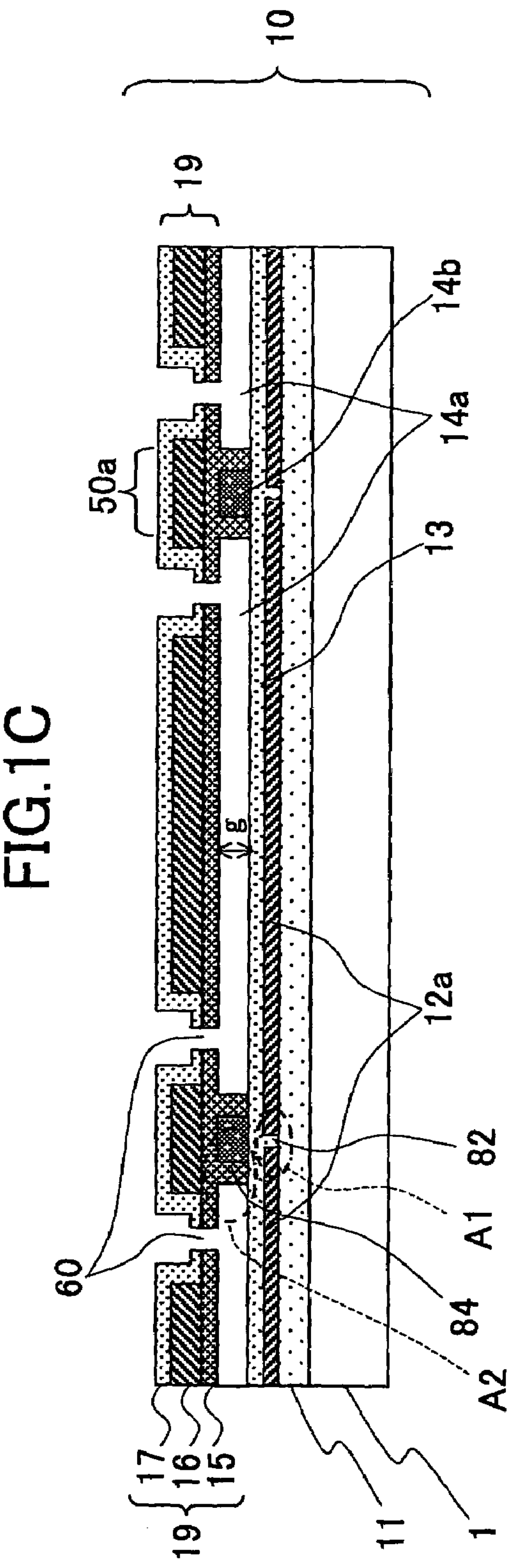

A description will now be given, with reference to FIGS. 1A, 1B and 1C and FIGS. 2A, 2B and 2C, of a first embodiment of the present invention. FIG. 1A is a plan view of the electrostatic actuator according to a first embodiment of the present invention. FIGS. 1B and 1C show cross-sectional views (two parallel cross sections) taken along a line X1-X1' and a line X2-X2' in FIG. 1A, respectively.

In the figures, 1 denotes a substrate which forms an actuator; 11 an insulating layer; 12*a* an electrode (may be referred to as individual electrode); 14 a sacrifice layer; 15 an insulating layer (may be referred to as a vibration plate side insulating layer); 16 a vibration plate electrode layer; and 17 an insulating layer which also serves as a stress-adjustment of a vibration plate. Additionally, 19 denotes a vibration plate constituted by the insulating layer 15, the vibration plate electrode layer 16 and the insulating layer 17. Further, 14*a* denotes an air gap formed by removing a part of the sacrifice layer; "g" a distance of the air gap; 60 a sacrifice layer removing hole (through hole); 50*a* a partition part; 14*b* a remaining sacrifice layer which remains in the partition part 50*a;* and 10 an actuator forming part in which the actuator is formed.

The actuator forming part 10 of the first embodiment comprises: the substrate 1 which forms the actuator; the electrodes 12*a* formed on the substrate 1; the partition parts 50*a* formed on the electrodes 12*a;* the vibration plate 19 which is formed on the partition parts 50*a* and is deformable by an electrostatic force generated by a voltage applied to the electrodes 12*a;* and the air gap 14*a* formed between adjacent partition parts 50*a.* The air gap 14*a* is formed by removing by etching parts of the sacrifice layer 14 formed between the electrodes 12*a* and the electrodes 16 of the vibration plate 19. It is noted that other parts of the sacrifice layer 14, which are not removed by etching, remain in the partition parts 50*a.*

The actuator forming member 10 is formed by repeating a film deposition and film processing (photolithography and etching) so as to form electrodes and insulation layers on a substrate having a high degree of cleanness. A high-temperature process may be used to form the actuator forming member 10 by using silicon to make the substrate 1. It should be noted that the high-temperature process refers to a process for forming a high-quality film such as a thermal oxidizing method or a thermal nitriding method, a thermal CVD method which forms a high-temperature oxide film (HTO) or an LP-CVD method which forms a good-quality nitride film. By adopting the high-temperature process, high-quality electrode materials and insulating materials become usable, which can provide an actuator device having excellent conductivity and insulation. Moreover, the high-temperature process is excellent in controllability and reproducibility of a film thickness, thereby providing an actuator device having little variation in the electric properties. Further, since the controllability and reproducibility are excellent, process design becomes easy and a mass production at low cost can be achieved.

In FIGS. 1B and 1C, the electrode layer 12 is formed on the insulating layer 11 which is formed on the substrate 1, and is divided into each channel (each drive bit) by separation grooves 82. As shown by a part A1 encircled by a dotted line in FIG. 1C, the separation grooves 82 are filled by the insulating layer 13 formed on the electrode layer 12. Thus, by dividing the electrode layer 12 by separation grooves 82 and covering the electrode layer 12 by the insulating layer 13 so as to fill the separation grooves 82 by the insulating layer 13, it becomes possible to form a flat surface having little step or unevenness in a subsequent process. As a result, an actuator having high-accuracy in dimensions and little variation in electric properties can be obtained.

Figure 2B:
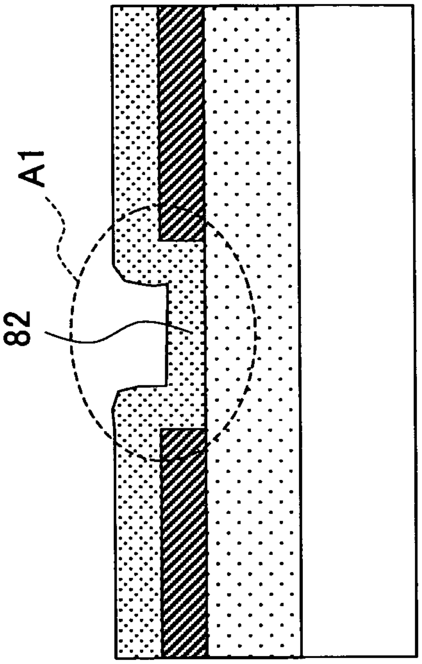
FIGS. 2A, 2B and 2C are cross-sectional views for explaining an appropriate width of separation grooves that is filled by an insulating layer.
Figure 2A:
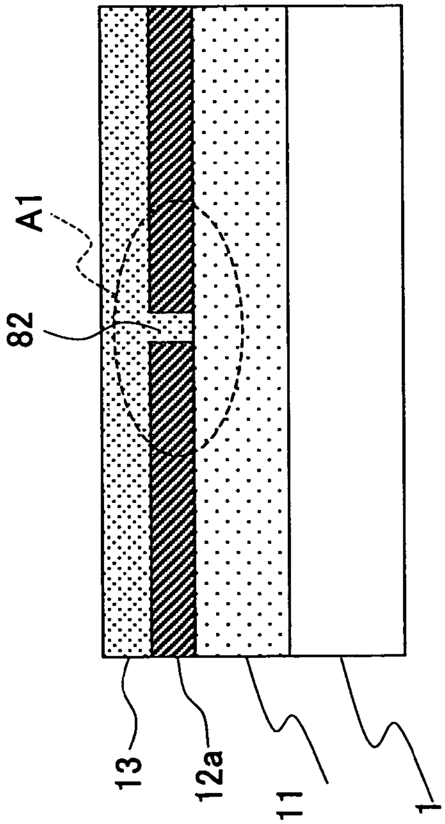
Figure 2C:
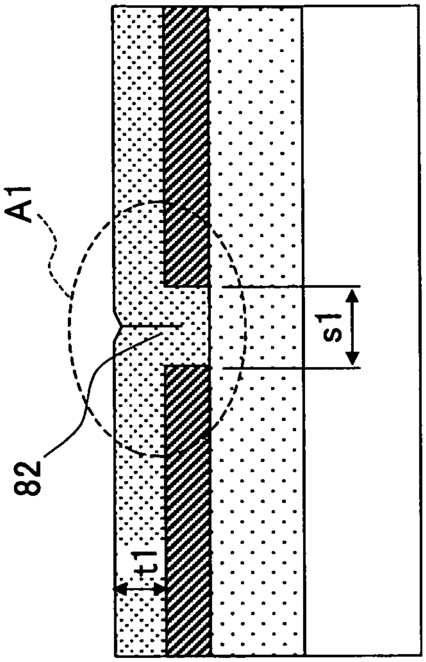

FIGS. 2A, 2B and 2C are cross-sectional views for explaining an appropriate width of the above-mentioned separation groove that is filled by the insulating layer. FIG. 2A is an enlarged cross-sectional view of the part A1 of FIG. 1C.

Important factors to fill the insulating layer in the separation groove are a film deposition method, which can form a conformal insulating layer, and a relationship between the width of the separation groove and the thickness of the insulating layer. FIGS. 2B and 2C show a state of the insulating layer for variation in the relationship between the width of the separation groove and the thickness of the insulating layer. In this case, a thermal CVD (Thermal-Chemical-Vapor-Deposition) method is effective as a film deposition method for the insulating layer, and the HTO film is a typical insulating layer formed by the thermal CVD method. As for the thickness t1 of the insulating layer, it is preferable to set the thickness t1 equal to or greater than ½ of the width s1 of the separation groove so as to form the surface of the insulating layer substantially flat. As for the width s1 of the separation grooves 82, it is preferable to set the width s1 equal to or smaller than twice the thickness t1 of the insulating layer. According to the above-mentioned relationship, the separation grooves 82 can be completely filled by the insulating layer, which results in a substantially flat surface of the insulating layer as shown in FIG. 2C. Thus, since a surface level difference can be mostly eliminated by forming the insulating layer with a thickness equal to or greater than ½ of the width of the separation groove of the electrode layer, subsequent processes explained below, such as an air gap forming process, a resin film forming process or a joining process with other members, can be easily performed. As a result, an actuator having an air gap with an accurate distance thereof can be obtained, and, at the same time, it can be attempted to reduce a cost and improve reliability.

Here, as a material of the electrode layer 12 for forming the electrodes 12*a*, a compound silicide such as polysilicon, titanium silicide, tungsten silicide or molybdenum silicide or a metal compound such as titanium nitride may be preferably used. Since these materials can be deposited and processed with a stable quality and can be made into a structure which withstands a high-temperature process, there is less restriction with respect to temperatures in other processes. For example, a HTO (High-Temperature-Oxide) film or the like can be laminated on the electrode layer 12 as the insulating layer 13, the HTO film being an insulating layer having high reliability. Thus, the selection range can be enlarged, and cost reduction and improvement of reliability can be attempted. Additionally, a material such as aluminum, titanium, tungsten, molybdenum or ITO can also be used. By using these materials, a remarkable resistance reduction can be attempted, which results in reduction in a drive voltage. Additionally, since deposition and processing of films made of these materials can be easily achieved with a stable quality, cost reduction and improvement of reliability can be attempted.

In FIGS. 1B and IC, although the air gap 14*a* is formed by removing by etching parts of the sacrifice layer 14, other parts of the sacrifice layer 14, which parts are indicated by 14*b* and embedded in the partition parts 50*a* in FIG. 1B, remain without being removed in the present invention. Since a distance g of the air gap 14*a* is accurately defined by the thickness of the sacrifice layer 14 by forming the air gap 14*a* by the removal of the parts of the sacrifice layer 14, variation in the distance "g" of the air gap 14*a* is extremely small, thereby achieving an accurate actuator having little variation in characteristics. Here, the distance "g" of the air gap 14*a* corresponds to a size of an air space between the vibration plate 19 and the electrode 12*a*. Additionally, since foreign matters are prevented from entering the air gap, it can be produced at a stable yield and a reliable actuator can be obtained. Further, since the sacrifice layers 14*b* remain in the partition parts 50*a* and the vibration plate 19 is firmly fixed by the partition parts 50*a,* the accuracy of the distance "g" of the air gap 14*a* can be well-maintained and the actuator is excellent in structural durability. Moreover, since the sacrifice layer 14*b* remain in each partition part 50*a,* there is little step or unevenness on the surface of the vibration plate 19, which results in substantially flat surface being formed on the actuator forming member 10. Thus, a formation of a resin film as mentioned later or a process for joining the actuator to other members can be easily performed, which results in cost reduction and improvement of reliability.

Here, as a material of the sacrifice layer 14, it is preferable to use polysilicon or amorphous silicon. These materials can be very easily removed by etching, and it is preferable to use an isotropic dry etching method using $SF_6$ gas, a dray etching method using $XeF_2$ gas or a wet etching method using a solution of tetra methyl ammonium hydroxide (TMAH). Additionally, since polysilicon and amorphous silicon are generally-used, inexpensive materials and withstand a high temperature, a degree of freedom of a process in a subsequent process is also high. Further, since variation in the distance "g" of the air gap 14*a,* which is very important, can be extremely small by arranging silicon oxide films (insulating layers 13 and 15) having a high etching resistance above and below the sacrifice layer, an accurate actuator having little variation in properties can be obtained. Moreover, mass production is also easy at low cost.

As for a material of the sacrifice layer 14, titanium nitride, aluminum, silicone oxide or polymer material such as a resin film may be used. Additionally, from among resin films, a photosensitive resin material (a resist material) is preferably used since such a material can be easily processed. Although an etchant (etching material) and the air gap forming process depend on the material forming the sacrifice 14 and process difficulty and process cost thereof may also vary depending on the material of the sacrifice layer 14, the material of the sacrifice layer 14 can be selected based on its purpose.

When a silicone oxide film is used for the sacrifice layer 14, it is preferable to use polysilicon as a protective film (etching stopper) of the etching of the sacrifice layer. The polysilicon film may be commonly used for the electrode layer 12 and the vibration plate electrode layer. In order to remove the oxide film forming the sacrifice layer 14, it is preferable to use a wet etching method, a HF vapor method, a chemical dry etching method, etc. If an insulating layer is needed inside the air gap 14*a,* the insulating layer may be formed by oxidizing a surface of the polysilicon film remaining as an etching stopper. Thus, if a silicon oxide film is used as the sacrifice layer 14, the removal of the sacrifice layer 14 can be performed by using etching materials used in semiconductor manufacturing processes. Additionally, if polysilicon films are formed on both sides of the sacrifice layer 14, a manufacturing process with little variation can be achieved. Further, the polysilicon film can be uses as an electrode as it is, which enables mass production at a low cost. Moreover, the thus-obtained actuator also provides high quality and accuracy.

Moreover, similar process can be achieved by various combinations of the material of the sacrifice layer 14 and the etchant. For example, the sacrifice layer 14 may be removed by $O_2$ plasma or an exfoliation liquid when a polymer material is used for the sacrifice layer 14. The sacrifice layer 14 may be removed by a liquid such as KOH when aluminum is used for the sacrifice layer 14. The sacrifice layer 14 may be removed by chemicals such as a mixture solution of $NH_3OH$ and $H_2O_2$ when titanium nitride is used for the sacrifice layer 14.

In FIGS. 1B and 1C, the vibration plate 19 is constituted by a laminated film having the insulating layer 15, the vibration plate electrode layer 16 which serves as a common electrode and the insulating layer 17 which also serves as stress adjustment of the vibration plate, stacked in turn. It should be noted that the insulating layer 15 serves as a protective film (etching stopper) of etching the sacrifice layer, and contributes also as a protective film for leaving the sacrifice layer 14*b* of the partition parts 50*a*. As shown by a part A2 encircled by a dotted line shown in FIG. 1C, the insulating layer 15 on the wall surfaces of the sacrifice layer 14*b* corresponds to a material that has been filled in separation grooves 84 formed in the sacrifice layer 14. In the example of FIGS. 1B and 1C, although the separation grooves 84 of the sacrifice layer 14 are filled by only the insulating layer 15, the separation grooves 84 may be filled by other structural layers of the vibration plate such as the electrode layer and the insulating layer 17 in addition to the insulating layer 15. Steps or unevenness formed on the surface of the insulating layer 15 can be made small by filling the insulating layer 15 in the separation grooves 84 which divide the sacrifice layer 14. Moreover, the sacrifice layer 14*b* can remain in the partition parts due to existence of the insulating layer 15 filled in the separation grooves 84. The effect of small steps or unevenness is as mentioned above. Moreover, since the filled insulating layer 15 is securely fixed to the wall surfaces of the sacrifice layer 14*b,* which results in the vibration plate 19 being firmly fixed by the partition parts 50*a,* an accuracy of the distance "g" of the air gap 14*a* of the thus-obtained actuator is high and also excellent in structural durability.

Additionally, similar to the case of filling the insulating layer 13 in the separation grooves 82 of the electrode layer 12, it is preferable to form the insulating layer 15 with a thickness equal to or less than ½ of the width of the separation grooves 84 of the sacrifice layer 14 in the case where the insulating layer 15 is filled in the separation grooves 84 of the sacrifice layer 14. However, it is also possible to fill an entire vibration plate layer (lamination of the insulating layer 15, the vibration plate electrode layer 16 and the insulating layer 17) in the separation grooves 84. Therefore, normally, the width of the separation grooves 84 of the sacrifice layer 14 can be larger than the width of the separation grooves 82 of the electrode layer 12. As mentioned above, a level difference (step or unevenness) of the surface of the actuator forming member can be almost eliminated, and the effect of such is the same as that explained before.

As a material of the vibration plate electrode layer 16 which constitutes a part of the vibration plate 19, materials such as polysilicon, titanium silicide, tungsten silicide, molybdenum silicide, titanium nitride, aluminum, titanium, tungsten, molybdenum may be used for the same reason as the material of the electrode layer 12. Additionally, a transparent film such as an ITO film, a nesa film or a ZnO film can also be used. When the transparent film is used, the inspection inside the air gap 14*a* can be easily performed. Thus, an abnormality can be detected during a manufacturing process, which contributes to an attempt of cost reduction and improvement of reliability.

As mentioned above, the surface of the actuator forming member 10 (the surface of the vibration plate 19) can be substantially flat due to filling of the insulating layer 13 in the separation grooves 82 of the electrode layer 12, filing of the insulating layer 15 in the separation grooves 84 of the sacrifice layer 14, the sacrifice layer 14*b* being remained in the partition parts 50*a,* and etching of the sacrifice layer 14 through the sacrifice layer removing holes 60 formed in the vibration plate 19. Since the surface of the actuator is flattened, a resin film forming process can be performed, as mentioned later, for the purpose of acquiring an environment resistance (measures for high humidity) by sealing the sacrifice layer removing holes 60 and also acquiring a corrosion resistance of the vibration plate 19. Moreover, when it is necessary to join a separate member to the actuator device, such a joining process can be easily performed.

As mentioned above, the electrostatic actuator according to the present embodiment has little variation in properties and has high reliability. Additionally, the electrostatic actuator according to the present embodiment can be manufactured by mass production at a low cost.

Second Embodiment

A description will now be given, with reference to FIGS. 3A and 3B, FIG. 4 and FIGS. 5A and 5B, of a second embodiment of the present invention. In FIGS. 3A and 3B, FIG. 4 and FIGS. 5A and 5B, parts that are the same as the parts shown in FIGS. 1B and 1C are given the same reference numerals.

In the figures, 1 denotes a substrate which forms an actuator; 11 an insulating layer; 12*a* an electrode (may be referred to as individual electrode); 12*b* a dummy electrode; 14 a sacrifice layer; 15 an insulating layer (may be referred to as a vibration plate side insulating layer); 16 a vibration plate electrode layer; and 17 an insulating layer which also serves as a stress-adjustment of a vibration plate. Additionally, 19 denotes a vibration plate constituted by the insulating layer 15, the vibration plate electrode layer 16 and the insulating layer 17. Further, 14*a* denotes an air gap formed by removing a part of the sacrifice layer; "g" a distance of the air gap; 60 a sacrifice layer removing hole (through hole); 50*a* a partition part; 14*b* a remaining sacrifice layer which remains in the partition part 50*a;* and 10 an actuator forming part in which the actuator is formed.

Figure 3A:
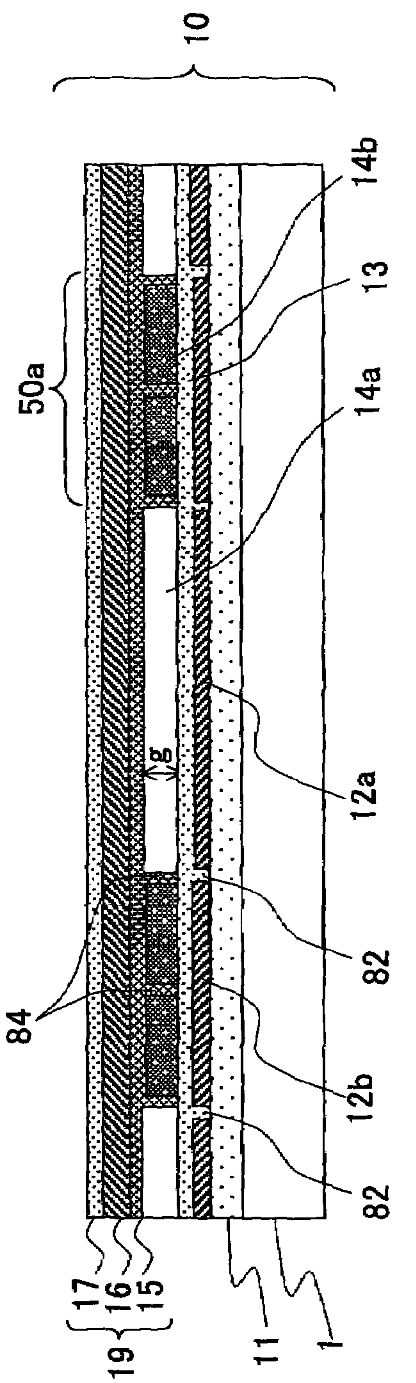
FIGS. 3A and 3B are cross-sectional views of an electrostatic actuator according to a second embodiment of the present invention.
Figure 3B:
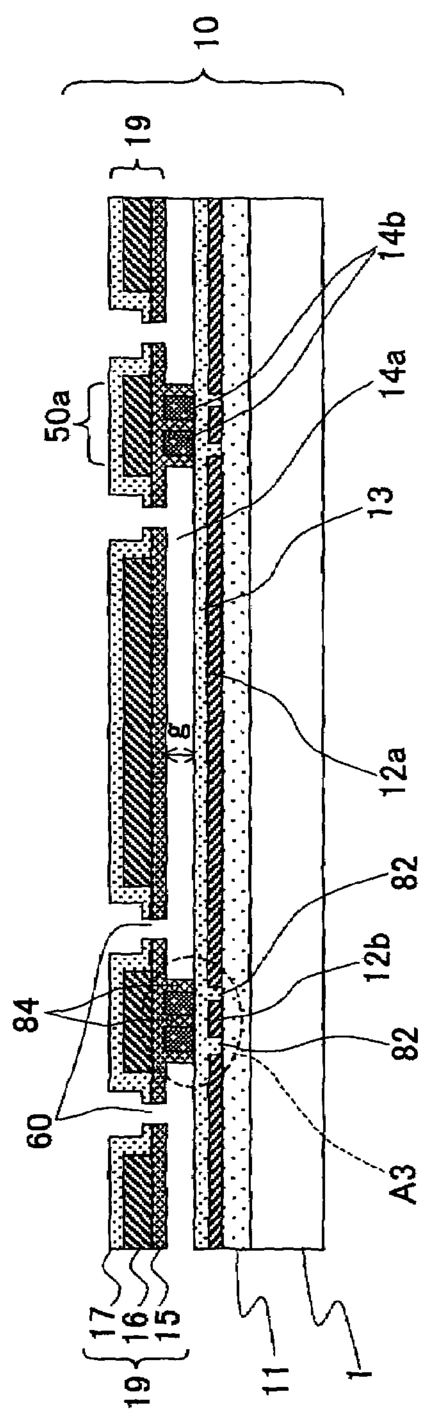

FIGS. 3A and FIG. 3B show cross-sectional views (two parallel cross sections) of parts of the actuator where the sacrifice layer removing holes 60 are provided and not provided, respectively.

The actuator forming part 10 of the second embodiment comprises: the substrate 1 which forms the actuator; the electrode layer 12 (electrodes 12*a* and dummy electrodes 12*b*) formed on the substrate 1; the partition parts 50*a* formed on the electrodes layer 12; the vibration plate 19 which is formed on the partition parts 50*a* and is deformable by an electrostatic force generated by a voltage applied to the electrodes 12*a;* and the air gap 14*a* formed between adjacent partition parts 50*a*. The air gap 14*a* is formed by removing by etching parts of the sacrifice layer 14 formed between the electrodes 12*a* and the electrodes 16 of the vibration plate 19. It is noted that other parts of the sacrifice layer 14, which are not removed by etching, remain in the partition parts 50*a* as a remaining sacrifice layer 14*b.*

The actuator forming member 10 is formed by repeating a film deposition and film processing (photo-lithography and etching) so as to form electrodes and insulation layers on a substrate having a high degree of cleanness. A high-temperature process may be used to form the actuator forming member by using silicon to make the substrate 1. It should be noted that the high-temperature process refers to a process for forming a high-quality film such as a thermal oxidizing method or a thermal nitriding method, a thermal CVD method which forms a high-temperature oxide film (HTO) or an LP-CVD method which forms a good-quality nitride film. By adopting the high-temperature process, high-quality electrode materials and insulating materials become usable, which can provide an actuator device having excellent conductivity and insulation. Moreover, the high-temperature process is excellent in controllability and reproducibility of a film thickness, thereby providing an actuator device having little variation in the electric properties. Further, since the controllability and reproducibility are excellent, process design becomes easy and a mass production at low cost can be achieved.

In FIGS. 3A and 3B, the electrode layer 12 is formed on the insulating layer 11 which is formed on the substrate 1, and is divided into each channel (each drive bit) by separation grooves. As shown by a part A3 encircled by a dotted line in FIG. 3B, the separation grooves 82 are filled by the insulating layer 13 formed on the electrode layer 12. Thus, by dividing the electrode layer 12 by separation grooves 82 and covering the electrode layer 12 by the insulating layer 13 so as to fill the separation grooves 82 by the insulating layer 13, it becomes possible to form a flat surface having little step or unevenness in a subsequent process. As a result, an actuator having high-accuracy in dimensions and little variation in electric properties can be obtained.

In order to completely fill the separation grooves 82 by the insulating layer 13, it is preferable to set a thickness of the insulating layer 13 substantially equal to or greater than ½ of a width of the separation groove so as to form the surface of the insulating layer substantially flat. Or, it is preferable to set the width of the separation groove equal to or smaller than twice the thickness of the insulating layer. According to the above-mentioned relationship, the separation groove can be completely filled by the insulating layer, which results in a substantially flat surface of the insulating layer. Thus, since a surface level difference can be mostly eliminated by forming the insulating layer with a thickness substantially equal to or greater than ½ of the width of the separation grooves 82 of the electrode layer 12, subsequent processes explained below, such as an air gap forming process, a resin film forming process or a joining process with other members, can be easily performed. As a result, an actuator having an air gap with an accurate distance thereof can be obtained, and, at the same time, it can be attempted to reduce a cost and improve reliability.

Here, as a material of the electrode layer 12 for forming the electrodes 12*a*, a compound silicide such as polysilicon, titanium silicide, tungsten silicide or molybdenum silicide or a metal compound such as titanium nitride may be preferably used. Since these materials can be deposited and processed with a stable quality and can be made into a structure which withstands a high-temperature process, there is less restriction with respect to temperatures in other processes. For example, a HTO (High-Temperature-Oxide) film or the like can be laminated on the electrode layer 12 as the insulating layer 13, the HTO film being an insulating layer having high reliability. Thus, the selection range can be enlarged, and cost reduction and improvement of reliability can be attempted. Additionally, a material such as aluminum, titanium, tungsten, molybdenum or ITO can also be used. By using these materials, a remarkable resistance reduction can be attempted, which results in reduction in a drive voltage. Additionally, since deposition and processing of films made of these materials can be easily achieved with a stable quality, cost reduction and improvement of reliability can be attempted.

In FIGS. 3A and 3B, although the air gap 14*a* is formed by removing by etching parts of the sacrifice layer 14, other parts of the sacrifice layer 14, which parts are indicated by 14*b* and embedded in the partition parts 50*a* in FIG. 1B, remain without being removed in the present invention. Since the distance "g" of the air gap is accurately defined by the thickness of the sacrifice layer 14 by forming the air gap 14*a* by the removal of the parts of the sacrifice layer 14, variation in the distance "g" of the air gap 14*a* is extremely small, thereby achieving an accurate actuator having little variation in characteristics. Additionally, since foreign substance is prevented from entering the air gap 14*a*, it can be produced at a stable yield and a reliable actuator can be obtained. Further, since the sacrifice layers 14*b* remain in the partition parts 50*a* and the vibration plate 10 is firmly fixed by the partition parts 50*a*, the accuracy of the distance "g" of the air gap 14*a* can be well-maintained and the actuator is excellent in structural durability. Moreover, since the sacrifice layers 14*b* remain in the partition parts 50*a*, there is little step or unevenness on the surface of the vibration plate 19, which results in substantially flat surface being formed on the actuator forming member 10. Thus, a formation of a resin film as mentioned later or a process for joining the actuator to other members can be easily performed, which results in cost reduction and improvement of reliability.

Here, as a material of the sacrifice layer 14, it is preferable to use polysilicon or amorphous silicon. These materials are most easily removable by etching, and it is preferable to use an isotropic dry etching method using $SF_6$ gas, a dray etching method using $XeF_2$ gas or a wet etching method using a solution of tetra methyl ammonium hydroxide (TMAH). Additionally, since polysilicon and amorphous silicon are generally-used, inexpensive materials and withstand a high temperature, a degree of freedom of a process in a subsequent process is also high. Further, since variation in the distance "g" of the air gap 14*a*, which is very important, can be extremely small by arranging silicon oxide films (insulating layers 13 and 15) having a high etching resistance above and below the sacrifice layer, an accurate actuator having little variation in properties can be obtained. Moreover, mass production is also easy at low cost.

As for a material of the sacrifice layer 14, titanium nitride, aluminum, silicone oxide or polymer material such as a resin film may be used. Additionally, from among resin films, a photosensitive resin material (a resist material) is preferably used since such a material can be easily processed. Although an etchant (etching material) and the air gap forming process depend on the material forming the sacrifice 14 and process difficulty and process cost thereof may also vary depending on the material of the sacrifice layer 14, the material of the sacrifice layer 14 can be selected based on its purpose.

When a silicone oxide film is used for the sacrifice layer 14, it is preferable to use polysilicon as a protective film (etching stopper) of the etching of the sacrifice layer. The polysilicon film may be commonly used for the electrode layer 12 and the vibration plate electrode layer. In order to remove the oxide film forming the sacrifice layer, it is preferable to use a wet etching method, a HF paper method, a chemical dry etching method, etc. If an insulating layer is needed inside the air gap 14*a*, the insulating layer may be formed by oxidizing the polysilicon film remaining as an etching stopper. Thus, if a silicon oxide film is used as the sacrifice layer 14, the removal of the sacrifice layer 14 can be performed by using etching materials used in semiconductor manufacturing processes. Additionally, if polysilicon films are formed on both sides of the sacrifice layer, a manufacturing process with little variation can be achieved. Further, the polysilicon film can be uses as an electrode as it is, which enables mass production at a low cost. Moreover, the thus-obtained actuator also provides high quality and accuracy.

Moreover, similar process can be achieved by various combinations of the material of the sacrifice layer and the etchant. For example, the sacrifice layer 14 may be removed by $O_2$ plasma or an exfoliation liquid when a polymer material is used for the sacrifice layer 14. The sacrifice layer 14 may be removed by a liquid such as KOH when aluminum is used for the sacrifice layer 14. The sacrifice layer 14 may be removed by chemical such as a mixture solution of $NH_3OH$ and $H_2O_2$ when titanium nitride is used for the sacrifice layer 14.

In FIGS. 3A and 3B, the vibration plate 19 is constituted by a laminated film having the insulating layer 15, the vibration plate electrode layer 16 which serves as a common electrode and the insulating layer 17 which also serves as stress adjustment of the vibration plate, stacked in tern. It should be noted that the insulating layer 15 serves as a protective film (etching stopper) of etching the sacrifice layer, and contributes also as a protective film for leaving the sacrifice layer 14*b* of the partition parts 50*a*. As shown by a part A3 encircled by a dotted line shown in FIG. 3B, the insulating layer 15 on the wall surfaces of the sacrifice layer 14*b* corresponds to a material that has been filled in separation grooves 84 formed in the sacrifice layer 14 during the manufacturing process.

In the example of FIGS. 3A and 3B, although the separation grooves 84 of the sacrifice layer 14 are filled by only the insulating layer 15, the separation grooves 84 may be filled by other structural layers of the vibration plate such as the electrode layer and the insulating layer 17 in addition to the insulating layer 15. Steps or unevenness formed on the surface of the insulating layer 15 can be made small by filling the insulating layer 15 in the separation grooves 84 which divide the sacrifice layer 14.

Moreover, the sacrifice layer 14*b* can remain in the partition parts due to existence of the insulating layer 15 filled in the separation grooves 84. The effect of small steps or unevenness is as mentioned above.

Moreover, since the filled insulating layer is securely fixed to the wall surfaces of the sacrifice layer 14*b*, which results in the vibration plate 19 being firmly fixed by the partition parts 50*a*, an accuracy of the distance "g" of the air gap 14*b* of the thus-obtained actuator is high and also excellent in structural durability.

Additionally, similar to the case of filling the insulating layer 13 in the separation grooves 82 of the electrode layer 12, it is preferable to form the insulating layer 15 with a thickness equal to or less than ½ of the width of the separation groove of the sacrifice layer 14 in the case where the insulating layer 15 is filled in the separation grooves 84 of the sacrifice layer 14. However, it is also possible to fill an entire vibration plate layer (lamination of the insulating layer 15, the vibration plate electrode layer 16 and the insulating layer 17) in the separation grooves 84. Therefore, normally, the width of the separation grooves 84 of the sacrifice layer 14 can be larger than the width of the separation grooves 82 of the electrode layer 12. As mentioned above, a level difference (step or unevenness) of the surface of the actuator forming member can be almost eliminated, and the effect of such is the same as that explained before.

As a material of the vibration plate electrode layer 16 which constitutes a part of the vibration plate 19, materials such as polysilicon, titanium silicide, tungsten silicide, molybdenum silicide, titanium nitride, aluminum, titanium, tungsten, molybdenum may be used for the same reason as the material of the electrode layer 12. Additionally, a transparent film such as an ITO film, a nesa film or a ZnO film can also be used. When the transparent film is used, the inspection inside the air gap 14*a* can be easily performed. Thus, an abnormality can be detected during a manufacturing process, which contributes to an attempt of cost reduction and improvement of reliability.

As mentioned above, the surface of the actuator forming member 10 (the surface of the vibration plate 19) can be substantially flat due to filling of the insulating layer 13 in the separation grooves 82 of the electrode layer 12, filing of the insulating layer 15 in the separation grooves 84 of the sacrifice layer 14, the sacrifice layer 14*b* being remained in the partition parts 50*a*, and etching of the sacrifice layer 14 through the sacrifice layer removing holes 60 formed in the vibration plate 19. Since the surface of the actuator is flattened, a resin film forming process can be performed, as mentioned later, for the purpose of acquiring an environment resistance (measures for high humidity) by sealing the sacrifice layer removing holes 60 and also acquiring a corrosion resistance of the vibration plate. Moreover, when it is necessary to join a separate member to the actuator device, such a joining process can be easily performed. As a result, the electrostatic actuator according to the present embodiment has little variation in properties and has high reliability. Additionally, the electrostatic actuator according to the present embodiment can be manufactured by mass production at a low cost.

Figure 4:
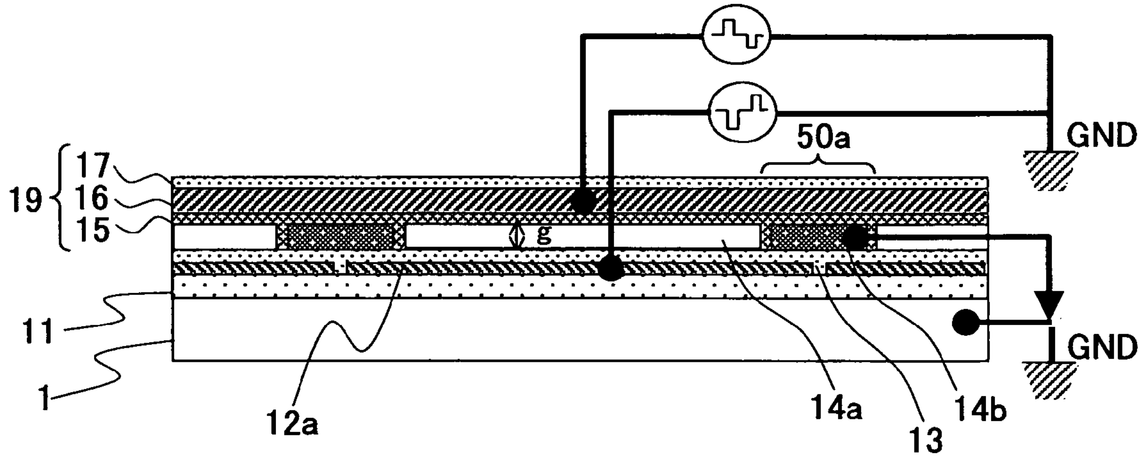
FIG. 4 is a cross-sectional view of an actuator for explaining a setting of a potential applied to each electrode.
Figure 5A:
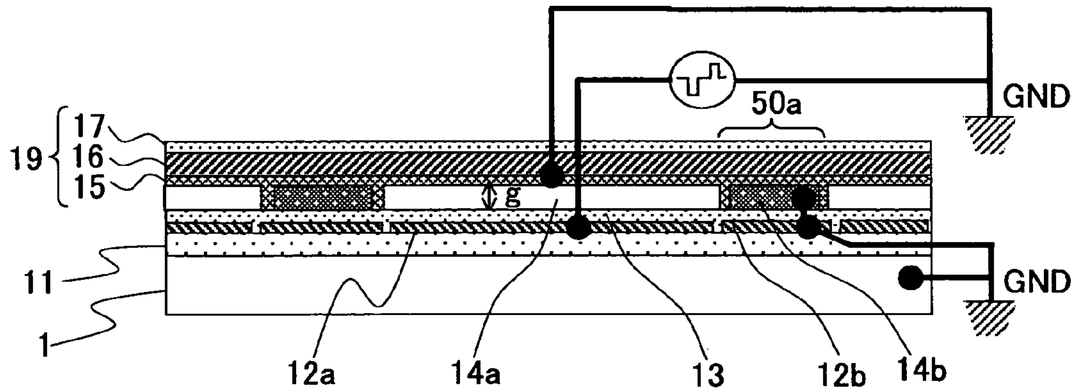
FIGS. 5A and 5B are cross-sectional views of an actuator for explaining a setting of a potential applied to each electrode when dummy electrodes are provided.
Figure 5B:
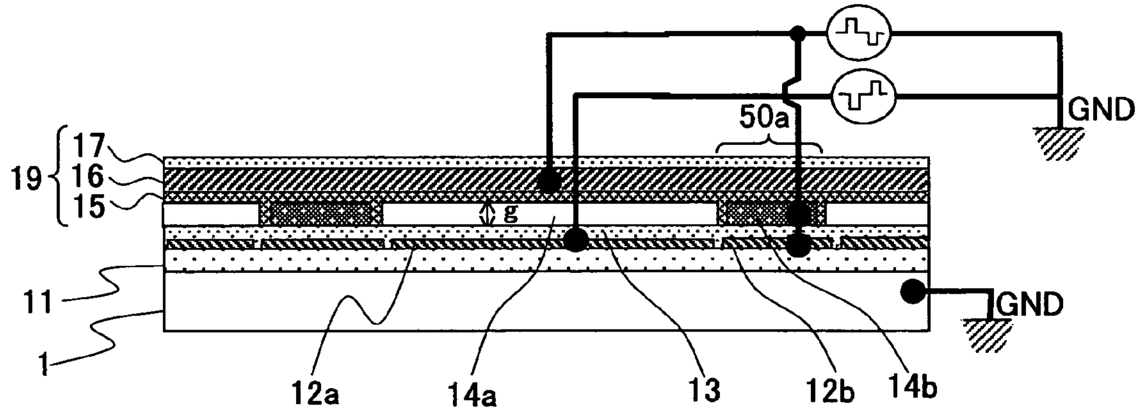

FIG. 4 and FIGS. 5A and 5B show examples for explaining a setting of a potential applied to each electrode when the dummy electrodes are present and not present, respectively. The electrodes 12*a* correspond to individual electrodes which supplies a potential waveform to each actuator element, the potential waveform being a positive potential waveform or a negative potential waveform or a positive and negative waveform. Moreover, the electrode 16 of the vibration plate corresponds to a common electrode which is common to a plurality of actuators. Thus, there is a case in which the electrode 16 supplies a ground potential or a case in which the electrode 16 supplies a potential waveform different from that of the electrode 12*a*. In the present embodiment, the sacrifice layer 14*b* is formed of a conductive material which is, for example, made of polysilicon doped with impurities such as P or As.

In the example shown in FIG. 4, since the electrode 12*a* and the electrode 16 face each other in the area of each partition part 50, a large electrostatic capacity is given to each partition part 50*a*. However, a high-speed drive of the actuator can be achieved by connecting the sacrifice layer 14*b*, which remains in each partition part 50*a*, to a reference potential so as to positively decrease the electrostatic capacity. An appropriate potential for the reference potential changes depending on a driving method, such as a ground potential, a potential of the electrode of the vibration plate, a potential of the individual electrode, a potential between the vibration plate and the electrode. Thus, it is preferable to set an appropriate potential as the reference potential in accordance with a driving method. In the example of FIG. 4, potential waveforms reversed each other are supplied to the electrode 12*a* and the electrode 16, respectively. Thus, it is preferable to set the remaining sacrifice layer 14*b* to a ground potential that is equal to the potential of the substrate 1.

In the example shown in FIGS. 5A and 5B, the dummy electrodes 12*b* are formed and the electrode 12*a* and the electrode 16 do not face in the area of each partition part 50*a*. Thus, an electrostatic capacity generated in each partition part 50*a* is smaller than that of the example shown in FIG. 4. However, the electrostatic capacity can be further reduced by connecting the sacrifice layer 14*b* remaining in each partition part 50*a* to a certain reference potential, which further facilitates a high-speed drive of the actuator. An appropriate potential for the reference potential changes depending on a driving method, such as a ground potential, a potential of the electrode of the vibration plate, a potential of the individual electrode, a potential between the vibration plate and the electrode. Thus, it is preferable to set an appropriate potential as the reference potential in accordance with a driving method.

In the example of FIG. 5A, the electrode 16 of the vibration plate 19 is set to a ground (GND) potential, and it is preferable to set a potential of the dummy electrodes 12*b* and the remaining sacrifice layer 14*b* to the ground potential. In the example of FIG. 5B, reversed potential waveforms are supplied to the electrode 12*a* and the electrode 16, respectively, and, thus, it is preferable to set the dummy electrodes 12*b* and the remaining sacrifice layer 14*b* to a potential of the vibration plate.

When the remaining sacrifice layer 14*b* of the partition part 50*a* is formed of an electrically conductive material like the above-mentioned examples, the remaining sacrifice layer 14*b* and the dummy electrodes 12*b* can be used as a part of electric wiring. If an electrostatic capacity of the partition part 50*a* raises a problem, the electrode 16 may be divided so that a part of the electrode 16 in the area of the partition part 50*a* is made into a dummy electrode.

The thus-formed dummy electrode can also be used as a part of electric wiring. By using these for wiring, each actuator element can be formed in a small area, which achieves a high-density integration. Thus the actuator can be manufactured at a low cost with high performance.

When using the remaining sacrifice layer 14*b* and the dummy electrode 12*b* as electric wiring, it is necessary to connect between electrodes electrically, and, thus, openings (through holes) are provided in the insulating layers 13, 15 and 17 beforehand. However, since a level difference is produced in an area where the through holes are formed, the through holes must be formed in an area where such a level difference does not cause a problem.

Third Embodiment

Figure 6A:
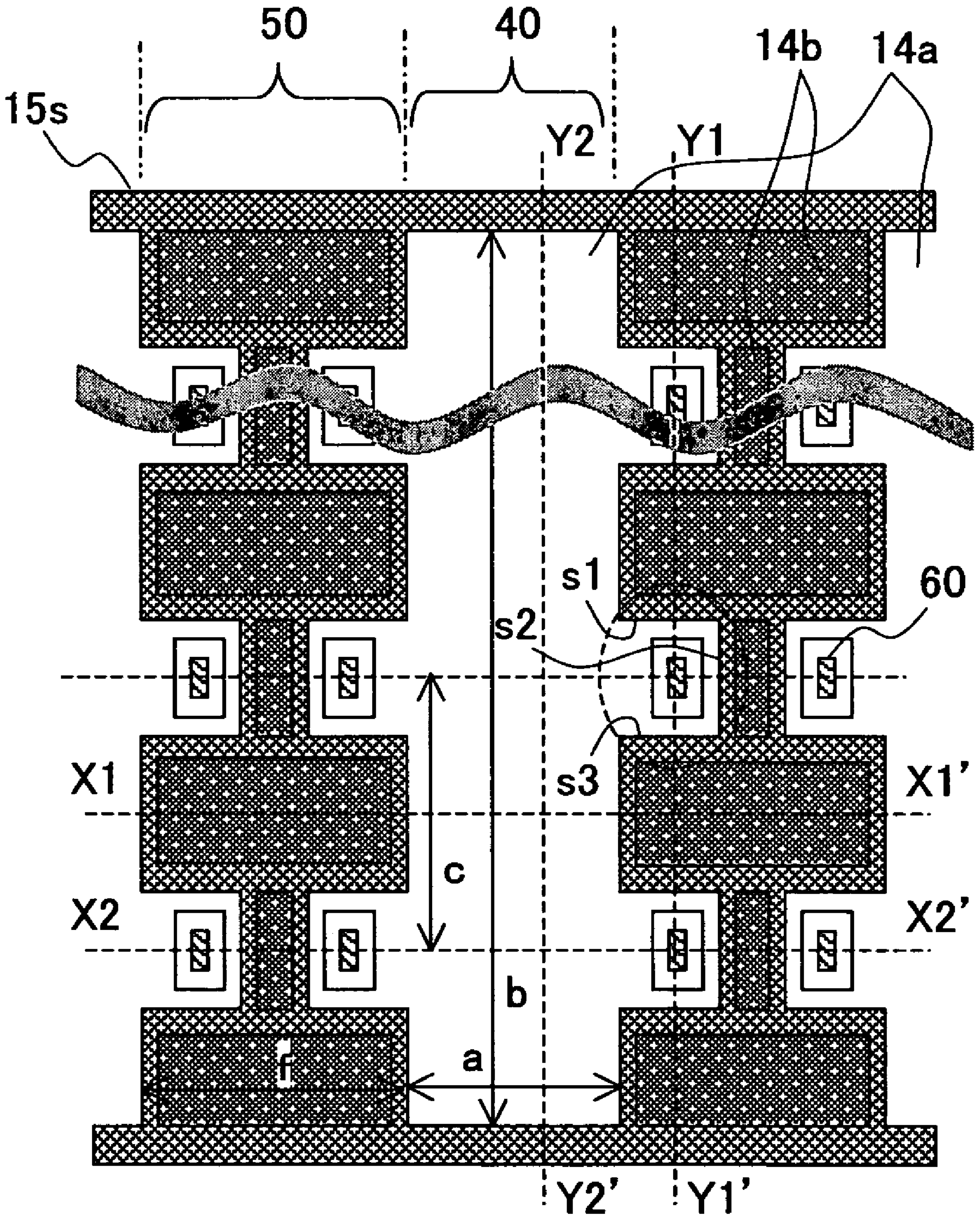
FIG. 6A is a perspective plan view of an electrostatic actuator according to a third embodiment of the present invention.
Figure 6B:
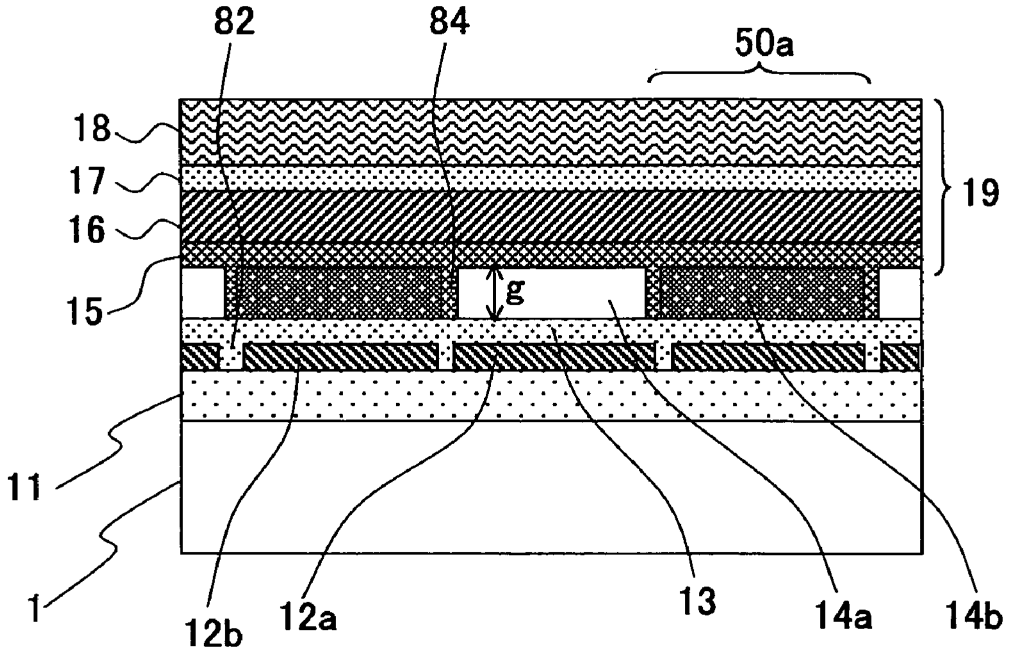
FIG. 6B is a cross-sectional view taken along a line X1-X1' of FIG. 6A.
Figure 6C:
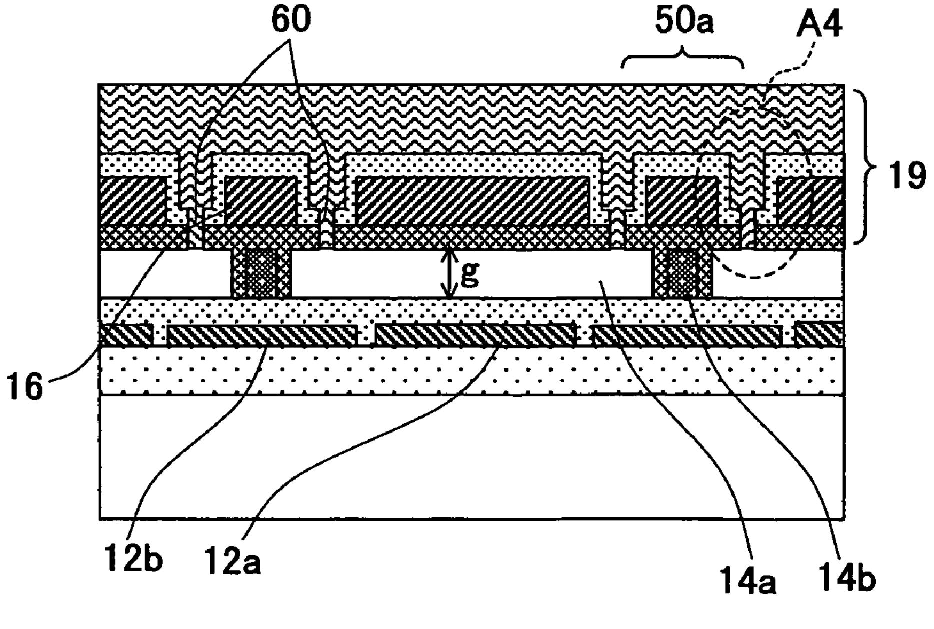
FIG. 6C is a cross-sectional view taken along a line X2-X2' of FIG. 6A.
Figure 6D:
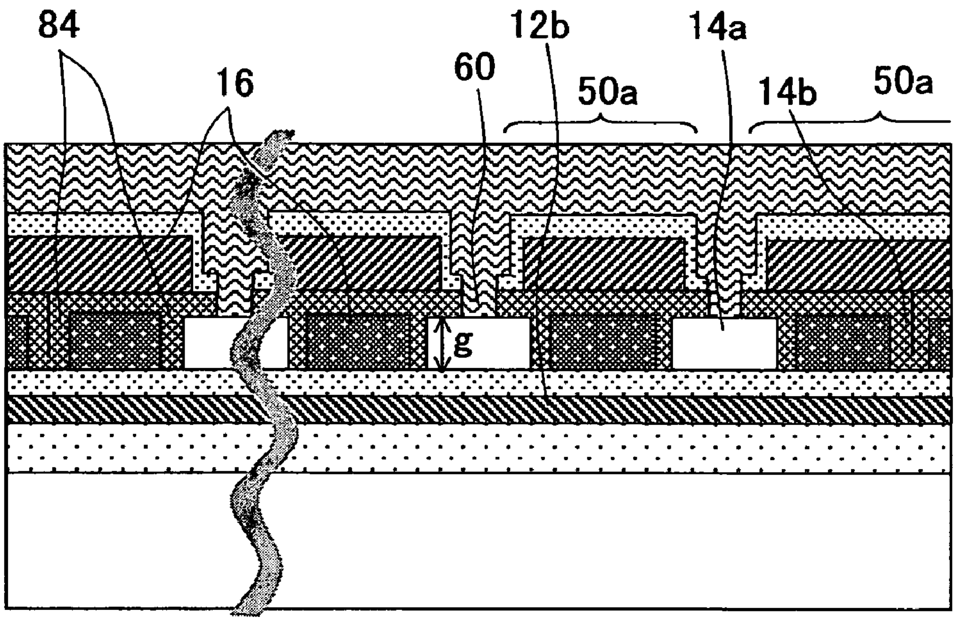
FIG. 6D is a cross-sectional view taken along a line Y1-Y1' of FIG. 6A.
Figure 6E:
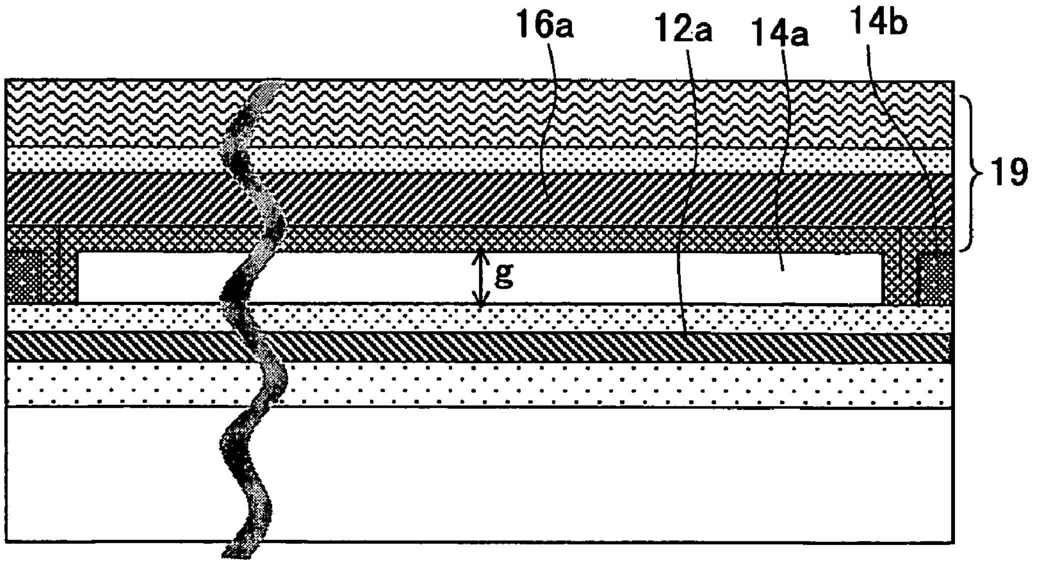
FIG. 6E is a cross-sectional view taken along a line Y2-Y2' of FIG. 6A.

A description will now be given, with reference to FIGS. 6A through 6E, of an actuator according to a third embodiment of the present invention. FIG. 6A is a perspective plan view of an electrostatic actuator according to the third embodiment of the present invention. FIG. 6B is a cross-sectional view taken along a line X1-X1' of FIG. 6A. FIG. 6C is a cross-sectional view taken along a line X2-X2' of FIG. 6A. FIG. 6D is a cross-sectional view taken along a line Y1-Y1' of FIG. 6A. FIG. 6E is a cross-sectional view taken along a line Y2-Y2' of FIG. 6A.

In the figures, the reference numeral 1 denotes a substrate for forming the actuator; 11 an insulating layer; 12*a* an electrode (may be referred to as an individual electrode); 12*b* a dummy electrode; 13 an insulating layer (may be referred to as an electrode side insulating layer); 14 a sacrifice layer; 15 an insulating layer (may be referred to as a vibration plate side insulating layer); 16 a vibration plate electrode layer; 17 an insulating layer also serves a stress-adjustment of the vibration plate; and 18 a resin film having a corrosion resistance to ink. Additionally, the reference numeral 19 denotes a vibration plate comprising the insulating layer 15, the vibration plate electrode layer 16, the insulating layer 17 and the resin film 18. Further, the reference numeral 14*a* denotes an air gap formed by removing parts of the sacrifice layer 14; "g" a distance of the air gap 14*a;* 50*a* a partition part; 14*b* a remaining sacrifice layer remaining in the partition part 50*a;* and 10 an actuator forming member in which the actuator is formed.

Additionally, the reference numeral 40 in the figures denotes a vibration plate movable area where the air gap 14*a* is formed, and 50 denotes a partition area where the remaining sacrifice layer 14*b* is formed. Moreover, the alphabet "a" in FIG. 6A denotes a length of a shorter side of the vibration plate movable area 40; "b" denotes a length of a longer side of the vibration plate movable area 40; "f" denotes a width of the partition area (partition width) 50; and "c" denotes an interval between sacrifice layer removing holes 60 (through holes).

Although the partition width "f" is larger than the length "a" of the shorter side of the vibration plate in FIG. 6A, there are many case in which the partition width "f" is set as small as possible and the length "a" is set as large as possible. Moreover, there may be a case in which the shorter side and the longer side are counterchanged.

As shown in FIG. 6A, the vibration plate movable area 40 is separated from the partition part 50*a* by an insulating layer 15*s* that is filled in the separation grooves 84 of the sacrifice layer 14. A thickness of each layer and a width of the separation grooves 84 are designed so that a step is not formed between the partition area 50 and the vibration plate movable area 40. Moreover, the electrode 12*a* is formed on the substrate via the insulating layer 11 so as to apply a voltage between the electrode 12*a* and the vibration plate 19 so that the vibration plate is deformed in the movable area 40. In order to form the air gap 14*a* in the vibration plate movable area 40, the sacrifice layer removing holes 60 are formed in the vibration plate.

As shown in FIG. 6A, the sacrifice layer removing holes 60 are formed in a small rectangular area, which is encircled by a dotted line, near the partition parts 50*a.* Since three sides s1, s2 and s3 of the small rectangular area are supported by the partition parts 50*a,* the part of the vibration plate in the rectangular part has relatively high strength. Thus, if the sacrifice layer removing holes 60 are provided in that area, there is no deformation or distortion generated in the vibration plate. Additionally, since the vibration plate in that area is relatively rigid and hardly movable, the area belongs to the partition area 50 where the partition part 50*a* is located. According to the above-mentioned structure, the sacrifice layer removing holes 60 can be formed in a part of the vibration plate which is not in the vibration plate movable area.

As mentioned above, the vibration plate movable area 40 can be made flat by forming the sacrifice layer removing holes 60 in the vicinity of the partition parts 50*a,* which does not give an influence to the displacement of the vibration plate. For example, it is useful for a case in which the vibration plate movable area 40 is used as a mirror (an optical device mentioned later) or a case in which the vibration plate movable area 40 is used as a pressurizing chamber of an inkjet head.

Additionally, the sacrifice layer removing holes 60 are preferably arranged along a longer side of the vibration plate at an interval equal to or smaller than the length "a" of the shorter side of the vibration plate.

For example, when using as actuator of an inkjet head, the configuration (when viewed form above) of the actuator is preferably a rectangular shape since it is necessary to arrange a plurality of actuators with high density. It is general to take an arrangement in which adjacent actuators are aligned in a direction of the shorter side of the rectangular shape with the partition areas 50 therebetween. Also in many cases of other micro actuators, the actuator is made into a rectangular shape.

The etching of the sacrifice layer 14 is basically performed by isotopic etching. Thus, normally, it is efficient that the sacrifice layer removing holes 60 are arranged in a grid pattern in the vibration plate movable area 40 at an equal interval. However, if the sacrifice layer removing holes 60 are located in the vibration plate movable area 40, the surface of the vibration plate cannot be formed in a flat surface, and it may influence the vibration characteristics of the actuator. Thus, it is preferable to arrange the sacrifice layer removing holes 60 in end portions along the longer side of the vibration plate 19 and in the vicinity of the partition parts 50*a*.

Additionally, when using as an actuator of an inkjet head, it is necessary to form a small air gap such as 2.0 μm so that the rigid vibration plate 19 must be deformed at a low voltage. Moreover, in order to use the vibration plate as a wall of an ink flow passage (pressurized liquid chamber), a sacrifice layer removing area (large opening) through which liquid leakage occurs must not be in the vibration plate. Therefore, although it is necessary to form the structure in which a plurality of small sacrifice layer removing holes 60 are arranged in the partition area as in the actuator according to the present invention, it has been considered that it is difficult to form a small air gap of a relatively large area according to a sacrifice layer removing process using small sacrifice layer removing holes 60.

However, it was found that an air gap of 0.2 μm to 2.0 μm can be formed by satisfying a structure, a processing method and a processing condition as explained below.

Figure 8:
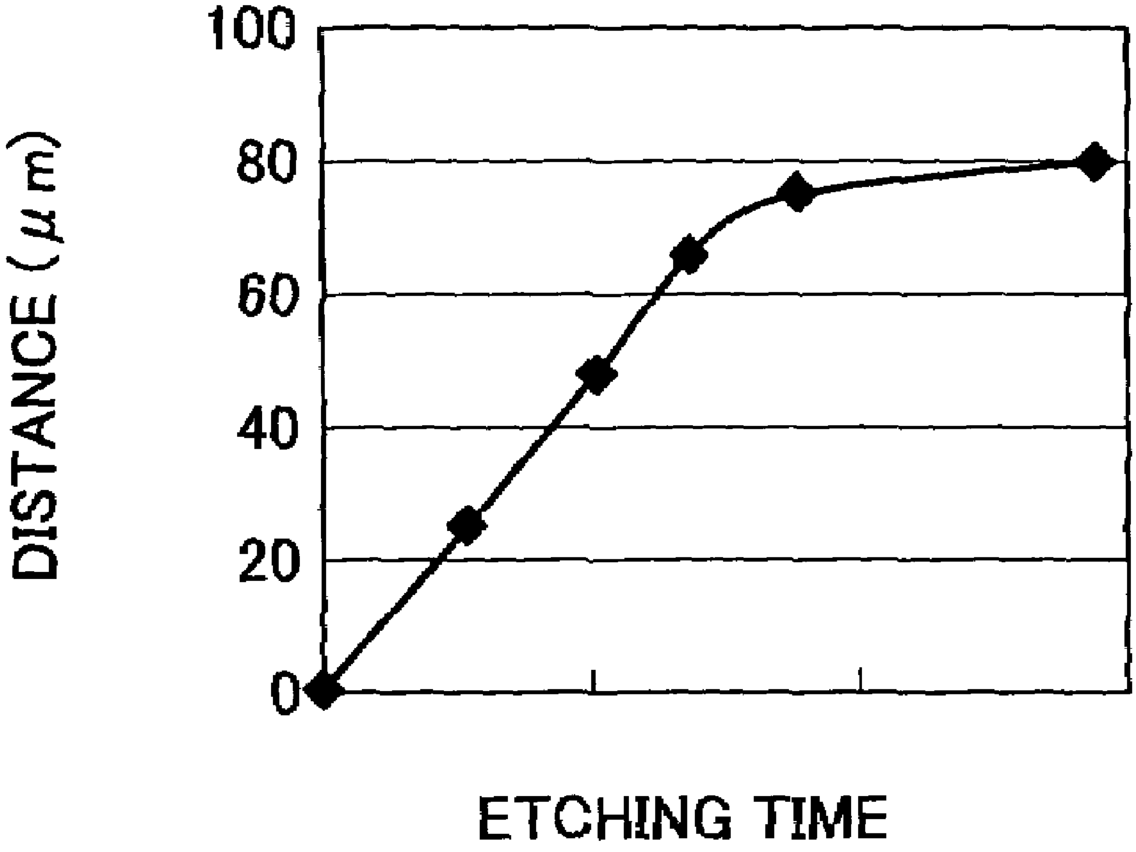
FIG. 8 is a graph showing a relationship between a distance from a sacrifice layer removing hole to a reaction surface when removing a sacrifice layer by etching.

FIG. 8 is a graph showing a relationship between a distance from a sacrifice layer removing hole 60 to a reaction surface when removing the sacrifice layer 14 by etching. When removing the sacrifice layer 14 within a closed space by an isotropic etching using $SF_6$ through the sacrifice layer removing holes 60, the etching time depends on the distance from the sacrifice layer removing holes 60. In other words, an amount of etched portion depends on a distance from the sacrifice layer removing hole 60, and, as shown in FIG. 8, the amount of etched portion tends to saturate when the distance is equal to or greater than 75 μm. Therefore, when arranging a plurality of sacrifice layer removing holes 60 along the longer side of the vibration plate, the length "a" of the shorter side is preferably set equal to or less than 150 μm (75 μm×2) at which the amount of etched portion saturates.

If the shorter side is set equal to or greater than 150 μm, unetched portion may remain in a portion remote from the sacrifice layer removing holes 60. If the etching process time is elongated so a to eliminate the unetched portion, there may occur a problem that a non-etching area (an area protected by a mask and not to be etched) is etched, or a portion to be left as the remaining sacrifice layer 14*b* is etched due to a failure of the etching stopper. Moreover, if the etching process time is long, a process cost is increased, which causes a problem in mass production.

Moreover, from a viewpoint of etching of the sacrifice layer 14, it can be expected that the etching efficiency is more improved as the interval (pitch) c of the arranged sacrifice layer removing holes 60 is smaller. As mentioned above, since the etching for removing the sacrifice layer 14 is an isotropic etching, the interval "c" of the sacrifice layer removing holes 60 is preferably equal to or smaller than the length "a" of the shorter side of the vibration plate.

Figure 9C:
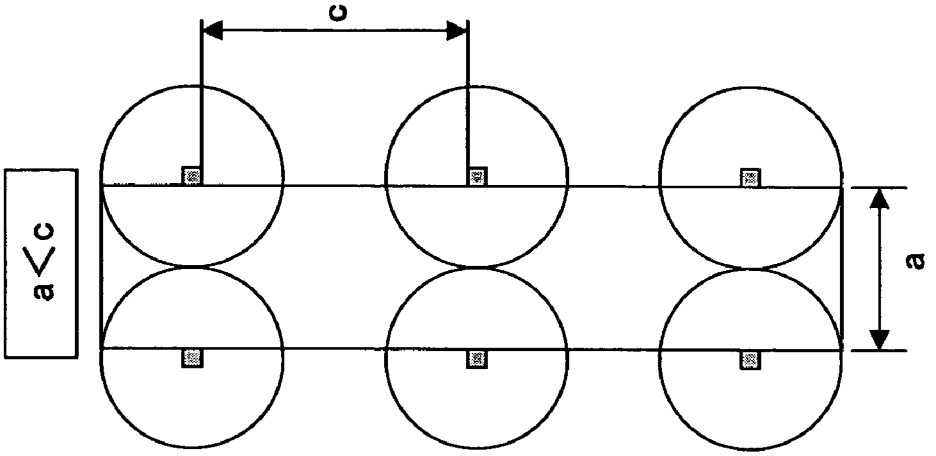
FIGS. 9A, 9B and 9C are illustrations for explaining a relationship between a distance between the sacrifice layer removing holes and an etched area of the sacrifice layer.
Figure 9B:
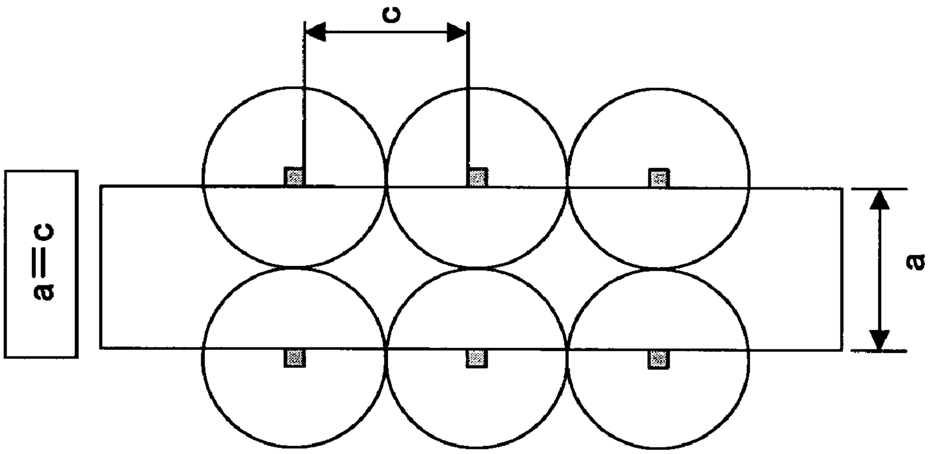
Figure 9A:
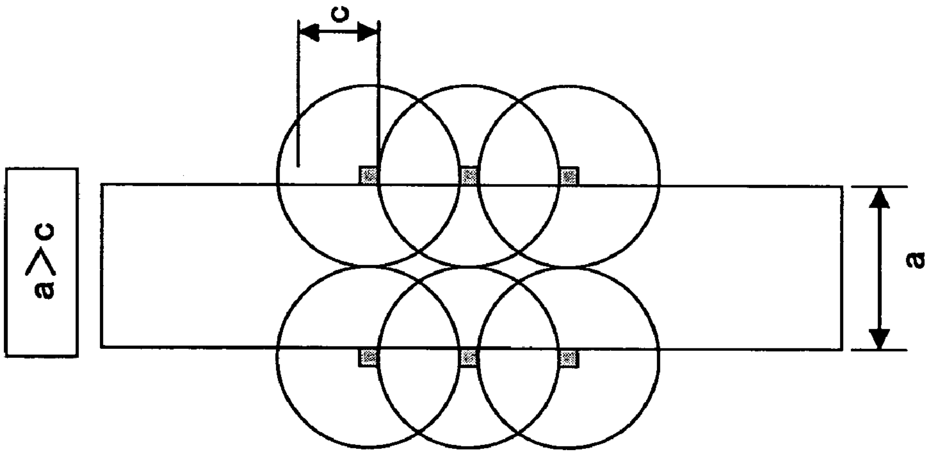

FIGS. 9A, 9B and 9C are illustrations for explaining a relationship between a distance between the sacrifice layer removing holes 60 and etched area of the sacrifice layer.

As shown in FIGS. 9A and 9B, when the relationship between the interval (pitch) "c" of the sacrifice layer removing holes 60 arranged along the longer side of the vibration plate and the length "a" of the shorter side of the vibration plate is a>c or a=c, it can be appreciated that the remaining sacrifice layer after a part of the sacrifice layer in the vibration plate area in the direction of the shorter side is etched can be efficiently etched with a slight over etching.

On the other hand, if a<c as shown in FIG. 9C, a large portion of the sacrifice layer remains after a portion of the sacrifice layer in the vibration plate area in the direction of the shorter side has been etched. As interpreted from the graph of FIG. 8, if the interval "c" between the sacrifice layer removing holes 60 is greater than 150 μm (75 μm×2), an extremely long time is needed to completely etch the portion of the sacrifice layer to be etched. For this reason, an etched amount of a film that is not to be etched may become a negligible amount, which cause a problem. Accordingly, when etching the sacrifice layer by an isotropic etching, the sacrifice layer can be efficiently and positively removed by setting the interval "c" of the sacrifice layer removing holes 60 equal to or smaller than the length "a" of the shorter side of the vibration plate. Thus, a yield rate of the manufacturing process is improved, and also the quality of the actuator is improved.

Figure 7A:
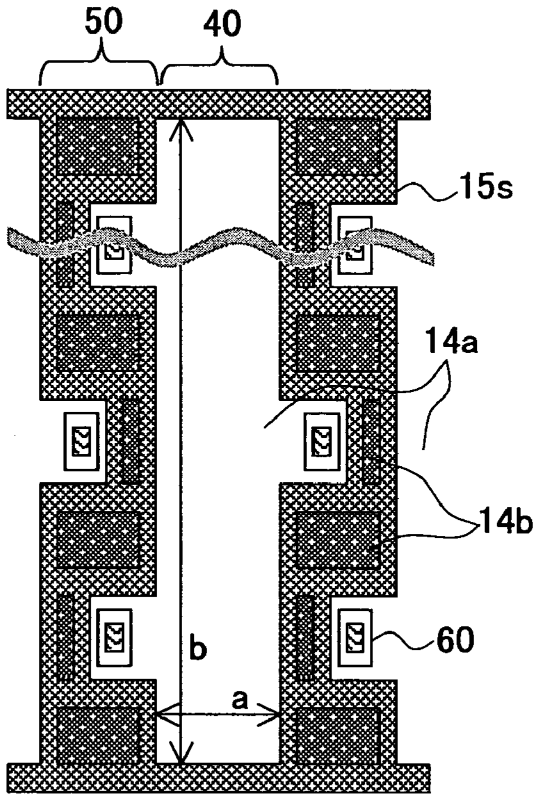
FIGS. 7A, 7B and 7C are plan views of examples of arrangements of sacrifice layer removing holes.
Figure 7B:
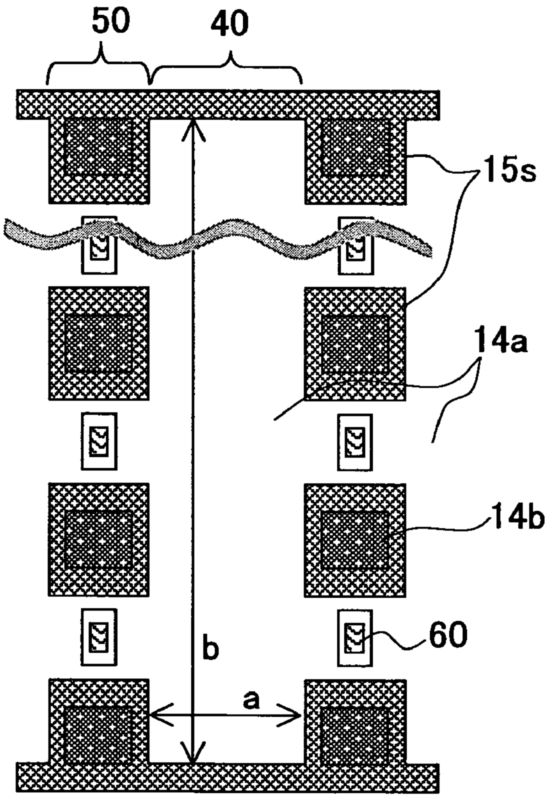
Figure 7C:
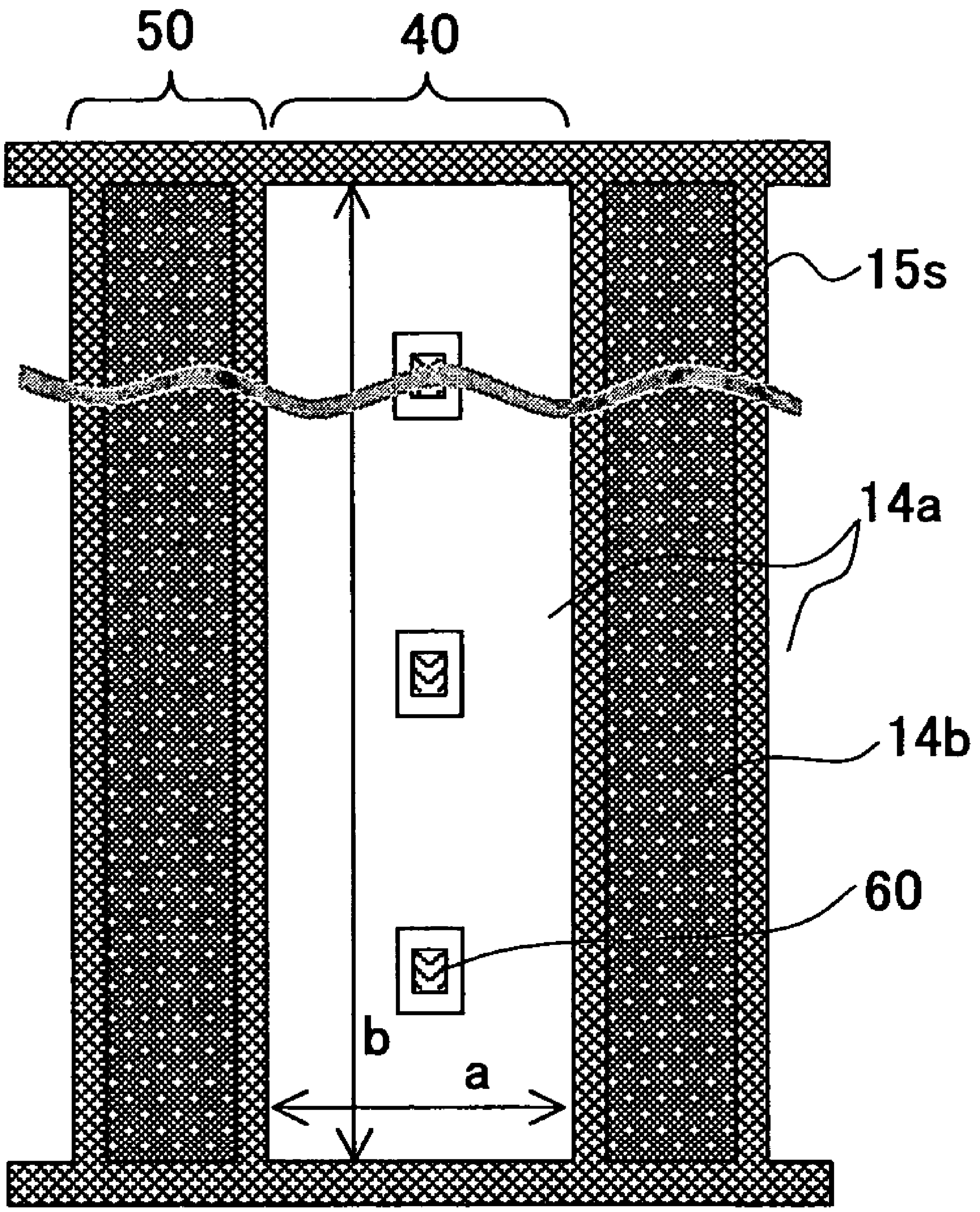

For the purpose of reference, arrangements of the sacrifice layer removing holes 60 different from that shown in FIG. 6A are shown in FIGS. 7A, 7B and 7C.

In the arrangement shown in FIG. 7A, the sacrifice layer removing holes 60 do not opposite to each other along both longer sides. Thus, the etching efficiency is slightly but further improved, and more accurate processing can be performed.

In the arrangement shown in FIG. 7B, an etchant entering through the sacrifice layer removing holes 60 can be easily diffused in all directions. Thus, the etching efficiency can be improved as compared to the arrangement of FIG. 6A or FIG. 7A, and a further higher throughput can be expected. However, the strength of the vibration plate is decreased.

In the arrangement shown in FIG. 7C, the sacrifice layer removing holes 60 are formed above the vibration plate movable area 40. Although the surface characteristic is inferior to the above-mentioned examples of arrangements, the etching efficiency of removal of the sacrifice layer 14 is maximized and the size of the partition area 50 can be minimized. Here, although the sacrifice layer removing holes 60 are arranged along a single line extending a direction of the longer side of the vibration plate, the sacrifice layer removing holes 60 may be arranged along a plurality of lines. Moreover, in the case of a plurality of lines, the holes may be arranged in a zigzag arrangement. The arrangement of the sacrifice layer removing holes 60 to be used may be selected in accordance with application thereof.

Larger size of the sacrifice layer removing holes 60 is more preferable in the viewpoint of etching of the sacrifice layer 14, however, smaller size is more preferable in the viewpoint of influence given to the vibration plate movable area, acquiring a strength of the partition parts 50*a* and sealing the sacrifice layer removing holes 60 by a resin film (mentioned later).

The minimum of the cross-sectional area of each sacrifice layer removing hole 60 is determined by the limitation in resolution in a photographic process and a limitation of etching for removing the sacrifice layer 14. Although detailed descriptions are omitted, as a result of evaluation in detail, it was found that the limitation in etching can be eliminated by arranging a plurality of sacrifice layer removing holes 60 along a plurality of lines. Thus, it was found that the size of the sacrifice layer removing holes 60 can be determined in accordance with the processing limitation. Since the sacrifice layer removing holes 60 are formed using a conventional semiconductor manufacturing process, it is preferable to set the cross-sectional area (an area viewed from the surface of the vibration plate) of each sacrifice layer removing hole 60 equal to or greater than 0.19 $\mu m^2$. The upper limit of the size of each sacrifice layer removing hole 60 is mentioned later.

In the present embodiment, as shown in FIGS. 6B through 6E, the resin film 18 is formed as an uppermost layer of the vibration plate 19. The resin film 18 is provided for the purpose of sealing the sacrifice layer removing holes 60 and acquiring a corrosion resistance of the surface of the actuator. When the actuator is used while the sacrifice layer removing holes 60 are not sealed, dew formation may occur inside the air gap due to operation under a high-temperature environment, environmental change (temperature change) or transportation between different environments. Additionally, it is possible that an operation failure occurs due to foreign materials entering the air gap from the operation atmosphere. In the present embodiment, in order to solve the above-mentioned problem (in order to seal the sacrifice layer removing holes 60), the resin layer 18 is formed as an uppermost layer of the vibration plate.

Although acquisition of a corrosion resistance differs from the environment where the actuator is used, a resin layer is a useful protective film that has a corrosion resistance under various environments. When the actuator is used as a pressurizing element of an inkjet head, a film having a corrosion resistance to ink is necessary since the surface of the vibration plate is brought into contact with ink. Especially, in a case of an inkjet head using alkaline ink having a high pH value, a corrosion resistant film is indispensable, and a resin film as a film which is dissoluble in ink (no change in film thickness) and having a durability. Specifically, it was found that a polyimide film or a polybenzaoxazole (PBO) film is preferably used.

Figure 11A:
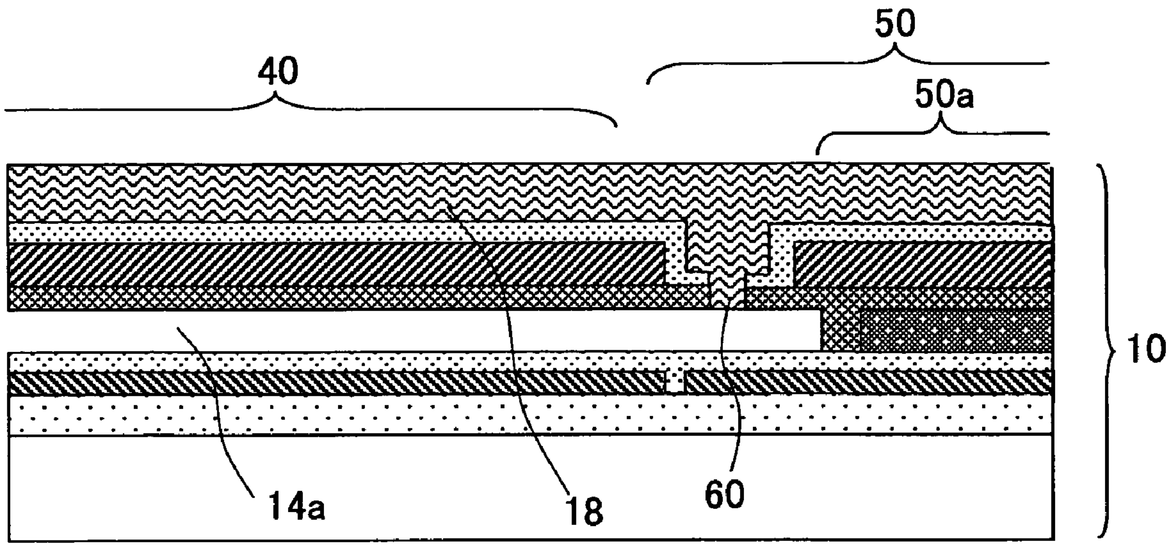
FIGS. 11A and 11B are cross-sectional views of an actuator for explaining sealing of the sacrifice layer removing holes by a resin film.
Figure 11B:
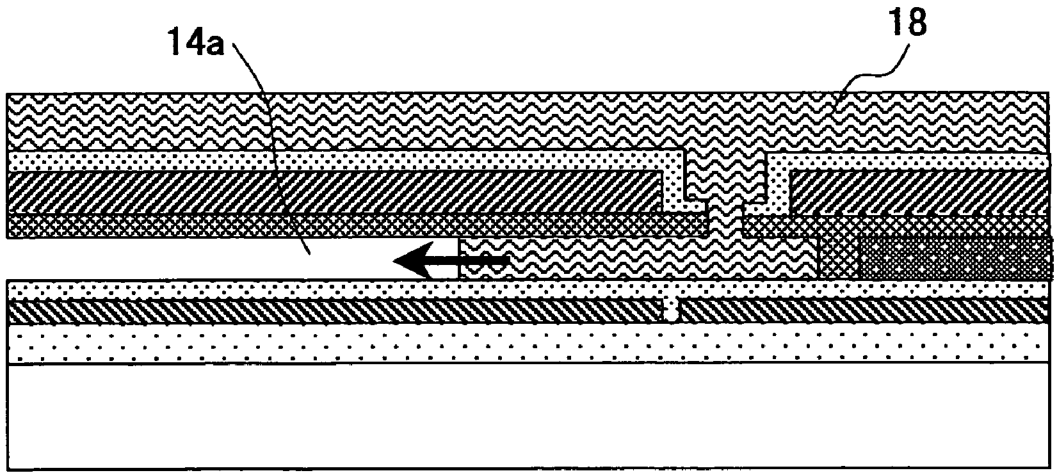

FIGS. 11A and 11B are cross-sectional views of the actuator for explaining sealing of the sacrifice layer removing holes 60 by the resin film 18.

In the present embodiment, as shown in FIG. 11A, the resin film 18 is formed so as to be filled in the sacrifice layer removing holes 60 but not enter the air gap 14*a* and also in a state where the vibration plate in the movable area is not deformed. In the present embodiment, the resin layer 18 can be formed by a spin coating method. If a conventional method is used, there is a problem in that the sealing material is suctioned into the air gap due to the capillary phenomenon as shown in FIG. 11B and the air gap 14*a* is filled by the sealing material.

In order to form the resin film in the structure shown in FIG. 11A, it is necessary to consider various restrictions, structures and conditions such as a surface roughness of the member on which the resin film is formed, wet property of the surface of the member on which the resin film is formed, etc. Here, the wet property is a nature of a surface which does not repels a liquid when the liquid is brought into contact with the surface.

When forming the resin film 18 by the spin coating method, the first important factor is the surface roughness of the member on which the resin film 18 is formed. If there is unevenness of an order of several microns, the resin film 18 cannot be formed uniformly. Thus, it must be attempted to reduce roughness or unevenness in the actuator forming area including at least the vibration plate movable area 40 and the partition area 50. Since the surface flatness is achieved by the above-mentioned various structures and methods in the actuator according to the present invention, the resin film 18 can be well-formed on the vibration plate. In the present embodiment, it can be realized that the surface roughness or unevenness in the actuator forming area is in the order of 0.5 μm or less.

When forming the resin film 18 by a spin coating method, a surface wet control of the member on which the resin film 18 is formed is important. It is preferable that fluorine exists on the surface (fluorinated) on which the resin film 18 is formed. As for the method, there are a method for exposing to $SF_6$ gas or xenon difluoride gas and a method of applying a plasma process. Since the surface containing fluorine decreases wet property against a resin film, the process margin is improved and a yield rate and quality are improved.

In the present embodiment, the fluorinate process is performed using $SF_6$ plasma. Thereby, the wet property against the resin film on the surface of the member is decreased, which prevents the resin film 18 entering the air gap 14*a* through the sacrifice layer removing holes 60, and the sacrifice layer removing holes 60 are filled by the resin film 18. Moreover, in the present embodiment, the etching for removing the sacrifice layer is performed by etching using $SF_6$ plasma, and this etching process is used as the fluorinate process so as to simplify the process of manufacturing the actuator. The material to be used and the process flow are not limited to the above mentioned.

In the case where the resin film 18 is formed by the spin coating method, the configuration of the sacrifice layer removing hole 60 (the cross-sectional area an the length of the removing hole) is important.

Figure 10A:
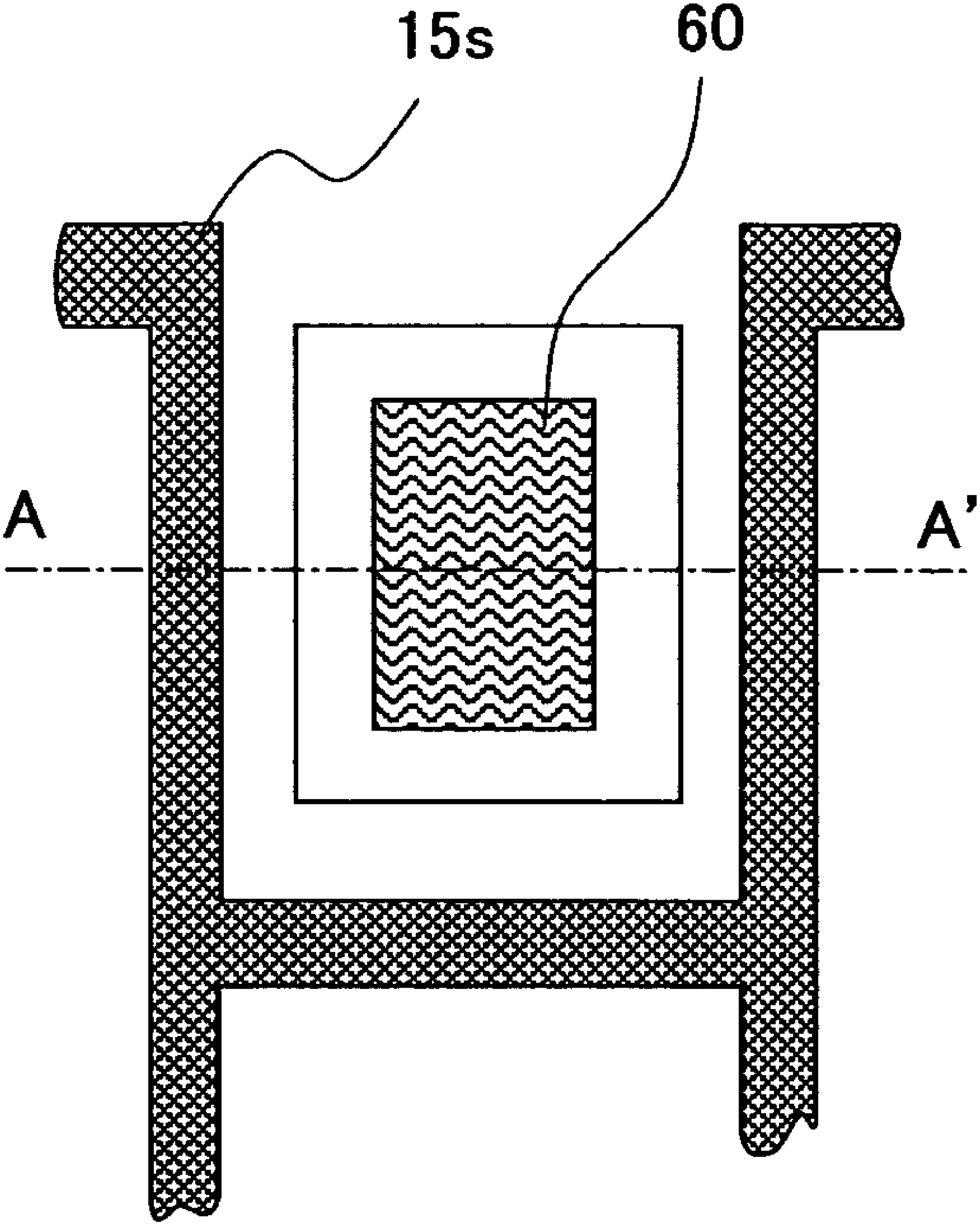
FIGS. 10A through 10D are views for explaining the sacrifice layer removing hole.
Figures 10B, 10C, 10D:
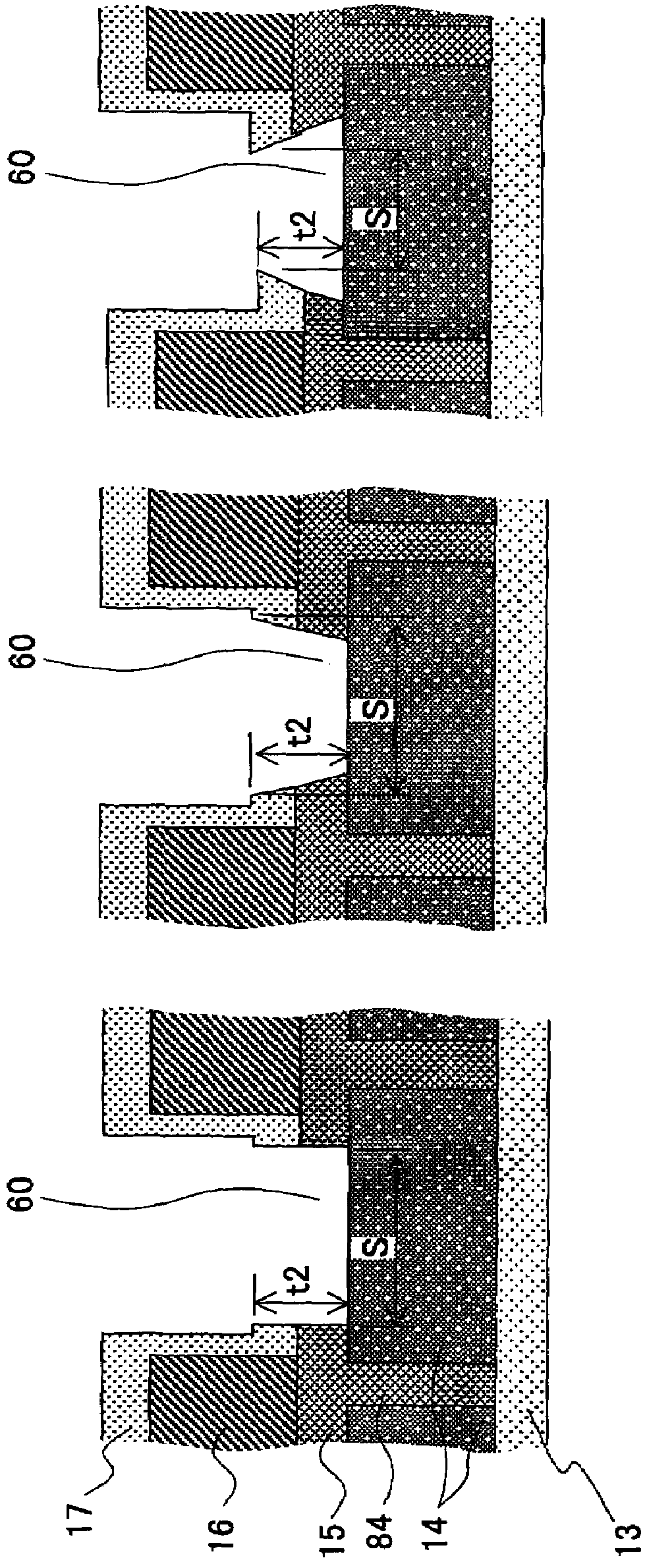

FIGS. 10A through 10D are views for explaining the sacrifice layer removing holes 60. FIG. 10A is a plan view of an area of each sacrifice layer removing hole 60. FIGS. 10B through 10D are cross-sectional views showing examples of different cross sections. In the present embodiment, the configuration of the cross section may be a parallel cylinder, a tapered cylinder or a reverse tapered cylinder. The cross section of the sacrifice layer removing hole 60 corresponds to an area S in the figure.

Larger cross-sectional area of the sacrifice layer removing holes 60 is preferable from the viewpoint of etching for removing the sacrifice layer 14, however, smaller cross-sectional area is preferable from the viewpoint of suppressing influence to the vibration plate removal area 40 and sealing of the sacrifice layer removing holes 60 by the resin layer 18. As mentioned above, the lower limit of the cross-sectional area of the sacrifice layer removing hole 60 is 0.19 $\mu m^2$ when considering etching for removing the sacrifice layer 14. On the other hand, the upper limit of the cross-sectional area of the sacrifice layer removing hole 60 is determined from the viewpoint of sealing the sacrifice layer removing hole 60, and it was found that the cross-sectional area be equal to or smaller than 10 $\mu m^2$. As a result of various evaluations including the above-mentioned fluorinate process and a plasma process of a surface of which the resin film 18 is formed, it was found that it is possible to fill the resin film 18 in the sacrifice layer removing hole 60 and prevent the resin film material from entering the air gap 14*a* only when the cross-sectional area of the sacrifice layer removing hole 60 is equal to or smaller than 10 $\mu m^2$.

Additionally, it was found that the fluorinate process and the plasma process of the surface prevents variation and contributes to improvement of a yield rate (preventing the resin film material from entering the air gap 14*a*).

Moreover, the length of the sacrifice layer removing hole 60, that is, a thickness t2 of the insulator layer (insulating layers 15 and 17) in which the sacrifice layer removing holes 60 are formed is preferably equal to or greater than 0.1 μm. If the thickness t2 of the insulator layer in which the sacrifice layer removing holes 60 are formed is less than 0.1 μm, a sufficient strength is not maintained and it is possible that the resin film enters the air gap 14*a* due to destruction of a periphery of the sacrifice layer removing holes 60 caused by an impact during a resin coating process. When the thickness of the insulator layer in which the sacrifice layer removing holes 60 are formed is equal to or greater than 0.1 μm, a periphery of the sacrifice layer removing holes 60 is not destructed and sealing can be done, which improves a yield rate of the manufacturing process.

There are various other methods, such as a vacuum deposition method, which form a corrosion resistant sealing film including the resin film. From among those methods, the spin coating method is conventional and inexpensive. According to the spin coating method, the resin film can be formed with uniform thickness of about 0.05 μm to several tens μm.

By realizing the formation of the resin film including the sealing of the sacrifice layer removing holes 60 using the spin coating method, a remarkable improvement in quality and cost reduction can be achieved. Moreover, the surface characteristic can be further improved by forming the resin film using the above-mentioned method.

Other structures and features of the actuator according to the present embodiment are the same as that of the above-mentioned embodiments that are explained with reference to FIGS. 1B and 1C and FIGS. 3A and 3B, and descriptions thereof will be omitted.

Next, a description will be given, with reference to FIGS. 12A through 12G, of a manufacturing method of the electrostatic actuator according to the present embodiment. It should be noted that each of FIGS. 12A through 12G are cross-sectional views taken along a line parallel to the shorter side of the vibration plate.

Here, the actuator substrate is produced by depositing, in turn, an electrode material, a sacrifice layer material and a vibration plate material onto the substrate 1.

Figure 12A:
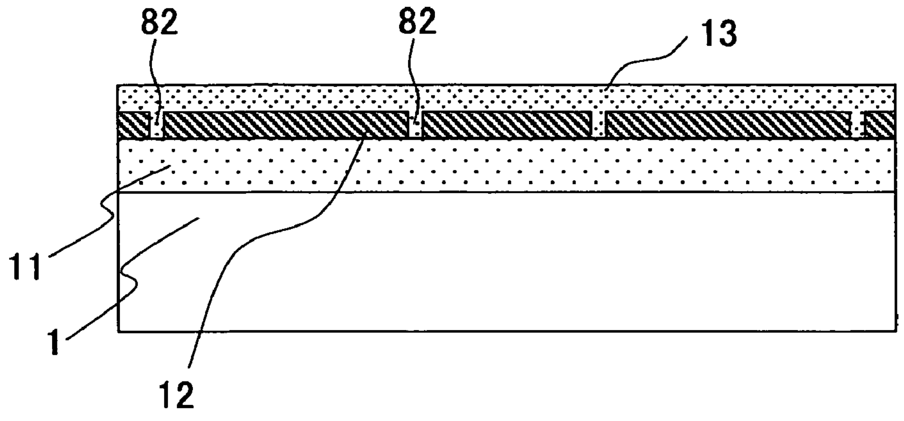
FIGS. 12A through 12G are cross-sectional views taken along a line parallel to the shorter side of the vibration plate.

First, as shown in FIG. 12A, a thermal oxidation film, which corresponds to the insulating layer 11, is formed on a silicon substrate, which has a plane direction of (100) and corresponds to the substrate 1, by a wet oxidation method (pyrogenic oxidation method), for example, with a thickness of about 1.0 μm. Then, polysilicon which turns to the electrode layer 12 is deposited on the insulating layer 11 with a thickness of 0.4 μm, and phosphorus is doped into the polysilicon of the electrode layer 12 so as to reduce a resistance. After forming separation grooves 82 in the electrode layer 12 by a lithography etching method (a photographic process technique and an etching technique), that is after forming the electrodes 12*a* and dummy electrodes 12*b*, a high-temperature oxide film (HTO film) is formed with a thickness of 0.25 μm as the insulating layer 13. At this time, the separation grooves 82 of the electrode layer 12 are filled by the insulating layer 13 so that the surface of the insulation layer 13 is flat.

Figure 12B:
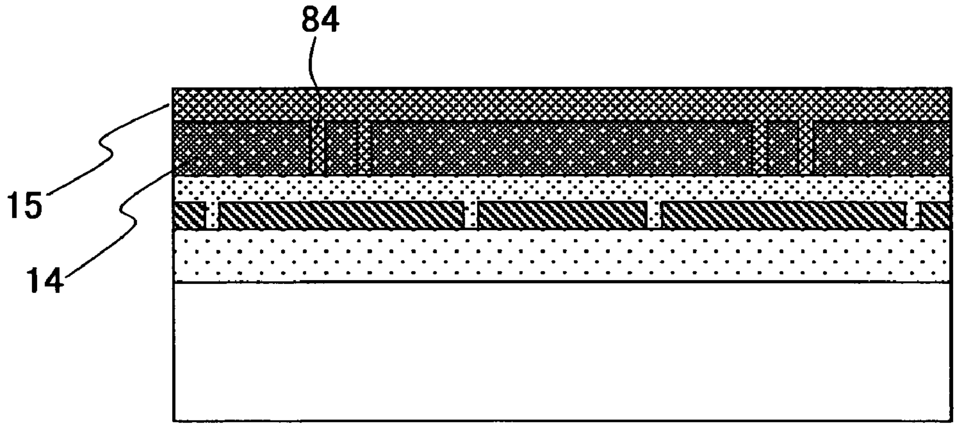

Subsequently, as shown in FIG. 12B, after depositing the polysilicon, which serves as the sacrifice layer 14, on the insulating layer 13 with a thickness of 0.5 μm, separation grooves 84 are formed in the sacrifice layer 14 by a lithography etching method, and further a high-temperature oxide film (HTO film) is deposited with a thickness of 0.1 to 0.3 μm as the insulating layer 15. At this time, the width of the separation groove is preferably equal to a width by which the separation grooves 84 can be filled by the structural layers such as the insulating layer 15. Although it depends on the thickness of the vibration plate, it is preferable to set the width equal to or less than 2.0 μm. In the present embodiment, the width of the separation grooves 84 is set to 0.5 μm.

Thus, the vibration plate 19 can be formed with a substantially flat surface having little unevenness un the subsequent process by dividing the sacrifice layer 14 by the separation grooves 84 and embedding the sacrifice layer 14 in the insulating layer 15 or the vibration plate layer 19 (the insulation layer 15, the vibration plate electrode layer 16 and the insulating layer 17). Accordingly, the surface of the actuator substrate can be flattened and process design of subsequent processes becomes easy.

Figure 12C:
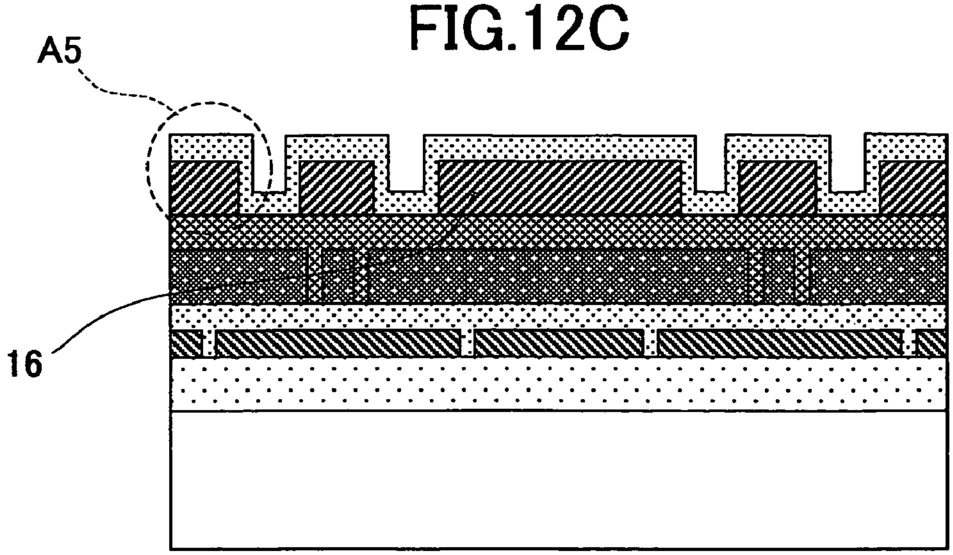

Furthermore, as shown in FIG. 12C, phosphorus-doped polysilicon, which turns to the vibration plate electrode layer (common electrode) 16, is deposited with a thickness of 0.2 μm. Then, the vibration plate electrode layer 16 is etched by a lithography etching method with a pattern oversized from the sacrifice layer removing holes 60 in an area where the sacrifice layer removing holes 60 are formed later. Subsequently, the insulating layer 17 is formed with a thickness of 0.3 μm. The insulating layer 17 serves as a stress adjustment (bending prevention) film for preventing the vibration plate from being bent or deformed.

In the present embodiment, the insulating layer 17 is a laminated film of a nitride film having a thickness of 0.15 μm and an oxide film having a thickness of 0.15 μm. FIGS. 13A through 13D are cross-sectional views for explaining examples of the bending prevention film. The cross-sectional views of these figures are enlarged view of a part corresponding to a part A5 shown in FIG. 12C. The present embodiment uses the example shown in FIG. 13C. In the figures, a part 6A encircled by dotted lines corresponds to an area where the sacrifice layer removing hole 60 is formed later. In the figures, the reference numeral 17*a* denotes a tensile stress film, which is generally formed of a nitride film, and 17*b* denotes a compressive stress film, which is formed of an oxide film in many cases. In the present embodiment, each of the vibration plate electrode layers 16 and the insulating layer 15 that are lower layers of the insulating layer 17 is formed of a compressive stress film. That is, the vibration plate 19 is a laminated film in which a tensile stress film is sandwiched between compressive films so that a film thickness is designed so as to provide a stress relaxation.

Figure 12D:
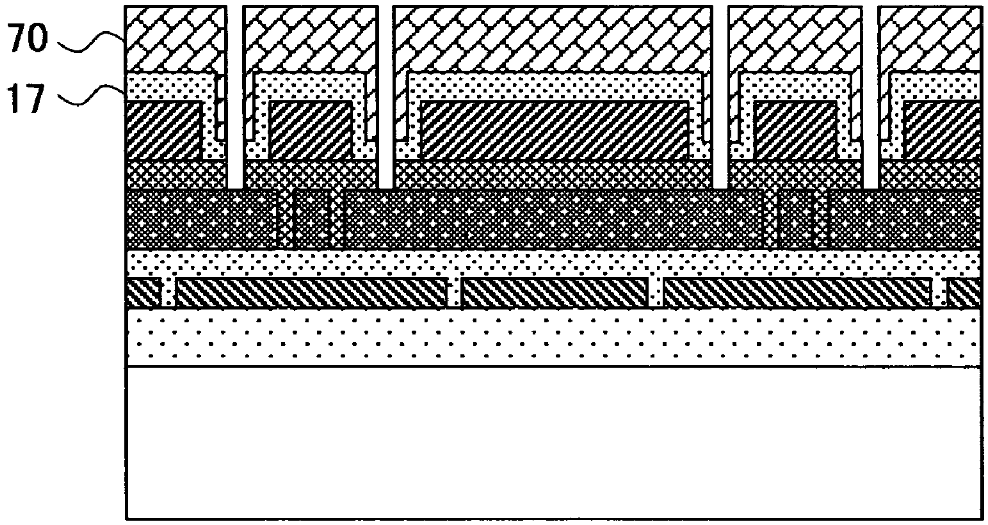
Figure 12E:
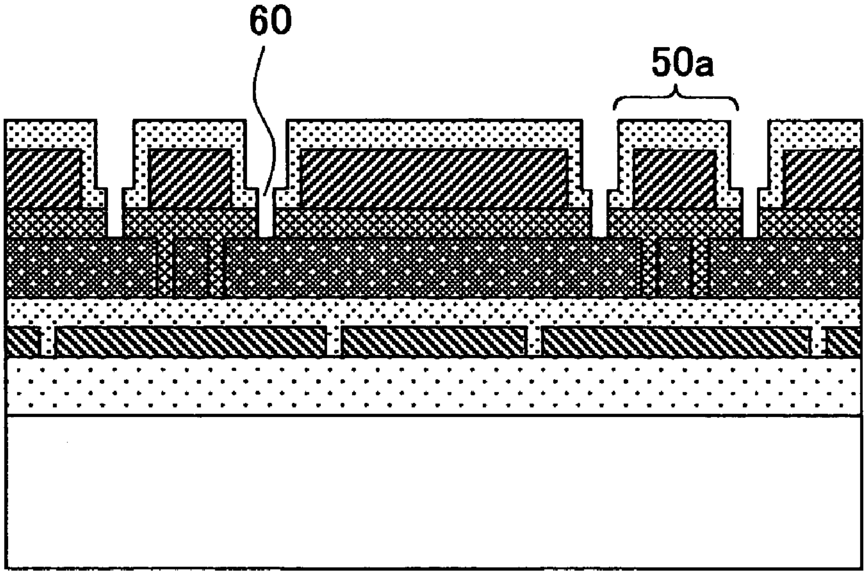
Figure 12F:
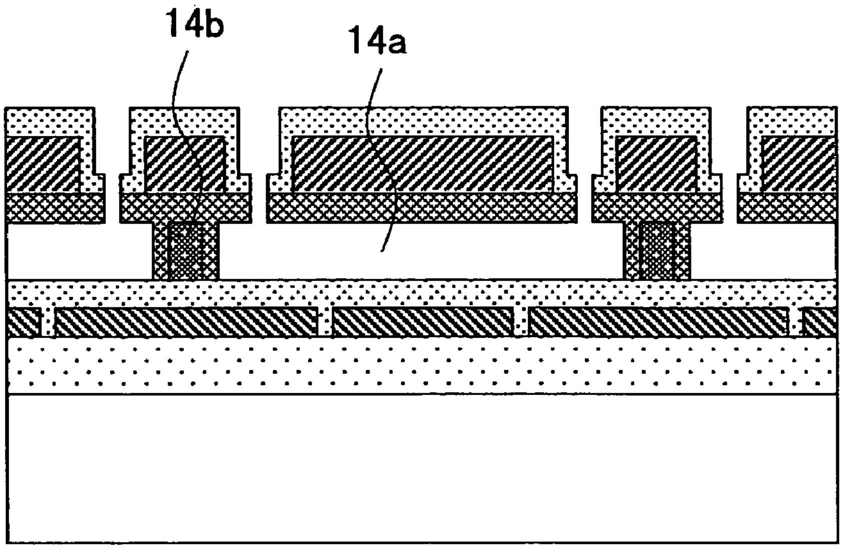

Next, as shown in FIG. 12D, the sacrifice layer removing holes 60 are formed by a lithography etching method. The reference numeral 70 in FIG. 12D denotes a resist. Although the etching for removing the sacrifice layer can be performed with the resist 70 attached thereto, the etching for removing the sacrifice layer is performed in the present embodiment after removing the resist as shown in FIGS. 12E and 12F. This is for avoiding removal of the resist after the removal of the sacrifice layer.

Although etching for removing the sacrifice layer 14 is performed by isotropic dry etching using $SF_6$ gas, a wet etching using alkaline etching liquid such as KOH or TMAH may be used, or a dray etching using $XeF_2$ gas may be used. Since the sacrifice layer (polysilicon) 14 is surrounded by an oxide film, the sacrifice layer 14 can be removed under a sacrifice layer removing condition which provides high electivity with respect to the oxide film, thereby forming the air gap 14*a* with sufficient accuracy. Moreover, the sacrifice layer 14*b*, which is separated by the insulating layer 15 filled in the separation grooves 84, is remained in each partition part 50*a*, which allows formation of a substantially flat surface of the actuator substrate.

It should be noted that since the etching for removing the sacrifice layer is isotropic etching, it is preferable to arrange the sacrifice layer removing holes 60 at an interval equal to or smaller than the length "a" of the shorter side of the air gap (movable vibration plate).

Figure 12G:
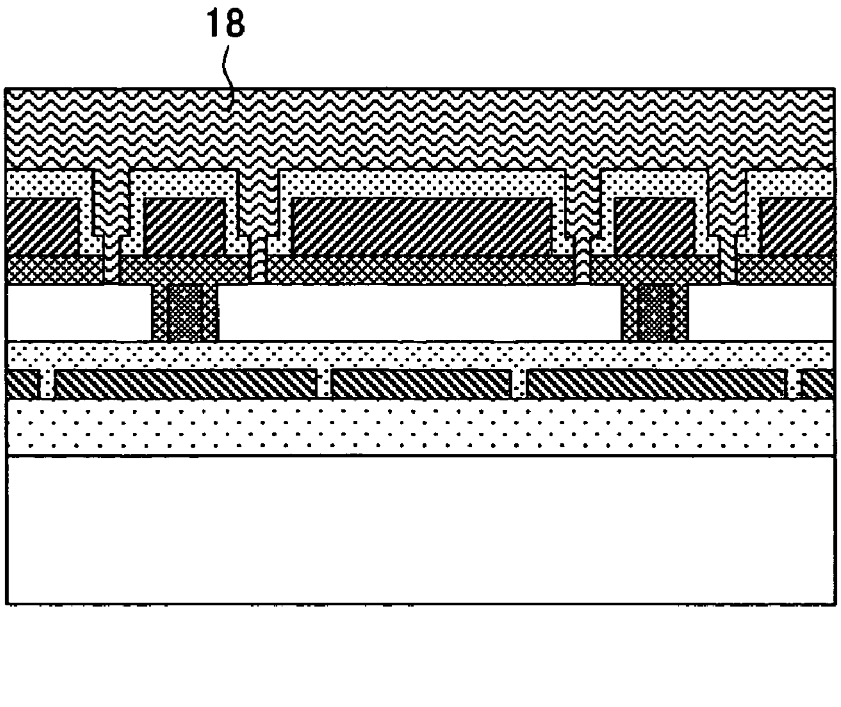
Figure 13A:
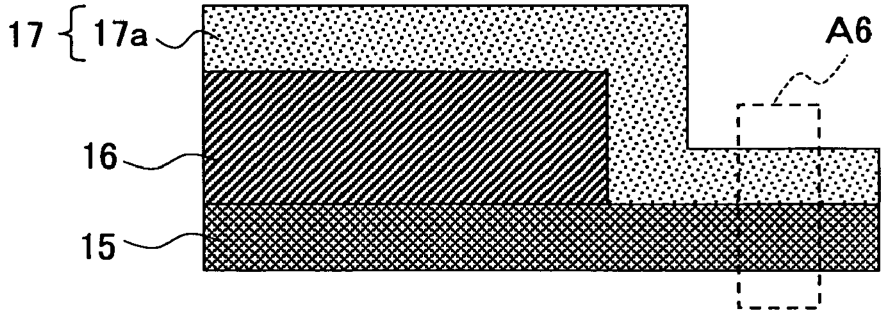
FIGS. 13A through 13D are cross-sectional views for explaining examples of a bending prevention film.
Figure 13B:
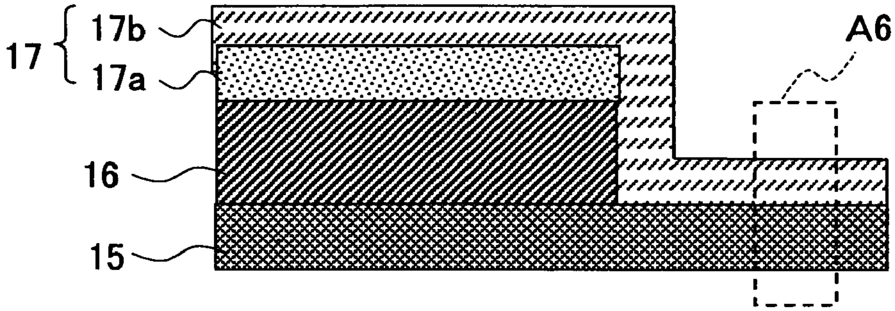
Figure 13C:
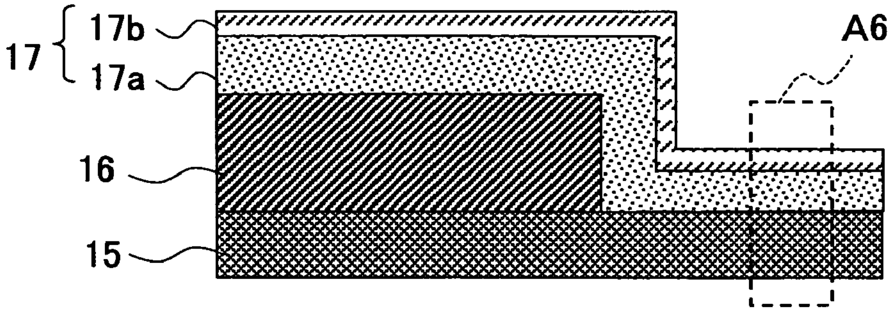
Figure 13D:
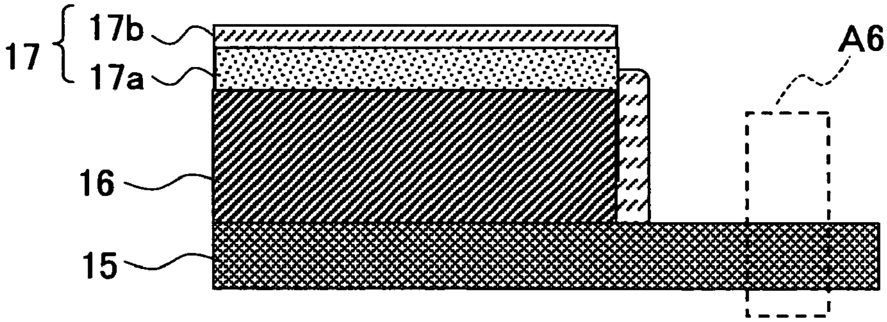

Then, as shown in FIGS. 12G, the resin film 18 is formed as an uppermost layer of the vibration plate. The resin film is provided for the purpose of acquiring an environmental resistance (for preventing dew formation in the air gap and intrusion of foreign matters) by sealing the sacrifice layer removing holes 60 and acquiring a corrosion resistance of the vibration plate against ink.

The formation of the resin film can be easily performed by a spin coating method. According to this approach, the resin film can be formed uniformly with sufficient accuracy of the thickness from about 0.05 μm to several 10 μm. Moreover, by forming the resin film according to the above-mentioned method, the surface characteristics can be further improved.

In the electrostatic actuator produced by the above-mentioned manufacturing method, the distance "g" of the air gap can be defined by the thickness of the sacrifice layer 14, and, thus, the air gap 14*a* is formed with sufficient accuracy with little variation. Therefore, there is also little variation in the vibration characteristic (discharge characteristic) of the vibration plate 19. Moreover, since a large part of the actuator can be formed by a semiconductor process, a stable mass production can be achieved with sufficient yield.

Fourth and Fifth Embodiments

Next, a description will be given, with reference to FIGS. 14A and 14B and FIGS. 15A and 15B, of fourth and fifth embodiments of the present invention.

Figure 14A:
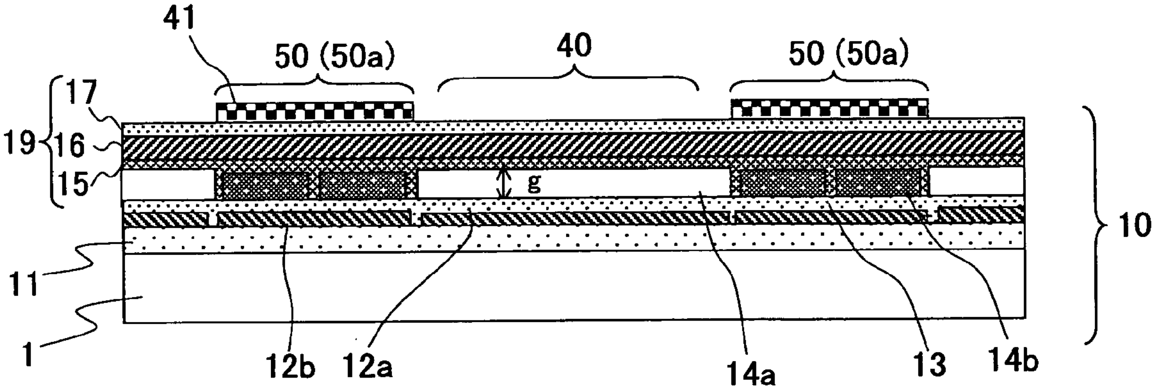
FIGS. 14A and 14B are cross-sectional views of an electrostatic actuator according to a fourth embodiment of the present invention.
Figure 14B:
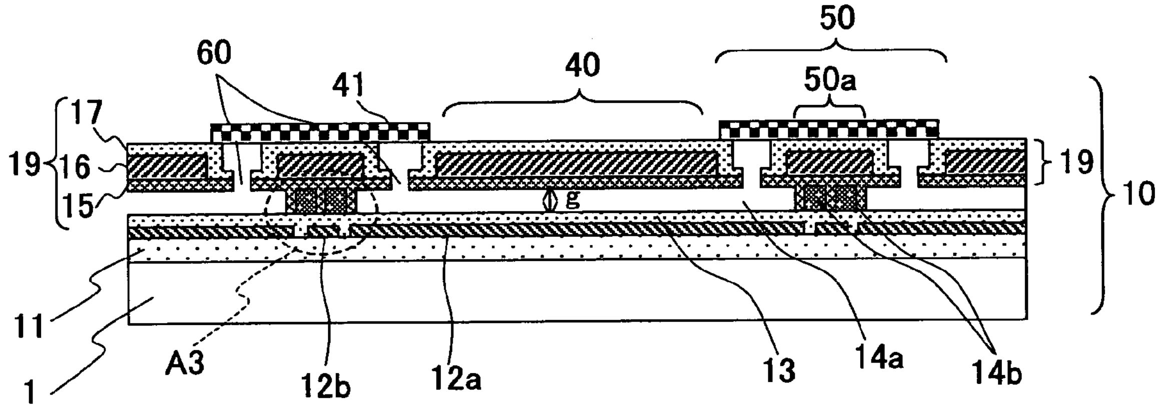
Figure 15A:
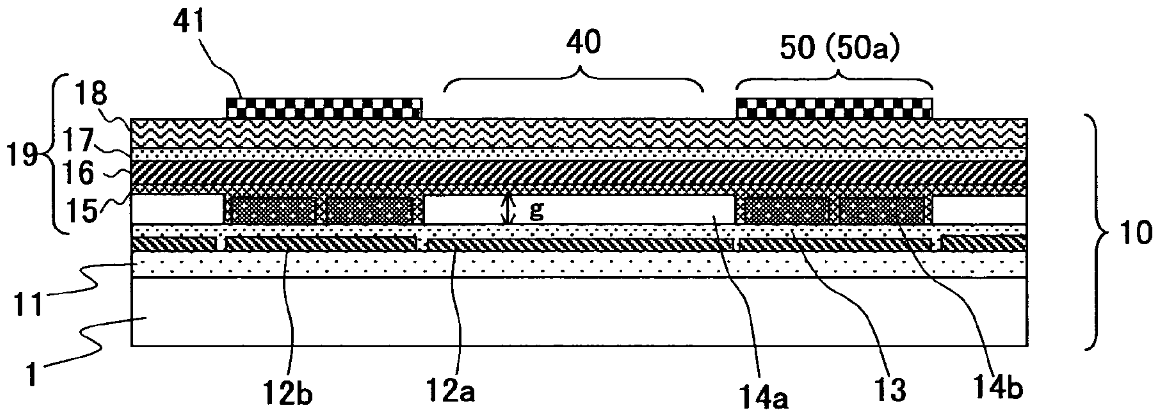
FIGS. 15A and 15B are cross-sectional views of an electrostatic actuator according to a fifth embodiment of the present invention.
Figure 15B:
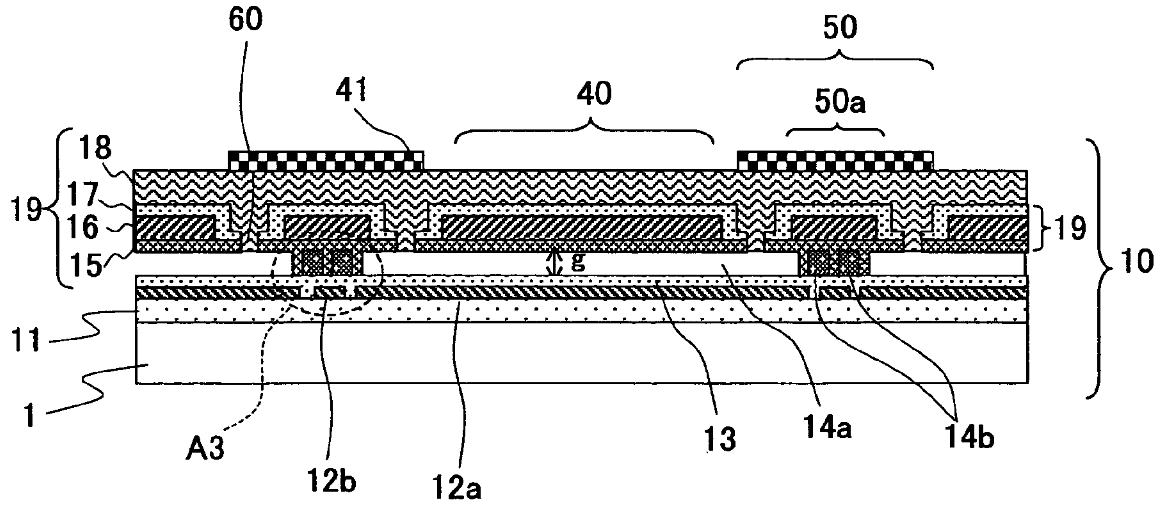

Each of FIGS. 14A and 14B and FIGS. 15A and 15B shows a cross-sectional view of an electrostatic actuator according to the fourth or fifth embodiment. FIGS. 14A and 14B show the fourth embodiment and FIGS. 15A and 15B show the fifth embodiment. In FIGS. 14A and 14B and FIGS. 15A and 15B, parts that are the same as the part shown in FIGS. 1B and 1C and FIGS. 3A and 3B are give the same reference numerals, and description thereof will be omitted. However, it does not mean to be formed of the same material.

In the fourth embodiment shown in FIGS. 14A and 14B, the vibration plate 19 comprises the insulating layer 15, the vibration plate electrode layer 16 and the insulating layer 17. On the other hand, in the fifth embodiment shown in FIGS. 15A and 15B, the vibration plate 19 comprises the insulating layer 15, the vibration plate electrode layer 16, the insulating layer 17 and the resin film 18.

In the fourth embodiment shown in FIGS. 14A and 14B, sealing members 41 are joined to the surface of the vibration plate 19 so as to seal the sacrifice layer removing holes 60. When the actuator substrate is used as an actuator without sealing the sacrifice layer removing holes 60 in the vibration plate 19, it is possible to cause a problem in that dew formation occurs in the air gap due to operation under a high-temperature environment, a change in environment (a change in humidity) or transfer between different environments, or operation failure occurs due to intrusion of foreign matters from an environment in which the actuator is used. In the present embodiment, in order to solve the above-mentioned problems, the sealing members are joined to the surface of the vibration plate so as to seal the sacrifice layer removing holes 60.

Although a thin plate is used as the sealing member 41 in the present embodiment, the present invention is not limited to such a configuration and the sealing member may be a three-dimensional configuration object. As mentioned later, when using the actuator according to the present embodiment as an inkjet head, a flow passage formation member which forms an ink flow passage (channel) is joined as the sealing member.

In the fifth embodiment shown in FIGS. 15A and 15B, the resin layer 18 is formed on the uppermost layer of the vibration plate 19, and the sealing members 41 are joined to the resin layer 18. As mentioned above, the object of forming the resin film is to seal the sacrifice layer removing holes 60 and acquire a corrosion resistance of the surface of the actuator. Since the sacrifice layer removing holes 60 are sealed or closed by the formation of the resin film, there is little possibility of dew formation in the air gap due to operation under a high-temperature environment, a change in environment (change in humidity) or transfer between different environments. Moreover, there is little possibility of operation failure due to intrusion of foreign matters from an environment in which the actuator is used.

However, since a normal resin film has permeability slightly, if the actuator is put in a special environment which is not usually in a nature, rapid penetration of moisture may not be prevented. In the present embodiment, in order to solve such a problem, the sealing members are joined further so as to completely seal the sacrifice layer removing holes 60.

Although a thin plate is used as the sealing member 41 in the present embodiment, the present invention is not limited to such a configuration and the sealing member may be a three-dimensional configuration object. As mentioned later, when using the actuator according to the present embodiment as an inkjet head, especially when using ink having a high pH value, it is necessary to form a corrosion resistant film such as a resin film, and a flow passage formation member may be further joined after the formation of the resin film.

In the fourth and fifth embodiments, the sealing member 41 can be joined onto the vibration plate 19 since the surface on to which the sealing member 41 is joined is flattened by various structures and methods as explained in the above-mentioned embodiments.

Sixth Embodiment

Figure 16:
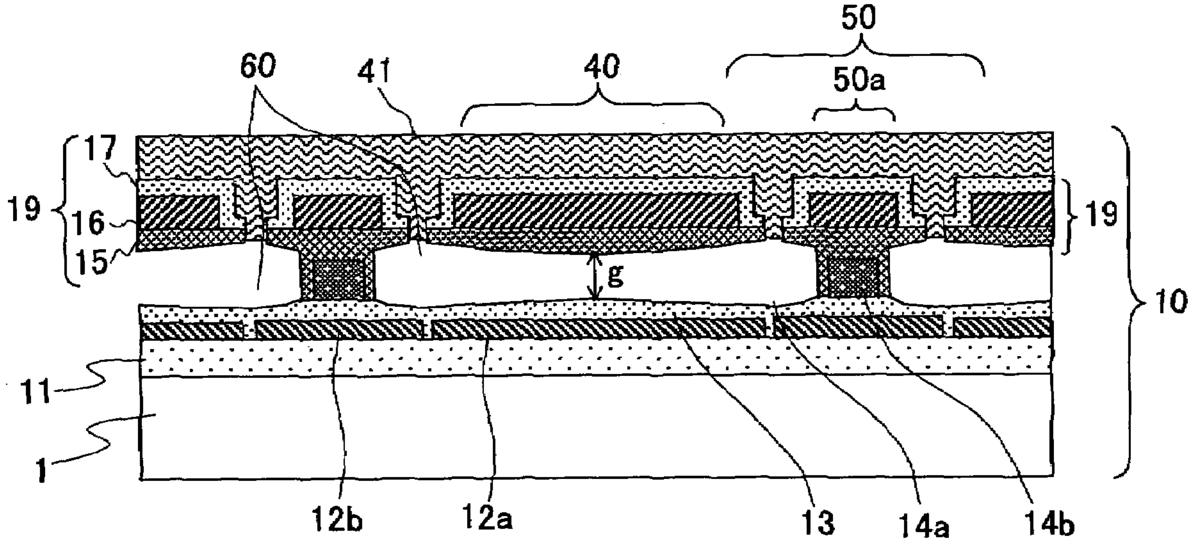
FIG. 16 is a cross-sectional view of an electrostatic actuator according to a sixth embodiment of the present invention.

A description will be now be given, with reference to FIG. 16, of a sixth embodiment according to the present invention. FIG. 16 is a cross-sectional view of an electrostatic actuator according to the sixth embodiment of the present invention. In FIG. 16, parts that are the same as the parts shown in FIG. 3B and FIGS. 6A through 6E are given the same reference numerals, and descriptions thereof will be omitted. However it does not mean to be formed of the same material.

In the present embodiment, the electrode side insulating layer 13 and the vibration plate side insulating layer 15 are given variation in their thickness in the area where the air gap 14*a* exists. The thickness of each of the insulating layer 13 and the insulating layer 15 is set to be larger in a central part of the air gap in the cross section which is taken along a line parallel to the shorter side of the vibration plate and to be smaller at opposite ends of the air gap in the cross section.

In the electrostatic actuator, when a voltage is applied across the electrode 12*a* and the vibration plate electrode 16, an electrostatic attraction force is generated in a direction of the air gap distance g, thereby deforming the vibration plate 19 toward the electrode 12*a*. The vibration plate 19 in the vibration plate movable area 40 deforms in a generally Gaussian curve (convex when viewed from the electrode 12*a*) with the partition area 50 as fixed ends, and the deformation is maximize at the center of the vibration plate. In some cases, the deformed vibration plate 19 may contact the electrode 12*a*. In such a case, the central portion of the vibration plate 19 contacts first.

Moreover, the voltage across the electrode 12*a* and the vibration plate electrode 16 is divided into the insulating layer 13, the air gap 14*a* and the insulating layer 15 at a predetermined ratio. The predetermined ratio is determined in accordance with the thickness of each insulating layer, a dielectric constant of each insulating layer, an air gap distance and a dielectric constant of the air gap. A part of the voltage which acts as the electrostatic attraction force is determined by a part of the voltage distributed to the air gap. Accordingly, if the same voltage is applied, the electrostatic attraction force increases as the thickness of each of the insulating layers 13 and 15 is reduced relative to the air gap distance "g". In other words, a low-voltage operation of the actuator can be attempted by reducing the thickness of the insulating layer 13 and/or the thickness of the insulating layer 15. On the other-hand, in order to secure the electric reliability of the actuator (for example, an initial dielectric voltage withstand and a dielectric breakdown voltage with age), a certain thickness of the insulating layers is required.

According to the above-mentioned matters, a low-voltage operation of the actuator can be achieved, while maintaining reliability, by setting the thickness of each of the insulating layers 13 and 15 at the center portion thereof, in which the deformation of the vibration plate 19 is maximum, to a value which can provide sufficient electric reliability and reducing the thickness at the opposite end portions. There is no need to vary the thickens of both the insulating layers 13 and 15, and only the thickness of the insulating layer 13 may be varied or only the thickness of the insulating layer 15 may be varied. Or, the thickness of both the insulating layers 13 and 15 may be varied as shown in FIG. 16.

Next, a description will be give, with reference to FIGS. 17A through 17G, of a manufacturing method of the electrostatic actuator. Each of FIGS. 17A through 17G is a cross-sectional view taken along a line parallel to the shorter side of the vibration plate. In FIGS. 17A through 17G, parts that are the same as the parts shown in FIGS. 12A through 12G are give the same reference numerals, and descriptions thereof will be omitted. However, it does not mean to be formed of the same material.

The process of FIGS. 17A through 17D are the same as the process of FIGS. 12A through 12D, and description thereof will be omitted.

Figure 17A:
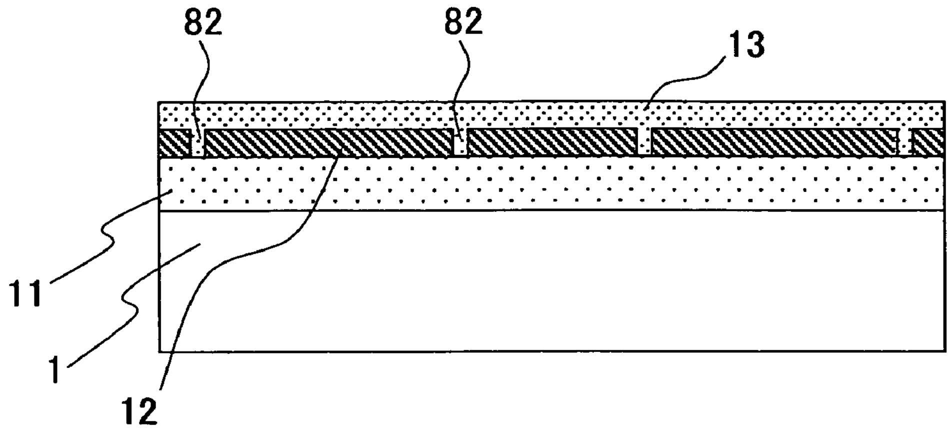
FIGS. 17A through 17G are cross-sectional views taken along a line parallel to the shorter side of the vibration plate for explaining a manufacturing process of the electrostatic actuator shown in FIG. 16.
Figure 17B:
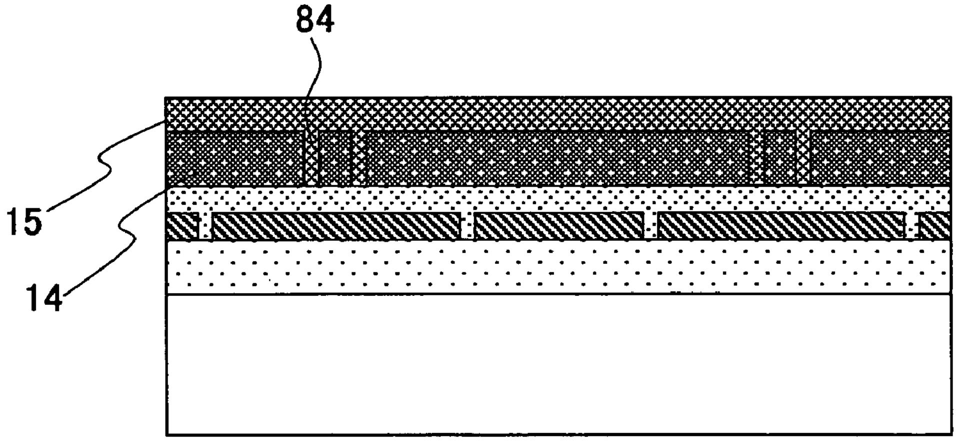
Figure 17C:
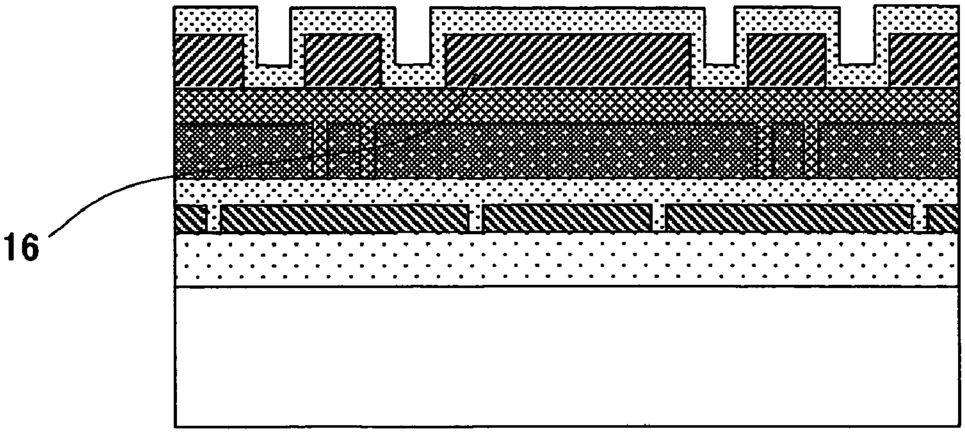
Figure 17D:
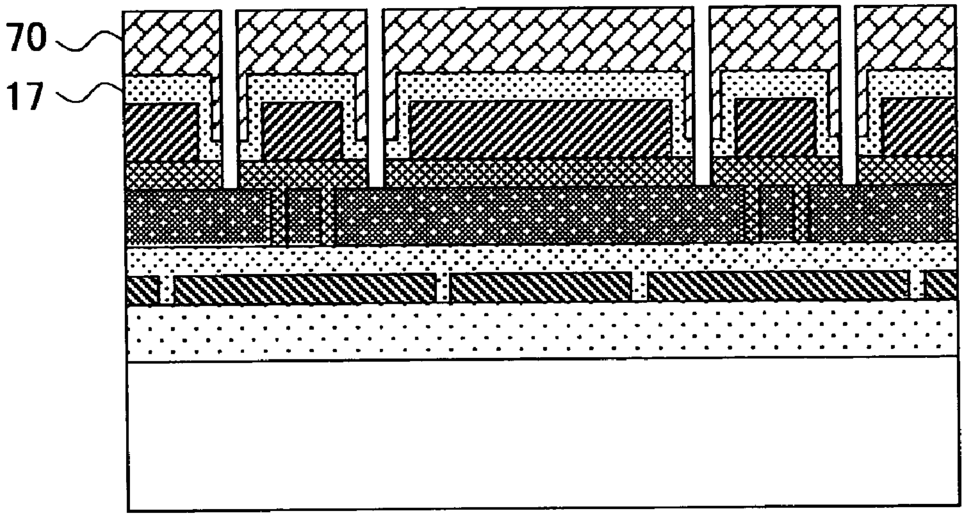
Figure 17E:
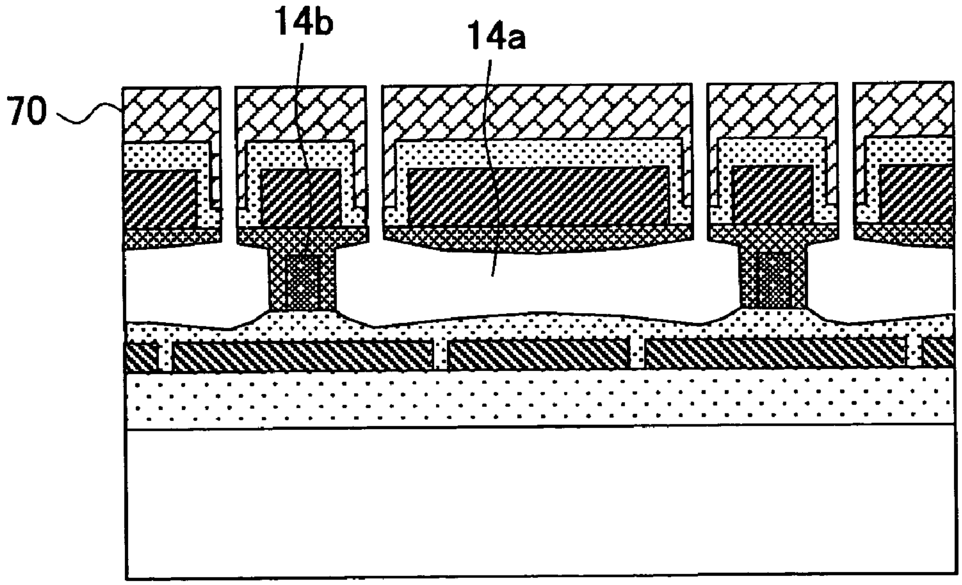

FIG. 17E shows the result of the etching process of removing the sacrifice layer. By performing the etching for removing the sacrifice layer 14, the thickness of each of the insulating layers 13 and 15 in the air gap is varied simultaneously. This process utilizes the fact that the etching for removing the sacrifice layer 14 progresses from the vicinity of the sacrifice layer removing hole 60, and the plasma etching time at the opposite ends of the air gap 14*a* is longer than the plasma etching time at the center portion of the air gap 14*a*.

The difference between the processes of FIG. 17E and FIG. 12E is that a difference is given to a etching selection ratio between the sacrifice layer 14 to be etched and the insulating layers 13 and 15 that serve as etching stoppers. That is, in the example of FIG. 17E, means is taken so that the etching selection rate becomes smaller than that of the example shown in FIG. 12E. Here, the etching selection ratio is a numerical value expressed by “an etching rate of the material of the sacrifice layer/an etching rate of the material of the insulating layer”.

As for means to change the etching selection rate, there are means to change kinds of the insulating layers 13 and 15 and/or the sacrifice layer 14, means to change the film deposition condition and/or film deposition method, means to change the etching conditions of removing the sacrifice layer 14. Although means to change the etching conditions for removing the sacrifice layer 14 is used in the present embodiment, there are various approaches also in this means. For example, a mixture ratio or an amount of flow (an amount of use) of etchant may be changed, or a power supply of plasma may be changed. Unlike the example of FIG. 12E, the etching for removing the sacrifice layer 14 is performed with the resist 70 remaining thereon in the example of FIG. 17E. This is because the reduction in the etching selection ratio between the sacrifice layer 14 and the insulating layers 13 and 15 influences the etching selection ratio between the insulating layer 17.

Figure 17F:
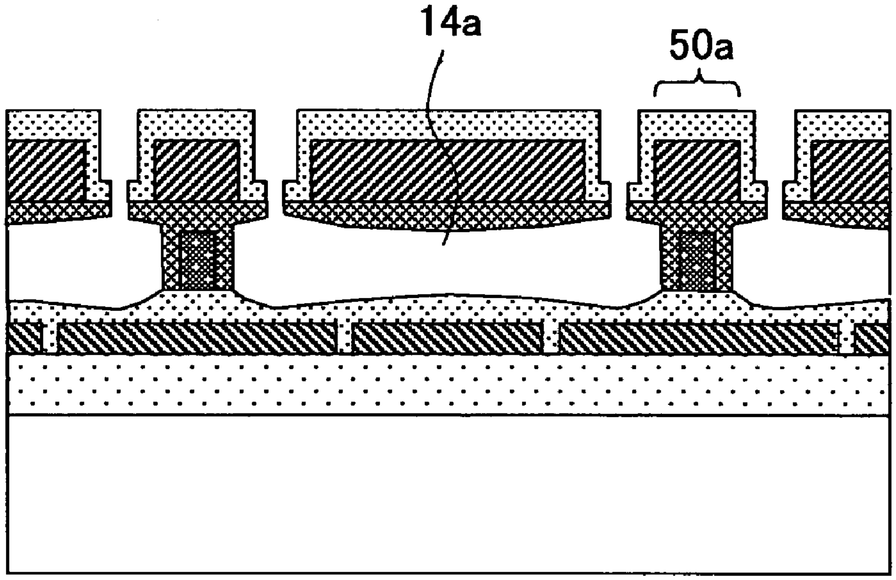

Next, the resist 70 is removed by oxygen plasma as shown in FIG. 17F.

Figure 17G:
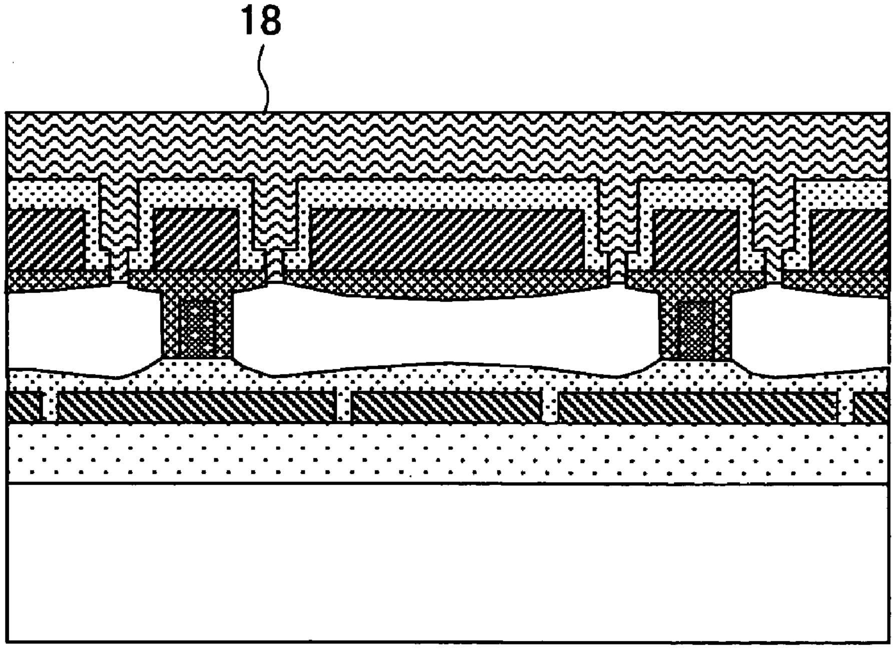

Finally, as shown in FIG. 17G, the resin film 18 serving as an uppermost layer of the vibration plate 19 is formed so as to obtain the electrostatic actuator according to the present embodiment. However, in the process of the present embodiment, since the inner surface of the air gap 14*a* is exposed to oxygen plasma after the etching for removing the sacrifice layer 14, is it necessary to perform a surface treatment using plasma of a fluorine gas before forming the resin film 18.

Seventh Embodiment

Figure 18:
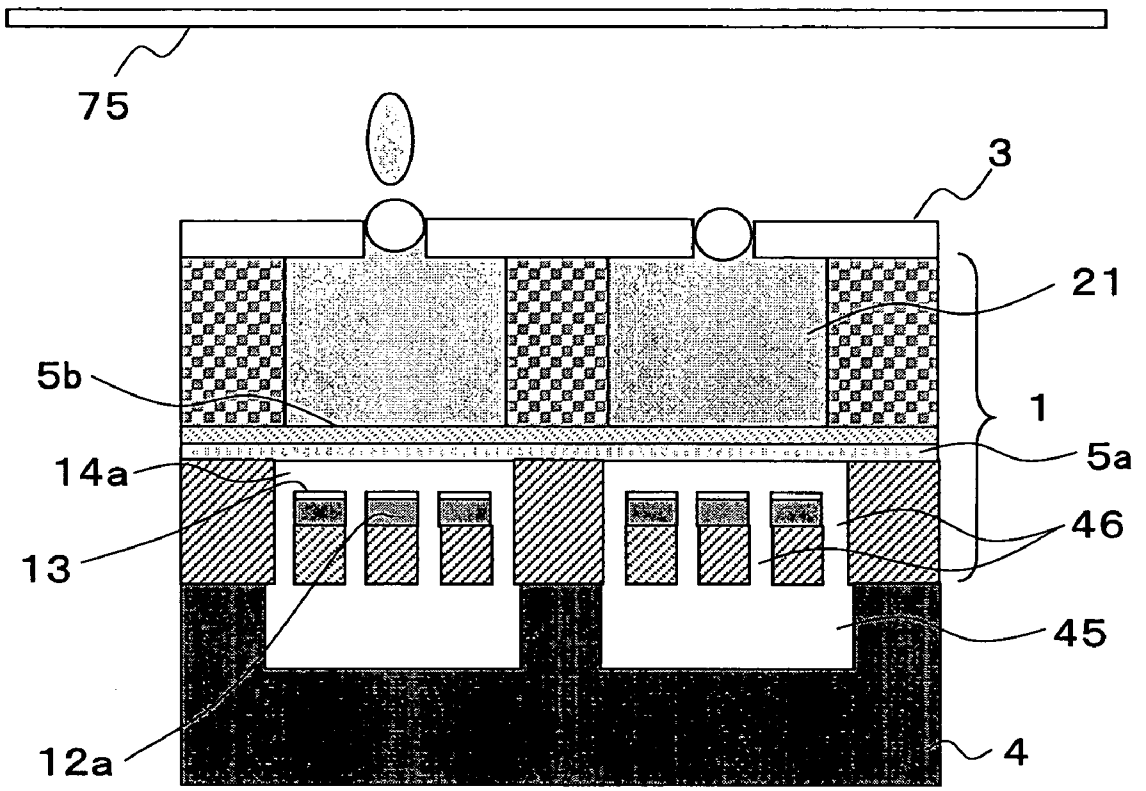
FIG. 18 is a cross-sectional view of an inkjet head according to a seventh embodiment of the present invention.

A description will now be given, with reference to FIG. 18, FIG. 19 and FIGS. 20A through 20E, of a seventh embodiment of the present invention. FIG. 18 is a cross-sectional view of an inkjet head according to the seventh embodiment of the present invention taken along a line parallel to a shorter side of a vibration plate.

The inkjet head shown in FIG. 18 comprises a first substrate (actuator forming member) 1, a second substrate 2 and a third substrate (corresponding to the nozzle forming member) 3 joined to the bottom and top surfaces of the first substrate, respectively. Similar to the above-mentioned embodiments, by joining the third substrate 3 to the first substrate 1, the liquid pressurizing chamber 21 connected to a plurality of nozzle holes 31, the common liquid chamber (not shown) and the flow restriction part are formed.

The bottom wall of the liquid pressurizing chamber 21 formed in the first substrate 1 serves as a vibration plate 19A. Individual electrodes 12*a* are formed below the vibration plate 19A so as to opposite to the vibration plate 19A with an air gap 14*a* therebetween. An electrostatic actuator is constituted by the vibration plate 19A and the individual electrodes 12*a*.

The vibration plate 19A has a two-layer structure comprising a nitride film 5*a* on the side of the electrodes 12*a* and a polysilicon film 5*b* which serves as a common electrode. As explained later, the air gap 14*a* is formed by etching a sacrifice layer 14 formed on the electrodes 12*a* after forming the electrodes 12*a* and the vibration plate 19A. Therefore, the electrode material of the vibration plate 19A is the polysilicon film, and a nitride film having a high selectivity to an etching gas is laminated as a protective film. Thereby, an electrode material having a low selectivity to etching gas can be used, which results enlargement of selection range of the process for forming the actuator substrate and cost reduction can be attempted.

The second substrate 4 joined to the bottom surface of the first substrate 1 serves as a protective substrate for protecting the first substrate 1.

Recessed parts 45 are formed in the second substrate 4 so as to form a cavity below the individual electrodes 12*a* corresponding to each air gap 14*a*. The recessed parts 45 are connected to each other by a connection groove (not shown in the figure). Additionally, each individual electrode 12*a* is partially removed so as to form connection through holes 46 so that the air gap 14*a* is connected to the cavity formed by the recessed part 45 through the connection through holes 46.

The cavity formed below the individual electrode 12*a* serves as a damper when air in the air gap 14*a* is compressed by a displacement of the vibration plate 19A. Thus, a pressure increase in the air gap 14*a* due to the displacement of the vibration plate 15A can be reduced, which results in a reduction in the drive voltage of the actuator.

Figure 19:
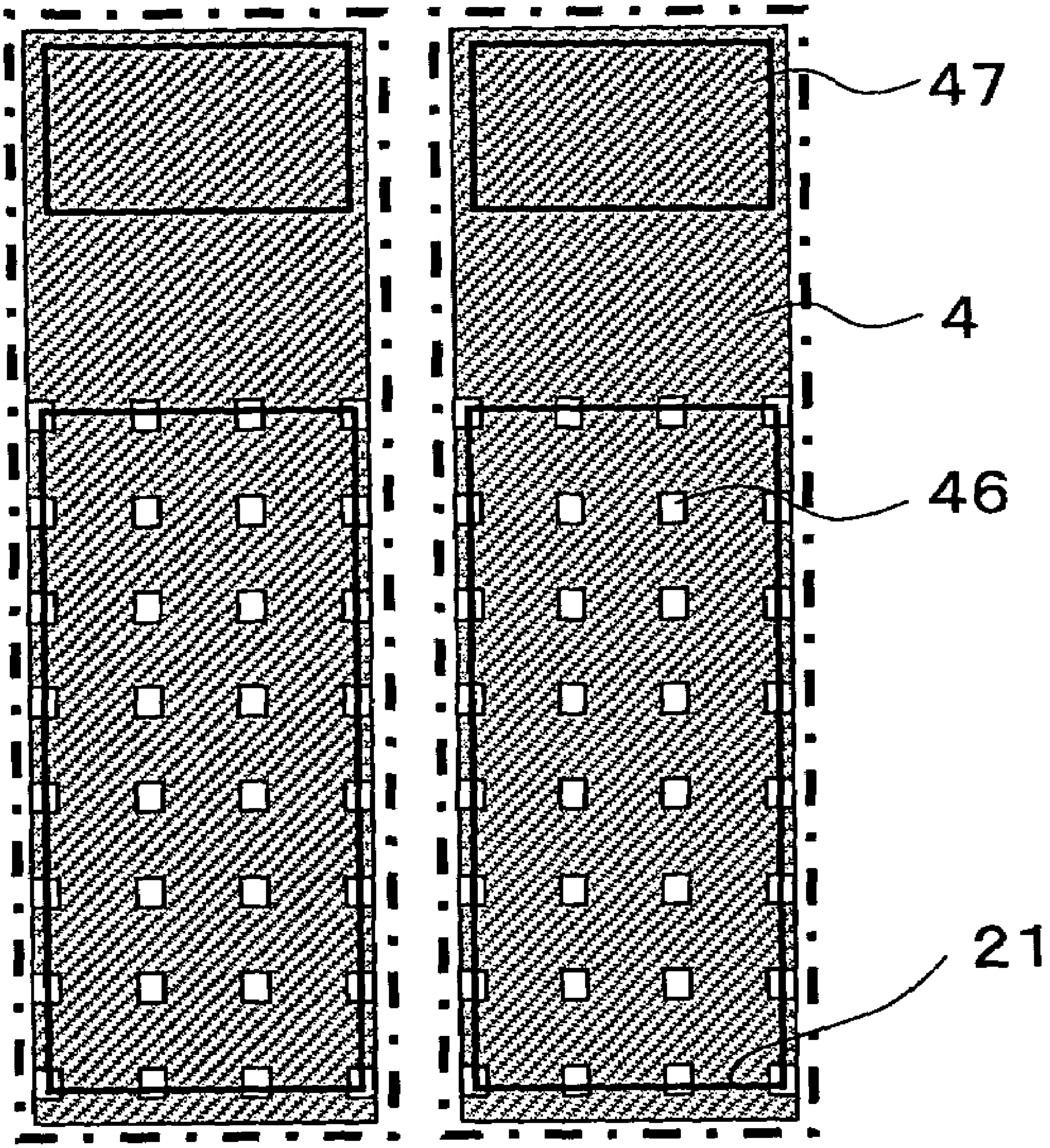
FIG. 19 is a perspective plan view of the inkjet head shown in FIG. 18.

The connection through holes 46 (corresponding to the sacrifice layer removing holes 60 in the above-mentioned embodiments) are used as through holes when etching a sacrifice layer formed between the electrodes 12*a* and the vibration plate 19A. FIG. 19 is a plan view of the inkjet head shown in FIG. 18, showing an arrangement of the connection through holes 46. As shown in FIG. 19, the connection through holes 46 are arranged in an area corresponding to the entire individual electrode 12*a* (corresponding to the each air gap 14*a*). Thus, the sacrifice layer can be removed from the entire individual electrode 12*a,* which allows the etching gas to be supplied to the area where the air gap 14*a* is to be formed, resulting in a reduction in the etching time.

A pressure adjusting recessed part and a connection hole which connects the pressure adjusting recessed part to outside are also formed in the second substrate 4. Additionally, a movable plate for pressure adjustment is formed in the first substrate so as to form a wall of a cavity defined by the pressure adjusting recessed part. Accordingly, by closing the connection through holes 46 after supplying a dry air into the air gap 14*a* and the cavities defined by the recessed part 45 and the pressure adjusting recessed part, the actuator part is not influenced by an outside environment.

Next, a description will be give, with reference to FIGS. 20A through 20E, of a manufacturing method of the above-mentioned inkjet head. FIG. 20A to 20E are cross-sectional views for explaining the manufacture method of the inkjet head.

Figure 20A:
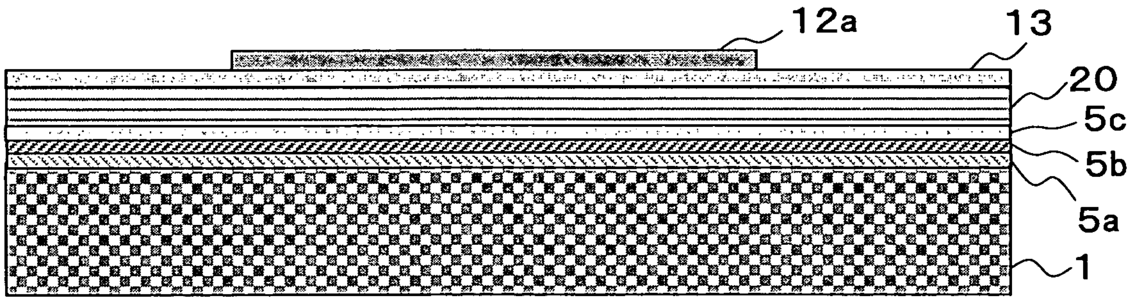
FIG. 20A through 20E are cross-sectional views for explaining a manufacturing method of the inkjet head shown in FIG. 18.

First, as shown in FIG. 20A, a nitride film 5*a* having a thickness of 0.2 μm and a polysilicon film 5*b* having a thickness of 0.1 μm are formed on a silicon substrate constituting the first substrate 1. The silicon substrate has a plane direction of (110). Additionally, in the present embodiment, an oxide film 10*c* having a thickness of 0.8 μm is formed on the polysilicon film 5*b.* Since the common electrode (the polysilicon film 5*b*) is sandwiched between the insulating layers (the nitride film 5*a* and the oxide film 5*c*), any conductive materials may be used as a material of the common electrode.

Then, a polysilicon film 20 having a thickness of 0.5 μm is formed on the oxide film 5*c*. The polysilicon film 20 is used as a sacrifice layer, and the thickness of the polysilicon film 20 defines the distance (dimension) of the air gap 14*a.*

Further, an oxide film which serves as an insulating layer 13 and the individual electrode 12*a* are formed on the polysilicon film 20. As a material of the individual electrode 12*a,* polysilicon, aluminum, TiN, Ti, W, ITO, etc. can be used.

Subsequently, the individual electrode 12*a* is patternized by a lithography etching method, and the insulating layer 13 and the polysilicon film 20 are also patternized in necessary patterns.

Figure 20B:
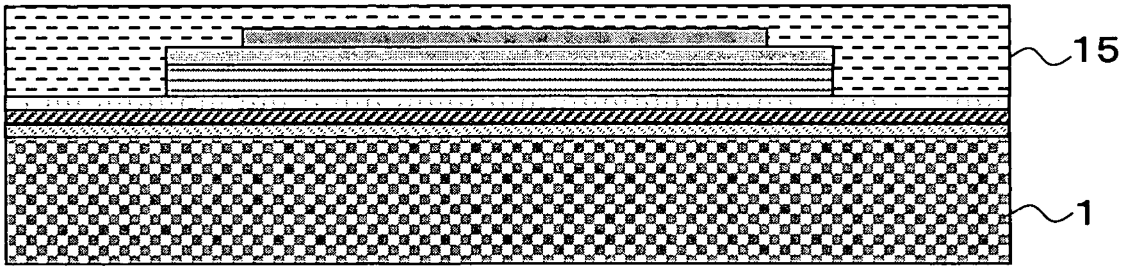
Figure 20C:
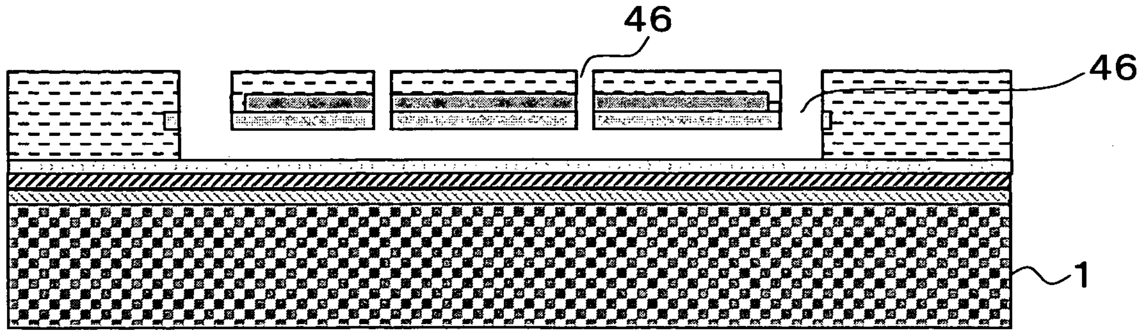

Then, as shown in FIG. 20B, an oxide film having a thickness of 5 μm, which corresponds to an insulating layer 15, is formed on the insulating layer 13 and also on the exposed surfaces of the individual electrode 12*a* and the insulating layer 15. It is preferable to flatten the surface of the insulating layer 15 by a chemical mechanical polishing (CMP) method of about 1 μm. Additionally, it is preferable to set the thickness of the insulating layer 15 greater than the thickness of the vibration plate 19A so that a rigidity of the part containing the individual electrode is equal to or greater than ten times the rigidity of the vibration plate 19A.

Next, as shown in FIG. 20, the insulating layers 13 and 15 and the individual electrode 12*a* are patternized by a lithography etching method so as to form the connection through holes 46 which are used to remove the polysilicon film 20 serving as a sacrifice layer. In addition, as shown in FIG. 19, an electrode pad part 47 is also formed in the individual electrode 12*a*. Then, an oxide film is formed, by oxidation, on the exposed surface of the individual electrode 12*a* exposed on side surfaces, and the polysilicon film 20 is removed by an isotropic dry etching method using $SF_6$.

Since the polysilicon film 20 which serves as a sacrifice layer is surrounded by the oxide films 13 and 5*c,* the sacrifice layer can be removed under a sacrifice layer etching condition providing a high electivity to the oxide films 13 and 5*c,* which results in an accurate formation of the air gap 14*a.* As for the method of removing the polysilicon film 20 serving as the sacrifice layer, a wet etching method using TMAH or a normal pressure dry etching method using $XF_2$ gas may be used.

Additionally, although, in the present embodiment, the connection through holes 46 for removing the sacrifice layer are arranged in a grid pattern, the arrangement of the connection through holes 46 is not limited to the grid pattern. A large number of connection through holes 46 may decreases the area of the individual electrode 12*a* which results in a decrease in the electrostatic attraction force generated between the individual electrode 12*a* and the vibration plate 19A. Thus, it is necessary to select the number, the configuration and dimensions of the connection through holes 46 while attempting matching with the process of removing the sacrifice layer.

Figure 20D:
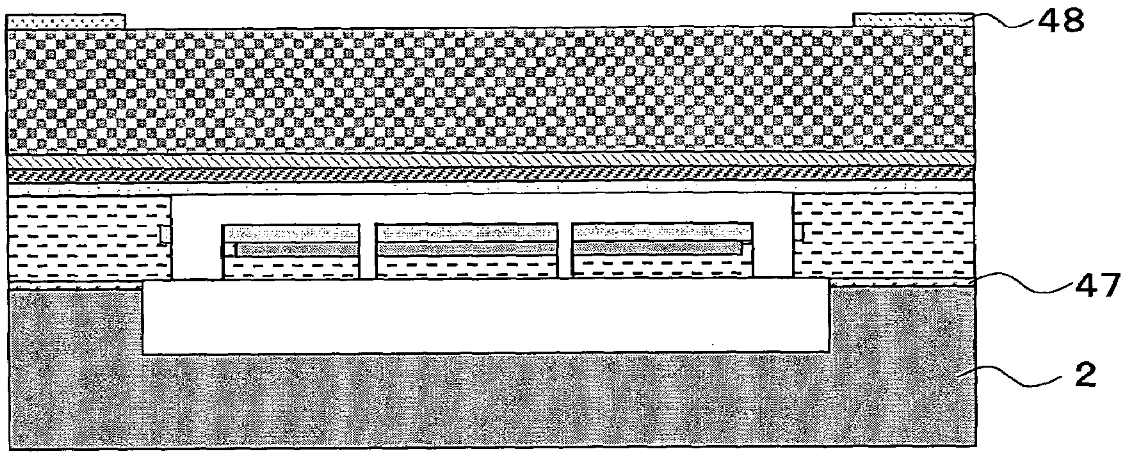
Figure 20E:
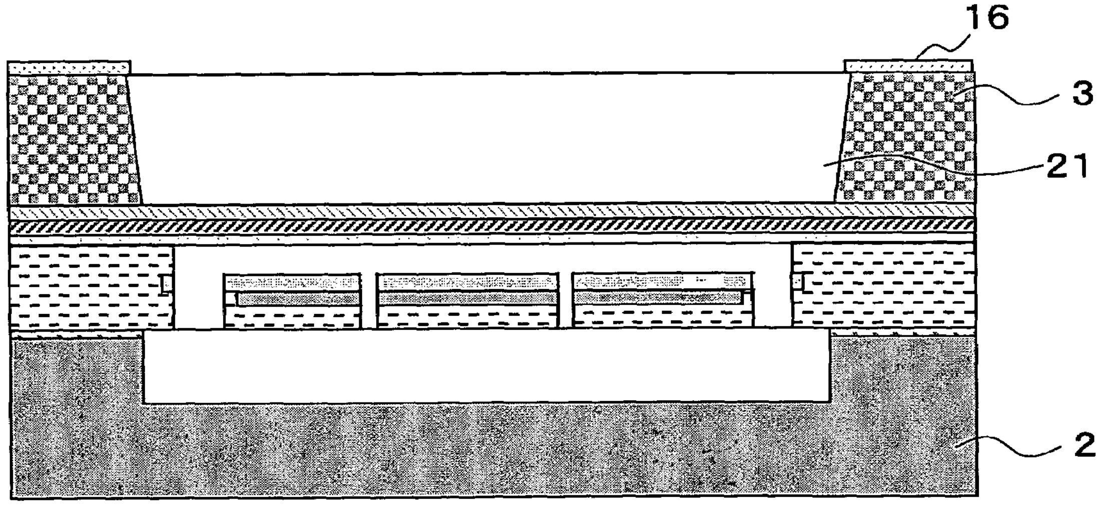

Thereafter, as shown in FIG. 20D, the second substrate having the recessed parts 45 is joined to the first substrate 1 by an adhesive 47. Then, a nitride film 48 is formed on the front surface of the first substrate 1, and the nitride film 48 is patternized in the configuration of the liquid pressurizing chamber 21 by a lithography etching method. Then, as shown in FIG. 20E, the liquid pressurizing chamber 21 is formed in the first substrate by a wet etching using KOH by using the pattern of the nitride film 48 as a mask.

It should be noted that, although not shown in the figures, finally the third substrate which is a nozzle forming member is joined to the surface of the first substrate, and the electrostatic inkjet head is completed. In the inkjet head produced by the above-mentioned manufacturing method, since the gap spacing is defied by the thickness of the sacrifice layer, the air gap can be formed with sufficient accuracy and little variation. Additionally, there is no need to perform a direct bonding or a anode bonding, and a large part of the manufacturing process is a semiconductor manufacturing process, the inkjet head having a stable performance can be manufactured at a sufficient yield rate.

Eighth Embodiment

A description will now be give of a droplet discharge head equipped with the electrostatic actuator according to the present invention.

The droplet discharge head equipped with the electrostatic actuator according to the present invention comprises: a nozzle forming member having a nozzle from which droplets of liquid are discharged; a flow passage forming member having a liquid pressurizing chamber connected to the nozzle; and an actuator forming member in which the electrostatic actuator according to the present invention is formed. The droplet discharge head according to the present invention can be used for a droplet discharge head which discharges a liquid resist in the form of a droplet, a droplet discharge head which discharge a sample of DNA in the form of a droplet or an inkjet head which discharges droplets of ink so as to print images or documents.

For example, the inkjet head comprises: one or more nozzle holes which discharge droplets of ink; a liquid pressurizing chamber (may be referred to as a discharge chamber, a pressurizing chamber, an ink chamber, a liquid chamber, a pressure chamber or an ink flow passage); a movable vibration plate which serves as a wall of the liquid pressurizing chamber; and an electrode facing the vibration plate with an air gap therebetween. An electrostatic attraction force is generated between the electrodes (vibration plate electrode and the electrode) by applying a voltage across the electrodes. Accordingly, the vibration plate is deformed by the electrostatic attraction force, and when the voltage is canceled, the vibration plate returns to its original state due to an elastic force. The returning motion of the vibration plate generates a pressure for pressurizing the ink in the liquid pressurizing chamber. Thus, a droplet of the ink is discharged from the nozzle hole by pressuring the ink in the liquid pressurizing chamber.

Figure 21:
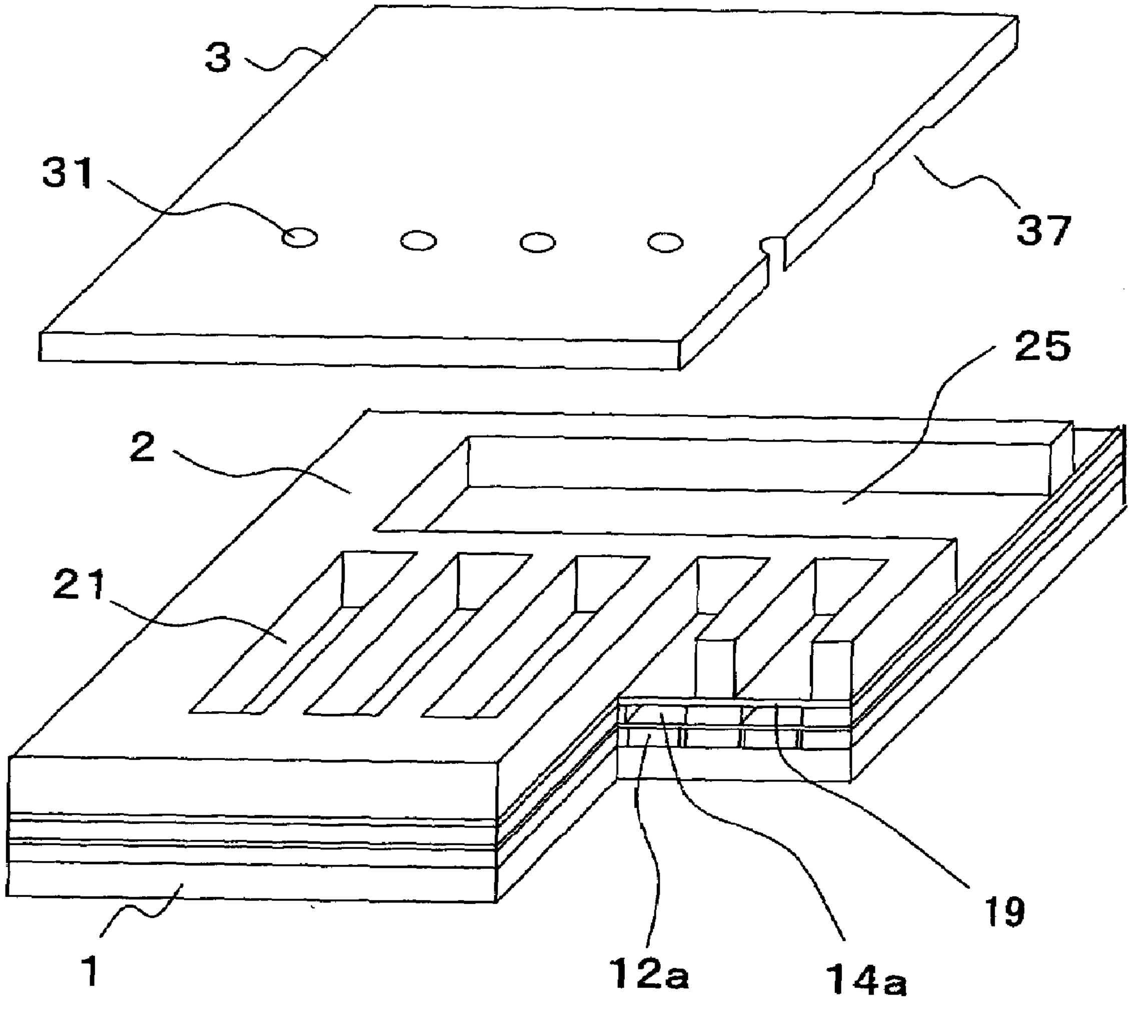
FIG. 21 is a perspective view of an inkjet head according to an eighth embodiment of the present invention in a state in which a nozzle forming member is lifted up and a part of an actuator forming member is cut away.
Figure 22:
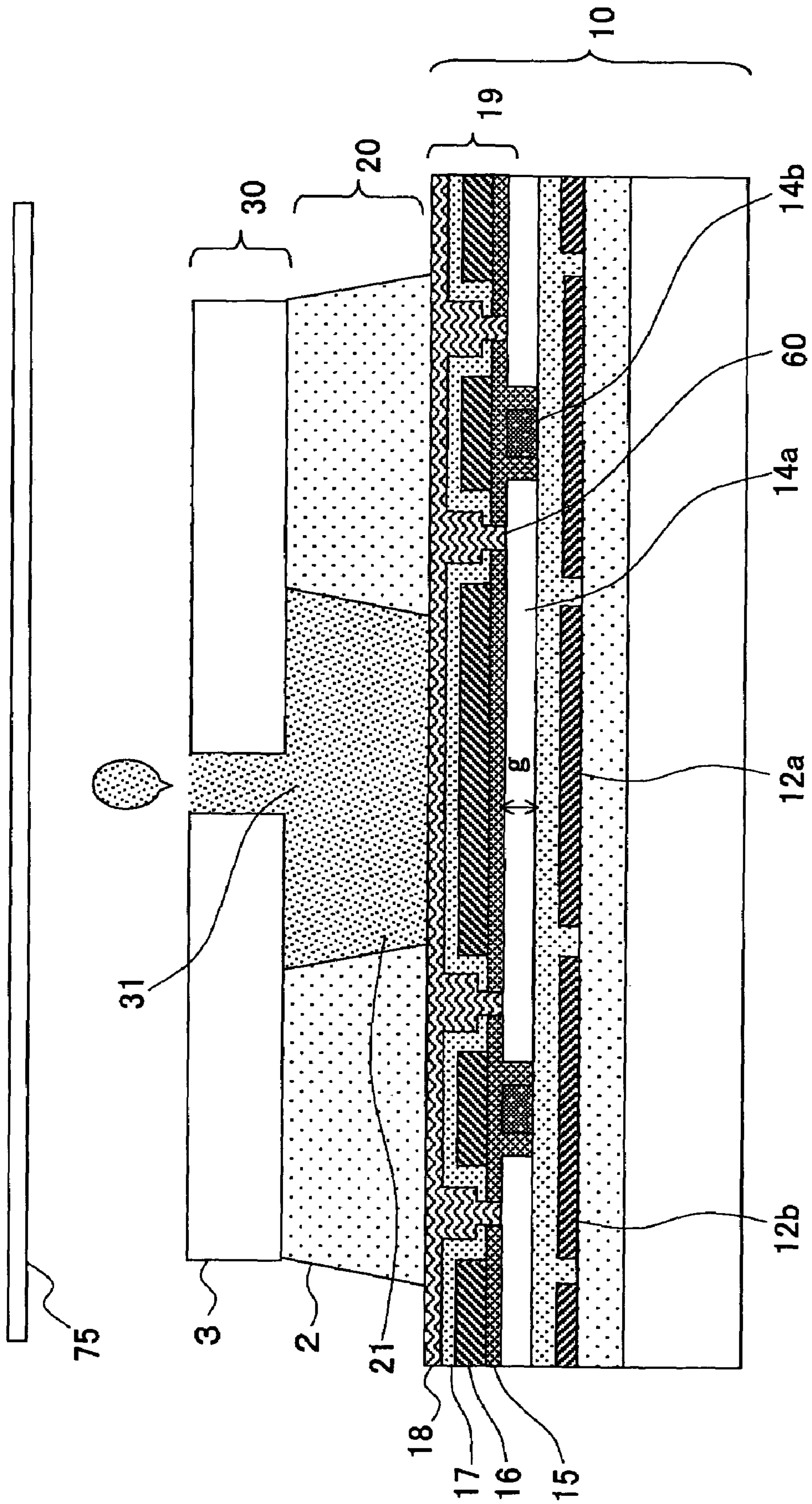
FIG. 22 is a cross-sectional view of the inkjet head taken along a line parallel to the shorter side of the vibration plate.
Figure 23A:
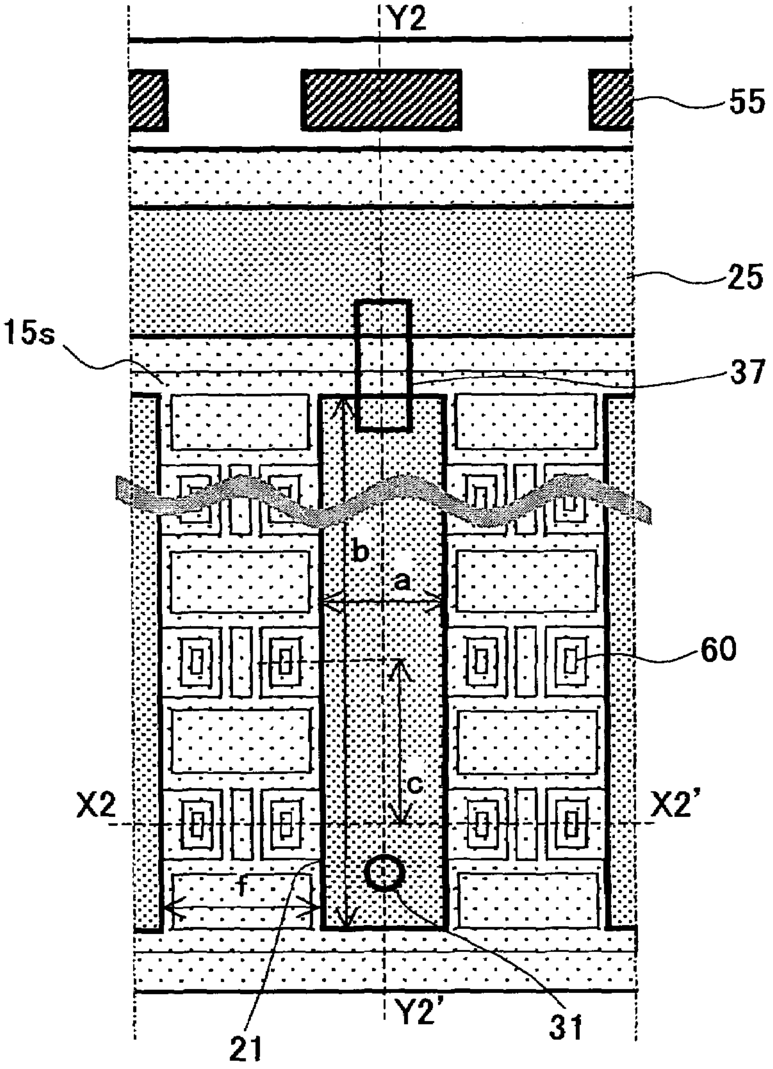
FIG. 23A is a perspective plan view of the inkjet head.
Figure 23B:
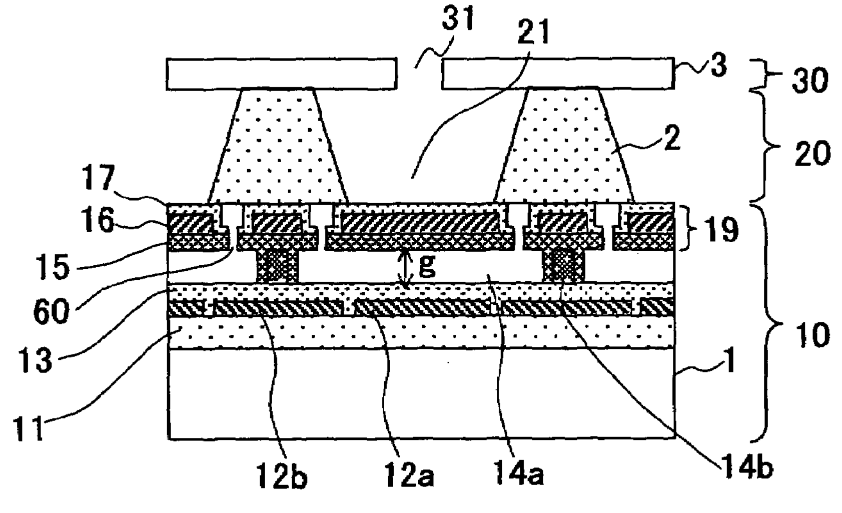
FIG. 23B is a cross-sectional view of the inkjet head taken along a line parallel to the shorter side of the vibration plate.
Figure 23C:
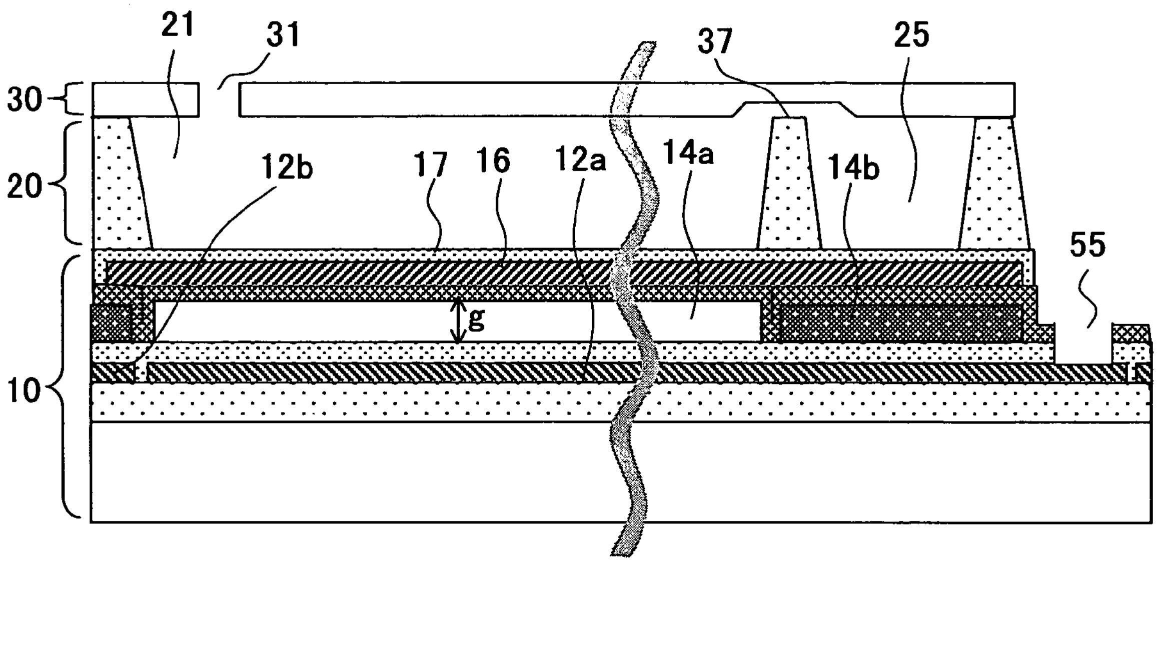
FIG. 23C is a cross-sectional view of the inkjet head taken along a line parallel to the longer side of the vibration plate.

A description will now be given, with reference to FIG. 21, FIG. 22 and FIGS. 23A, 23B and 23C, of an inkjet head which corresponds to the liquid discharge head equipped with the electrostatic actuator according to the present invention. FIG. 21 is a perspective view of the inkjet head according to the present invention in a state in which a nozzle forming member is lifted up and a part of an actuator forming member is cut away. FIG. 22 is a cross-sectional view of the inkjet head taken along a line parallel to the shorter side of the vibration plate. FIG. 23A is a perspective plan view of the inkjet head. FIG. 23B is a cross-sectional view of the inkjet head taken along a line parallel to the shorter side of the vibration plate. FIG. 23C is a cross-sectional view of the inkjet head taken along a line parallel to the longer side of the vibration plate.

The inkjet head shown in FIG. 21 is of a side shooter type (may be referred to as a face shooter type) which discharge ink droplets from a nozzle hole provided on the surface of the substrate. The inkjet head comprises an actuator forming member 10, a flow passage forming member 20 and a nozzle forming member 30, which are joined by being stacked one on another. By joining the above-mentioned three members, a liquid pressurizing chamber 21 and a common liquid chamber (common ink chamber) 25 are formed in the thus-formed structure. A plurality of nozzle holes 31, from which ink droplets are discharged, are connected to the liquid pressurizing chamber 21. The common liquid chamber 25 is provided for supplying ink to each liquid pressurizing chamber through a flow restriction part 37.

Although the flow restriction part 37 is formed on the nozzle forming member 30 in the present embodiment, the flow restriction part 37 may be provided in the flow passage forming member 20. Additionally, although the nozzle holes 31 are provided on the side surface (face surface) of the nozzle forming member 30, the inkjet head can be of an edge shooter type in which the nozzle holes are provided on an edge surface of the nozzle forming member 30 or an edge surface of the flow passage forming member 20.

In the figures, 1 denotes a substrate which forms an actuator; 11 an insulating layer; 12*a* an electrode (may be referred to as individual electrode); 12*b* a dummy electrode; 14 a sacrifice layer; 15 an insulating layer (may be referred to as a vibration plate side insulating layer); 16 a vibration plate electrode layer; 17 an insulating layer which also serves as a stress-adjustment of a vibration plate; and 18 a resin film having a corrosion resistance against ink. Additionally, 19 denotes a vibration plate constituted by the insulating layer 15, the vibration plate electrode layer 16 and the insulating layer 17. Further, 14*a* denotes an air gap formed by removing a part of the sacrifice layer; "g" a distance of the air gap; 60 a sacrifice layer removing hole (through hole); 50*a* a partition part; 14*b* a remaining sacrifice layer which remains in the partition part 14*b;* and 10 an actuator forming part in which the actuator is formed.

The actuator forming part 10 of the eighth embodiment comprises: the substrate 1 which forms the actuator; the electrode layer 12 (electrodes 12*a* and dummy electrodes 12*b*) formed on the substrate 1; the partition parts 50*a* formed on the electrodes layer 12; the vibration plate 19 which is formed on the partition parts 50*a* and is deformable by an electrostatic force generated by a voltage applied to the electrodes 12*a;* and the air gap 14*a* formed between adjacent partition parts 50*a*. The air gap 14*a* is formed by removing by etching parts of the sacrifice layer 14 formed between the electrodes 12*a* and the electrodes 16 of the vibration plate 19. It is noted that other parts of the sacrifice layer 14, which are not removed by etching, remain in the partition parts 50*a* as the remaining sacrifice layer 14*b*.

The actuator forming member 10 is formed by repeating a film deposition and film processing (photo-lithography and etching) so as to form electrodes and insulation layers on a substrate having a high degree of cleanness. A high-temperature process may be used to form the actuator forming member by using silicon to make the substrate 1. It should be noted that the high-temperature process refers to a process for forming a high-quality film such as a thermal oxidizing method or a thermal nitriding method, a thermal CVD method which forms a high-temperature oxide film (HTO) or an LP-CVD method which forms a good-quality nitride film. By adopting the high-temperature process, high-quality electrode materials and insulating materials become usable, which can provide an actuator device having excellent conductivity and insulation. Moreover, the high-temperature process is excellent in controllability and reproducibility of a film thickness, thereby providing an actuator device having little variation in the electric properties. Further, since the controllability and reproducibility are excellent, process design becomes easy and a mass production at low cost can be achieved.

The electrode layer 12 is formed on the insulating layer 11 which is formed on the substrate 1, and is divided into each channel (each drive bit) by separation grooves 82. As shown by a part A3 encircled by a dotted line in FIG. 3B, the separation grooves 82 are filled by the insulating layer 13 formed on the electrode layer 12. Thus, by dividing the electrode layer 12 by separation grooves 82 and covering the electrode layer 12 by the insulating layer 13 so as to fill the separation grooves 82 by the insulating layer 13, it becomes possible to form a flat surface having little step or unevenness in a subsequent process. As a result, an actuator having high-accuracy in dimensions and little variation in electric properties can be obtained.

In order to completely fill the separation grooves 82 by the insulating layer 13, it is preferable to set a thickness of the insulating layer 13 equal to or greater than ½ of a width of the separation groove so as to form the surface of the insulating layer substantially flat. Or, it is preferable to set the width of the separation groove equal to or smaller than twice the thickness of the insulating layer. According to the above-mentioned relationship, the separation groove can be completely filled by the insulating layer, which results in a substantially flat surface of the insulating layer. Thus, since a surface level difference can be mostly eliminated by forming the insulating layer with a thickness equal to or greater than ½ of the width of the separation groove of the electrode layer, subsequent processes explained below, such as an air gap forming process, a resin film forming process or a joining process with other members, can be easily performed. As a result, an actuator having an air gap with an accurate distance thereof can be obtained, and, at the same time, it can be attempted to reduce a cost and improve reliability.

Here, as a material of the electrode layer 12 for forming the electrodes 12*a*, a compound silicide such as polysilicon, titanium silicide, tungsten silicide or molybdenum silicide or a metal compound such as titanium nitride may be preferably used. Since these materials can be deposited and processed with a stable quality and can be made into a structure which withstands a high-temperature process, there is less restriction with respect to temperatures in other processes. For example, a HTO (High-Temperature-Oxide) film or the like can be laminated on the electrode layer 12 as the insulating layer 13, the HTO film being an insulating layer having high reliability. Thus, the selection range can be enlarged, and cost reduction and improvement of reliability can be attempted. Additionally, a material such as aluminum, titanium, tungsten, molybdenum or ITO can also be used. By using these materials, a remarkable resistance reduction can be attempted, which results in reduction in a drive voltage. Additionally, since deposition and processing of films made of these materials can be easily achieved with a stable quality, cost reduction and improvement of reliability can be attempted.

Although the air gap 14*a* is formed by removing by etching parts of the sacrifice layer 14, other parts of the sacrifice layer 14, which parts are indicated by 14*b* and embedded in the partition parts 50*a* in FIGS. 1B, remain without being removed in the present invention.

Since the distance "g" of the air gap 14*a* is accurately defined by the thickness of the sacrifice layer 14 by forming the air gap 14*a* by the removal of the parts of the sacrifice layer 14, variation in the distance "g" of the air gap 14*a* is extremely small, thereby achieving an accurate actuator having little variation in characteristics.

Additionally, since foreign substance is prevented from entering the air gap, it can be produced at a stable yield and a reliable actuator can be obtained.

Further, since the sacrifice layers 14*b* remain in the partition parts 50*a* and the vibration plate 10 is firmly fixed by the partition parts 50*a*, the accuracy of the distance "g" of the air gap 14*a* can be well-maintained and the actuator is excellent in structural durability. Moreover, since the sacrifice layer 14*b* remain in the partition parts 50*a*, there is little step or unevenness on the surface of the vibration plate 19, which results in substantially flat surface being formed on the actuator forming member 10. Thus, a formation of a resin film as mentioned later or a process for joining the actuator to other members can be easily performed, which results in cost reduction and improvement of reliability.

Here, as a material of the sacrifice layer 14, it is preferable to use polysilicon or amorphous silicon. These materials are most easily removable by etching, and it is preferable to use an isotropic dry etching method using $SF_6$ gas, a dray etching method using $XeF_2$ gas or a wet etching method using a solution of tetra methyl ammonium hydroxide (TMAH). Additionally, since polysilicon and amorphous silicon are generally-used, inexpensive materials and withstand a high temperature, a degree of freedom of a process in a subsequent process is also high. Further, since variation in the distance "g" of the air gap 14*a*, which is very important, can be extremely small by arranging silicon oxide films (insulating layers 13 and 15) having a high etching resistance above and below the sacrifice layer 14, an accurate actuator having little variation in properties can be obtained. Moreover, mass production is also easy at low cost.

As for a material of the sacrifice layer 14, titanium nitride, aluminum, silicone oxide or a resist material (for example, a photosensitive resin material used for photolithography) can be used. Although an etchant (etching material) and the air gap forming process depend on the material forming the sacrifice layer 14 and process difficulty and process cost thereof may also vary depending on the material of the sacrifice layer 14, the material of the sacrifice layer 14 can be selected based on its purpose.

When a silicone oxide film is used for the sacrifice layer 14, it is preferable to use polysilicon as a protective film (etching stopper) of the etching of the sacrifice layer. The polysilicon film may be commonly used for the electrode layer 12 and the vibration plate electrode layer. In order to remove the oxide film forming the sacrifice layer, it is preferable to use a wet etching method, a HF vapor method, a chemical dry etching method, etc. If an insulating layer is needed inside the air gap 14*a*, the insulating layer may be formed by oxidizing the polysilicon film remaining as an etching stopper. Thus, if a silicon oxide film is used as the sacrifice layer, the removal of the sacrifice layer can be performed by using etching materials used in semiconductor manufacturing processes. Additionally, if polysilicon films are formed on both sides of the sacrifice layer, a manufacturing process with little variation can be achieved. Further, the polysilicon film can be uses as an electrode as it is, which enables mass production at a low cost. Moreover, the thus-obtained actuator also provides high quality and accuracy.

Moreover, similar process can be achieved by various combinations of the material of the sacrifice layer and the etchant. For example, the sacrifice layer 14 may be removed by $O_2$ plasma or an exfoliation liquid when a polymer material is used for the sacrifice layer 14. The sacrifice layer 14 may be removed by a liquid such as KOH when aluminum is used for the sacrifice layer 14. The sacrifice layer 14 may be removed by chemical such as a mixture solution of $NH_3OH$ and $H_2O_2$ when titanium nitride is used for the sacrifice layer 14.

The vibration plate 19 is constituted by a laminated film having the insulating layer 15, the vibration plate electrode layer 16 which serves as a common electrode and the insulating layer 17 which also serves as stress adjustment of the vibration plate, stacked in tern. It should be noted that the insulating layer 15 serves as a protective film (etching stopper) of etching the sacrifice layer, and contributes also as a protective film for leaving the sacrifice layer 14*b* of the partition parts 50*a*. The insulating layer 15 on the wall surfaces of the sacrifice layer 14*b* corresponds to a material that has been filled in separation grooves 84 formed in the sacrifice layer 14 during the manufacturing process.

Steps or unevenness formed on the surface of the insulating layer 15 can be made small by filling the insulating layer 15 in the separation grooves 84 which divide the sacrifice layer 14. Moreover, the sacrifice layer 14*b* can remain in the partition parts due to existence of the insulating layer 15 filled in the separation grooves 84. The effect of small steps or unevenness is as mentioned above.

Moreover, since the filled insulating layer is securely fixed to the wall surfaces of the sacrifice layer 14*b*, which results in the vibration plate 19 being firmly fixed by the partition parts 50*a*, an accuracy of the distance "g" of the air gap 14*a* of the thus-obtained actuator is high and also excellent in structural durability.

Additionally, similar to the case of filling the insulating layer 13 in the separation grooves 82 of the electrode layer 12, it is preferable to form the insulating layer 15 with a thickness equal to or less than ½ of the width of the separation grooves 84 of the sacrifice layer 14 in the case where the insulating layer 15 is filled in the separation grooves 84 of the sacrifice layer 14. The effect of such is the same as that explained before.

As a material of the vibration plate electrode layer 16 which constitutes a part of the vibration plate 19, materials such as polysilicon, titanium silicide, tungsten silicide, molybdenum silicide, titanium nitride, aluminum, titanium, tungsten, molybdenum may be used for the same reason as the material of the electrode layer 12. Additionally, a transparent film such as an ITO film, a nesa film or a ZnO film can also be used. When the transparent film is used, the inspection inside the air gap 14*a* can be easily performed. Thus, an abnormality can be detected during a manufacturing process, which contributes to an attempt of cost reduction and improvement of reliability.

As mentioned above, since the surface of the actuator forming member 10 (surface of the vibration plate 19) is made flat, the flow passage forming member 20 and the nozzle forming member 30 can be joined to the surface of the actuator forming member 10 with sufficient accuracy.

In the flow passage forming member 20, the liquid pressurizing chamber 21 is formed in a portion corresponding to the vibration plate movable portion (corresponding to the air gap 14*a* in the figure) of the actuator forming member 10, and the common liquid chamber 25 are formed for supplying ink to each liquid pressurizing chamber 21. Moreover, although not illustrated in the figure, an ink supply port connected to the common liquid chamber is provided so as to supply ink from outside.

In the present embodiment, the flow passage substrate 2 of the flow passage forming member 20 is formed of a nickel plate having a thickness of about 150 μm. For the purpose of simplification, the substrate 2 is formed by mechanical punching for the purpose of simplification, or formed by a known photographic process technique and a wet etching technique. As a material of the flow passage forming substrate 2, a stainless steel (SUS) substrate, a glass substrate, a resin plate or a resin film, a silicon substrate, or a lamination substrate of the aforementioned may be used. Especially, since a silicon (110) substrate can be etched by anisotropical etching in a perpendicular direction, it is very useful for forming a high-density head.

There are some methods of joining the flow passage forming member 20 to the actuator forming member 10. In a case of using an adhesive, as one example, the adhesive layer can be made thin by applying a pressing force, which results in a high assembling accuracy and high ink sealing. Therefore the joining method using an adhesive can provide a high-quality inkjet head.

The nozzle forming member comprises the nozzle substrate 3 formed of a nickel plate having a thickness of 50 μm. The nozzle holes 31 are provided on the surface part of the nozzle substrate 3 so the nozzle holes 31 are connected to the respective liquid pressurizing chambers 21. Additionally, grooves which correspond to the flow restriction parts 37 are provided on the surface of the nozzle substrate facing the flow passage forming member 20. As a material of the nozzle substrate 3, a stainless steel (SUS) substrate, a glass substrate, a resin plate or a resin film, a silicon substrate, or a lamination substrate of the aforementioned may be used.

Next, a brief description will be given of an operation of the thus-formed inkjet head. When a pulsed voltage of 40 V is applied from an oscillation circuit (drive circuit) to the electrode 12*a* in a state where the liquid pressurizing chamber 21 is filed by ink, the surface of the electrode 12*a* is charged with a positive potential. Accordingly, an electrostatic attraction force is generated between the electrode 12*a* and the vibration plate electrode 16, thereby deforming or bending the vibration plate 19 toward the electrode 12*a*. Thus, the pressure in the liquid pressurizing chamber 21 is decreased, which allow ink to flow into the liquid pressurizing chamber 21 from the common liquid chamber 25 through the flow restriction part 37.

Thereafter, when the pulsed voltage is decreased to zero, the vibration plate 19, which has been deformed by the electrostatic force, returns to its original shape due to its elasticity. Consequently, the pressure of the ink in the liquid pressurizing chamber 21 rises rapidly, and a droplet of ink is discharged from the nozzle hole 31 toward a recording paper as shown in FIG. 22. The discharge of ink droplet can be continuously carried out by repeating the above-mentioned operation.

Here, the electrostatic attraction force F generated between the vibration plate electrode 16 and the electrode 12*a* increases in inverse proportion to the distance between the electrodes. Thus, it is important to form a small distance of the air gap 14*a* (air gap distance g) between the electrode 12*a* and the vibration plate 19.

Then, as mentioned above, a small air gap can be formed with sufficient accuracy by forming the air gap 14*a* by the sacrifice layer etching method A description will now be given, with reference to FIGS. 24A through 24F, of a manufacturing method of the inkjet head according to the present embodiment. Each of FIGS. 24A through 24F is a cross-sectional view taken along a line parallel to the shorter side of the vibration plate.

In this process, the actuator is produced by sequentially depositing an electrode material, a sacrifice layer material and a vibration plate material on the actuator substrate 1.

Figure 24A:
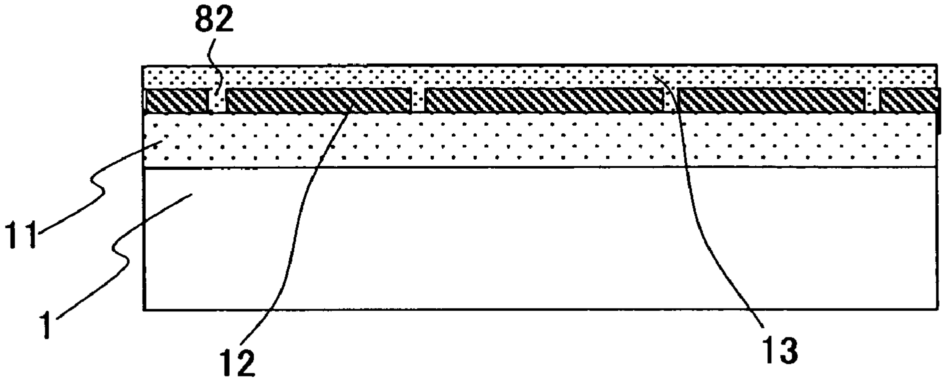
FIGS. 24A through 24F are cross-sectional views taken along a line parallel to the shorter side of the vibration plate for explaining a manufacturing process of the inkjet head shown in FIG. 21.

First, as shown in FIG. 24A, a thermal oxidation film, which corresponds to the insulating layer 11, is deposited onto a silicon substrate, which has a plane direction of (100) and corresponds to the substrate 1, by a wet oxidation method, for example, with a thickness of about 1.0 μm. Then, polysilicon which turns to the electrode layer 12 is deposited on the insulating layer 11 with a thickness of 0.4 μm, and phosphorus is doped into the polysilicon of the electrode layer 12 so as to reduce a resistance. After forming separation grooves 82 in the electrode layer 12 by a lithography etching method (a photographic process technique and an etching technique), that is, after forming the electrodes 12*a* and dummy electrodes 12*b*, a high-temperature oxide film (HTO film) is formed with a thickness of 0.25 μm as the insulating layer 13. At this time, the separation grooves 82 of the electrode layer 12 are filled by the insulating layer 13 so that the surface of the insulation layer 13 is flat. It should be noted that the electrode 12*a* is extended to the electrode pad 55.

Figure 24B:
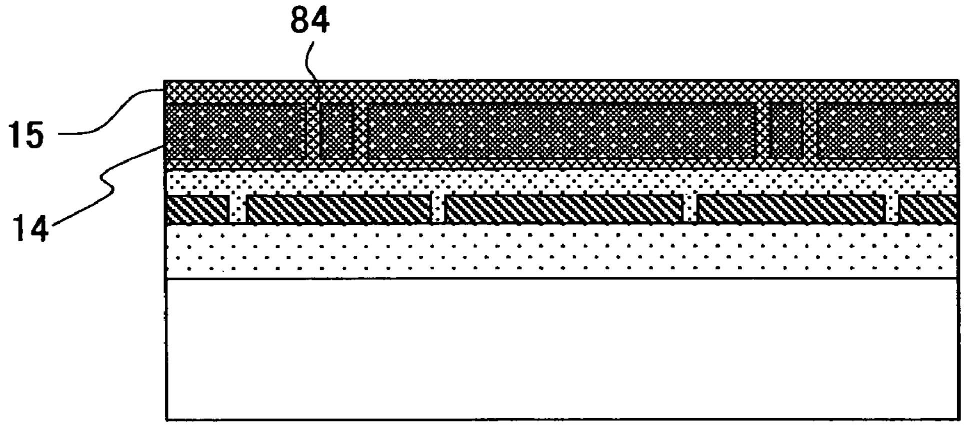

Subsequently, as shown in FIG. 24B, after depositing the polysilicon, which serves as the sacrifice layer 14, on the insulating layer 13 with a thickness of 0.5 μm, separation grooves 82 are formed in the sacrifice layer 14 by a lithography etching method, and further a high-temperature oxide film (HTO film) is deposited with a thickness of 0.1 to 0.3 μm as the insulating layer 15. At this time, the width of the separation grooves 84 is preferably equal to a width by which the separation grooves 84 can be filled by the structural layers such as the insulating layer 15. Although it depends on the thickness of the vibration plate 19, it is preferable to set the width equal to or less than 2.0 μm. In the present embodiment, the width of the separation grooves 84 is set to 0.5 μm.

Thus, the vibration plate 19 can be formed with a substantially flat surface having little unevenness in the subsequent process by dividing the sacrifice layer 14 by the separation grooves 84 and embedding the sacrifice layer 14 in the insulating layer 15 or the vibration plate layer 19 (the insulation layer 15, the vibration plate electrode layer 16 and the insulating layer 17). Accordingly, the surface of the actuator substrate can be flattened and process design of subsequent processes becomes easy.

Figure 24C:
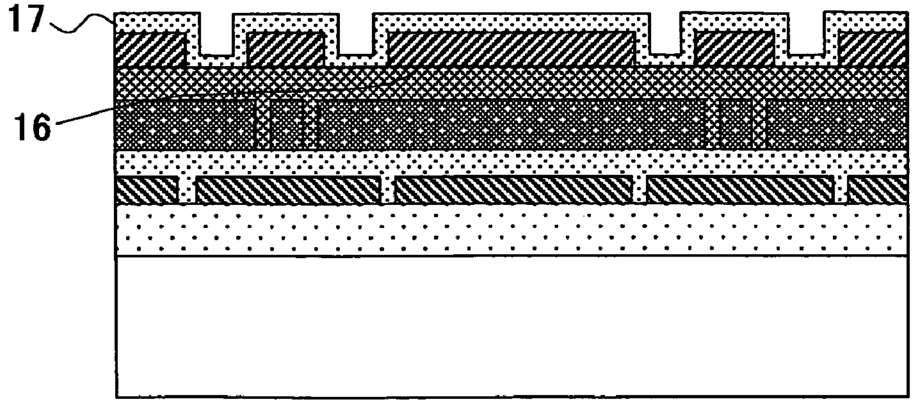

Furthermore, as shown in FIG. 24C, phosphorus-doped polysilicon, which turns to the vibration plate electrode layer (common electrode) 16, is deposited with a thickness of 0.2 μm. Then, the vibration plate electrode layer 16 is etched by a lithography etching method with a pattern oversized from the sacrifice layer removing holes 60 in an area where the sacrifice layer removing holes 60 are formed later.

Subsequently, the insulating layer 17 is formed with a thickness of 0.3 μm. The insulating layer 17 serves as a stress adjustment (bending prevention) film for preventing the vibration plate from being bent or deformed. In the present embodiment, the insulating layer 17 is a laminated film of a nitride film having a thickness of 0.15 μm and an oxide film having a thickness of 0.15 μm.

Figure 24D:
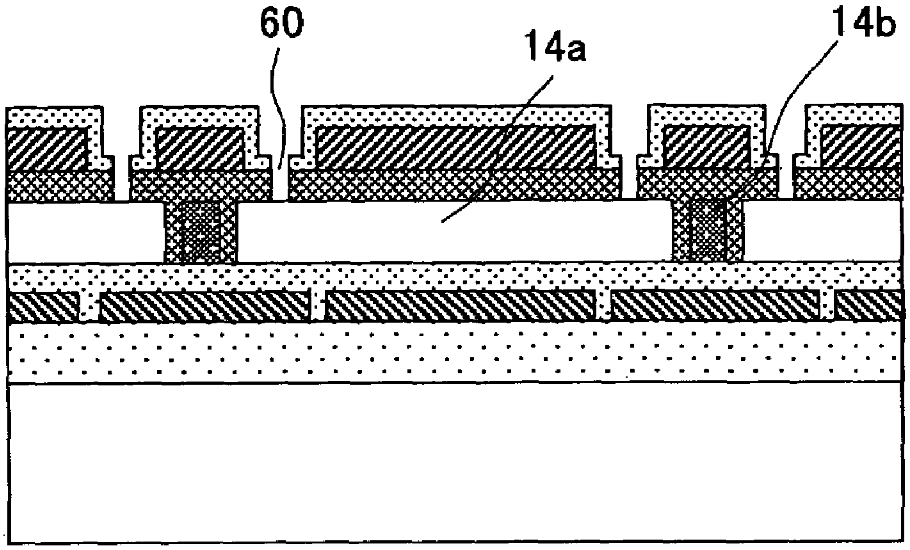

Next, as shown in FIG. 24D, the sacrifice layer removing holes 60 are formed by a lithography etching method.

Then, the etching for removing the sacrifice layer 14 is performed by isotropic dry etching using $SF_6$ gas. It should be noted that a wet etching using alkaline etching liquid such as KOH or TMAH may be used, or a dray etching using $XeF_2$ gas may be used.

Since the sacrifice layer (polysilicon) 14 is surrounded by an oxide film, the sacrifice layer 14 can be removed under a sacrifice layer removing condition which provides high electivity with respect to the oxide film, thereby forming the air gap 14*a* with sufficient accuracy.

Moreover, the sacrifice layer 14*b*, which is separated by the insulating layer 15 filled in the separation grooves 84, is remained in each partition part 50*a*, which allows to form a substantially flat surface of the actuator substrate.

It should be noted that since the etching for removing the sacrifice layer is isotropic etching, it is preferable to arrange the sacrifice layer removing holes 60 at an interval equal to or smaller than the length "a" of the shorter side of the air gap (movable vibration plate).

Figure 24E:
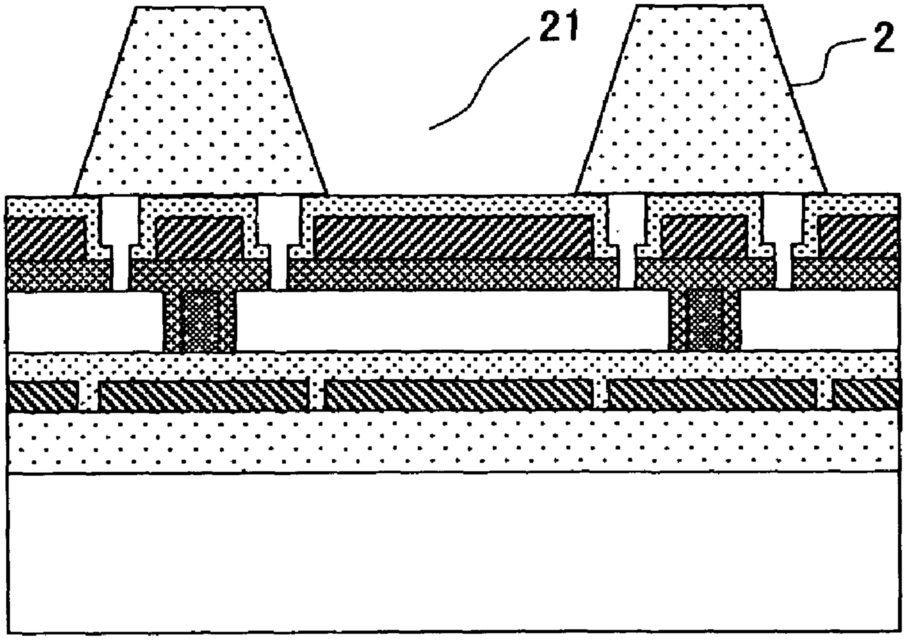

Thereafter, as shown in FIG. 24E, the flow passage forming member 20, in which the liquid pressurizing chamber 21 and the common liquid chamber 25 are formed, is joined to the thus-formed actuator forming member 10 by an adhesive. At this time, since the surface of the actuator forming member 10 is made flat, the adhesive joining is easily performed. Additionally, the air gap 14*a* can be completely sealed by closing the sacrifice layer removing holes 60 by the flow passage forming member 20.

Figure 24F:
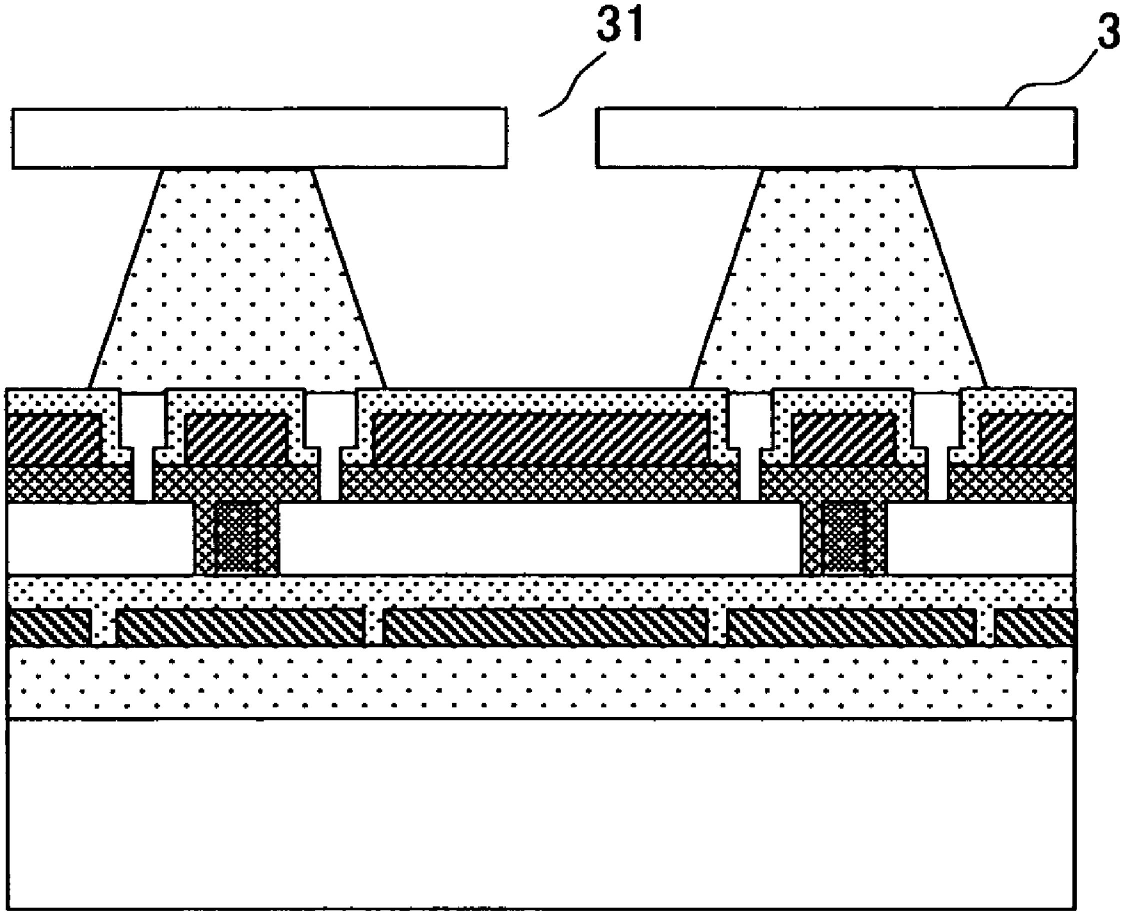

Thereafter, as shown in FIG. 24F, the inkjet head is completed by joining the nozzle forming member 30 onto of the flow passage forming member 20. As mentioned above, in the droplet discharge head including the electrostatic actuator produced by the above-mentioned manufacturing method, the distance "g" of the air gap can be defined by the thickness of the sacrifice layer 14, and, thus, the air gap is formed with sufficient accuracy with little variation. Therefore, there is also little variation in the vibration characteristic (discharge characteristic) of the vibration plate. Thus, there is little variation in the liquid injection characteristic (discharge characteristic), which achieves an inkjet head capable of performing a high quality recording. Moreover, since a large part of the actuator can be formed by a semiconductor process, a stable mass production can be achieved with sufficient yield.

Further, since the surface of the actuator forming member 10 is flat, the flow passage part (the liquid pressurizing chamber and the flow restriction part) can be formed by a photosensitive polyimide or DFR applied by a spin coating method. In such a case, although illustration is omitted, it is not necessary to prepare the fluid passage forming member separately. Moreover, in the case of the inkjet head using alkaline ink with a high pH value, it is preferable to provide a corrosion resistant resin film on the uppermost layer of the vibration plate.

As mentioned above, since the droplet discharge head according to the present embodiment comprises the nozzle forming member 10 having the nozzle for discharging droplets of liquid, the flow passage forming member 20 having the liquid pressurizing chamber connected to the nozzle, and the actuator forming member which pressurizes a liquid in the liquid pressurizing chamber, and the actuator forming member is the electrostatic actuator according to the present invention, the thus-obtained droplet discharge head has little variation in the liquid injecting characteristic and is reliable and manufactured at a low cost.

It should be noted that as a liquid injecting head, in addition to the inkjet head equipped with the electrostatic actuator according to the present invention, the electrostatic actuator head according to the present invention may be used for a droplet discharge head which discharges a liquid resist as a droplet discharge head which discharges a liquid other than ink. Additionally, the droplet discharge head according to the present invention may be used as a droplet injecting head which is equipped to a color filter manufacturing apparatus for manufacturing a color filter of a liquid crystal display. Moreover, the droplet discharge head according to the present invention may be used as a liquid injecting head which is equipped to an electrode forming apparatus for forming electrodes of an organic electro-luminescence (EL) display or a face luminescence display (FED). In this case, the electrode material such as an electrically conductive paste is injected. Further, the droplet discharge head according to the present invention may be used as a liquid injecting head which is equipped to a biochip manufacturing apparatus for manufacturing a biochip. In this case, the droplet discharge head discharges a sample of DNA, a biological organic material or the like. Further, the droplet discharge head according to the present invention is applicable to a liquid injecting head of industrial use other than the above-mentioned liquid injecting heads.

Figure 25:
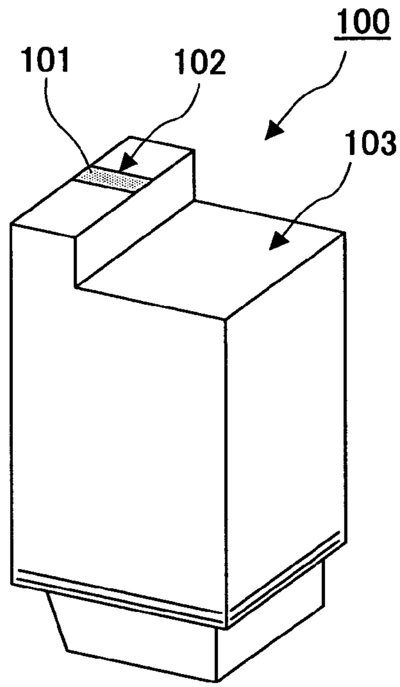
FIG. 25 is a perspective view of an ink-cartridge integrated head of the droplet discharge head according to the present invention.

Next, a description will be given, with reference to FIG. 25, of an ink-cartridge integrated head of the droplet discharge head according to the present invention.

The ink-cartridge integrated head 100 according to the present invention comprises an inkjet head 102 according to one of the above-mentioned embodiments having a nozzle hole 101 and an ink tank 103 for supplying ink to the inkjet head 101. The inkjet head 102 and the ink tank 103 are integrated with each other. Thus, if integrating the ink tank for supplying ink with the droplet discharge head according to the present invention, an ink-cartridge integrated with a reliable droplet discharge head (ink tank integrated head) having little variation in droplet discharging properties can be achieved at a low cost.

Figure 26:
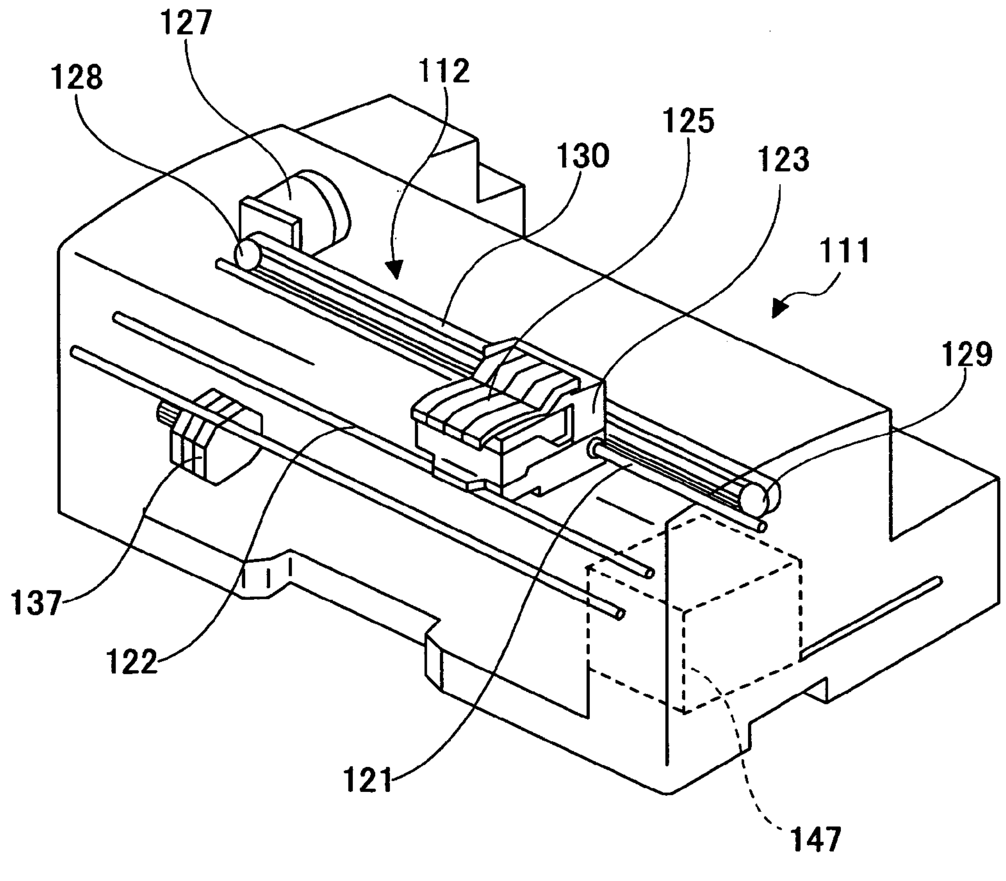
FIG. 26 is a perspective view of an inkjet recording apparatus according to the present invention.
Figure 27:
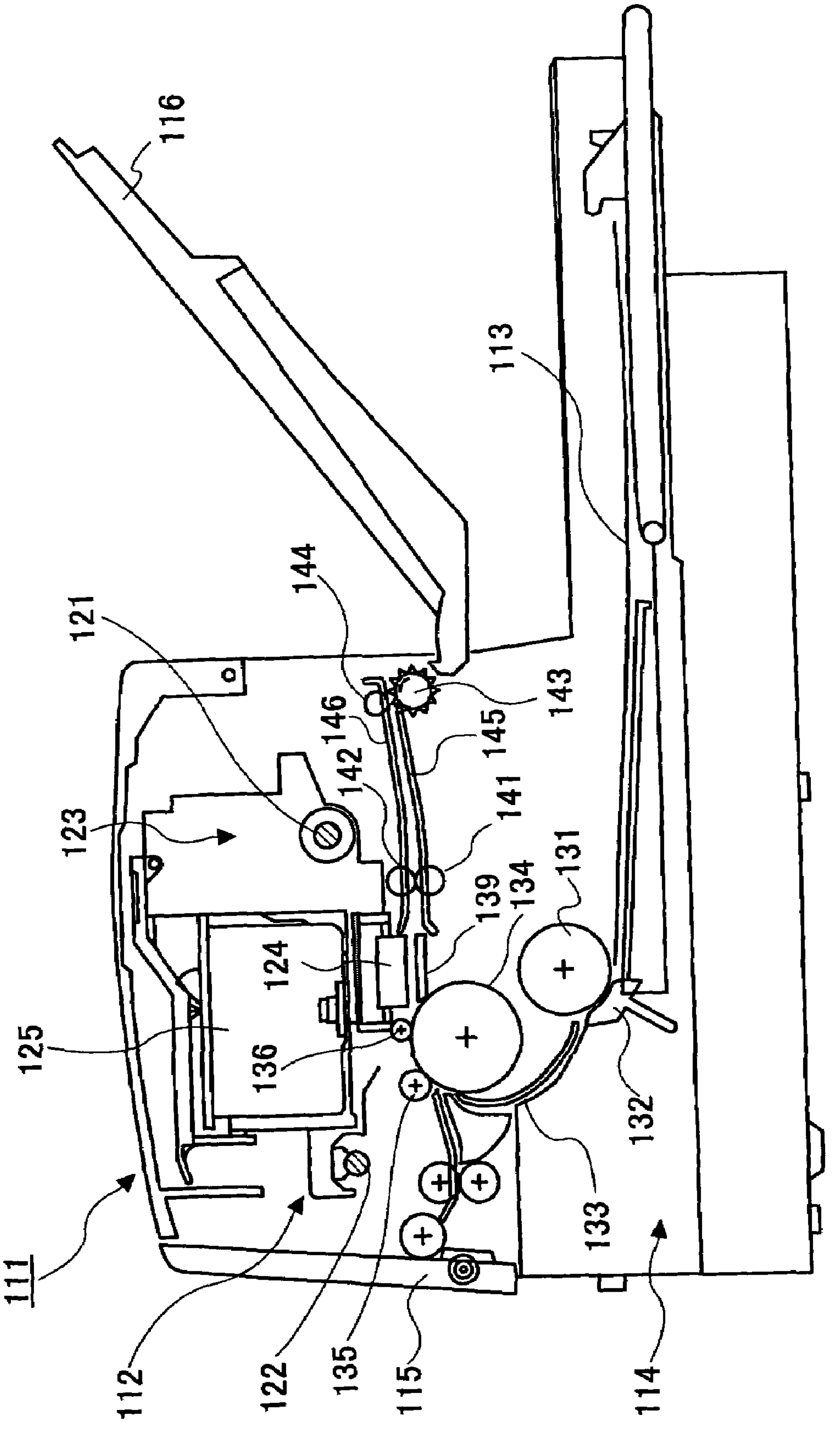
FIG. 27 is a side view of a mechanical part of the inkjet recording apparatus shown in FIG. 26.

Next, a description will be given, with reference to FIGS. 26 and 27, of an inkjet recording apparatus equipped with the inkjet head which is the droplet discharge head according to the present invention. FIG. 26 is a perspective view of the inkjet recording apparatus according to the present invention. FIG. 27 is a side view of a mechanical part of the inkjet recording apparatus shown in FIG. 26.

The inkjet recording apparatus shown in FIG. 26 has an apparatus body 111. Accommodated in the apparatus body 111 is a printing mechanism 112 comprising a carriage movable in a main scanning direction, a recording head according to the present invention mounted on the carriage, and an ink-cartridge for supplying ink to a recording head. A paper feed cassette (or a paper feed tray) 114 can be removable attached to a lower part of the apparatus body 111 so as to be freely inserted or removed from the front side. Additionally, a manual feed tray 115 is pivotally provided for manually feeding a print paper. Print papers 113 are fed from the paper feed cassette 114 or the manual feed tray 115. The print paper 113 on which a desired image is recorded by the printing mechanism 112 is ejected onto a paper eject tray 116 attached to the rear side of the apparatus body 111.

The printing mechanism part 112 has a main guide rod 121 extending between left and right side plates (not shown) and a sub guide rod. A carriage 123 is movably supported by the main guide rod 121 and the sub guide rod 122 in the main scanning direction (a direction perpendicular to the paper face of FIG. 27). A head 124 which is comprised of the inkjet head which is the droplet discharge head according to the present invention is mounted to the carriage 123. A plurality of ink discharge ports of the head 124 are aligned in a direction perpendicular to the main scanning direction so as to discharge droplets of ink of each color, yellow (Y), cyan (C), magenta (M) and black (Bk), in a downward direction. Additionally, the carriage 123 is exchangeably equipped with each ink cartridge 125 for supplying ink of each color to the head 124. It should be noted that the above-mentioned ink-cartridge according to the present invention may be equipped.

The ink-cartridge 125 is provided with an atmosphere port connected to an atmosphere on upper portion thereof and a supply port for supplying ink to the inkjet head on a lower part thereof, and a porous material filled by ink is provided inside thereof. The ink-cartridge 125 maintains the ink supplied to the inkjet head at a slightly negative pressure according to the capillary force. Although the heads 124 of each color are used as a recording head in this example, a single head h having a nozzle which discharges ink droplets of each color. The backside (a downstream side in the paper feed direction) of the carriage 123 is engaged with the main rod guide 121, and the front side (an upstream side of the paper feed direction) is slidably engaged with the sub guide rod. In order to move and scan the carriage 123 in the main scan direction, a timing belt 130 is provided between a drive pulley 128 driven by a main scan motor 127 and an idle pulley 129. The timing belt 130 is fixed to the carriage 123 so that the carriage 123 is reciprocally movable in response to normal and reverse rotations of the main scan motor 127. In order to feed the print papers 113 accommodated in the paper feed cassette 114 to a position under the heads 124, the apparatus is provided with: a feed roller 131 and a friction pad 132 that separate and feed each print paper 113 from the paper feed cassette 114; a guide member guiding each print paper 113; a convey roller 134 which reverses and conveys each print paper 113; a convey roller 135 which is pressed against the circumference surface of the convey roller 134; and an end roller 136 which defines a feed angle of each print paper 113 fed by the convey roller 134. The convey roller 134 is rotationally driven by a sub scan motor 137 via a train of gears.

Also provided is a platen member 139 which serves as a print paper guide member. The platen member 139 guides each print paper 113 fed from the convey roller 134 under the recording heads 124 in response to a moving range of the carriage 123 in the main scanning direction. On the downstream side of the platen member 139 in the paper feed direction, a convey roller 141 which is rotationally driven for feeding each print paper 113 in a paper eject direction and an idle roller 142 are provided. Further, an paper eject roller 143 and an idle roller 144 that eject each print paper onto the paper eject tray 116 are provided, and also guide members 145 and 146 are provided for defining a paper eject path.

When recording, the recording heads 124 are driven in response to image signals while moving the carriage 123. Thereby, ink is discharged toward the print paper 113 which is stopped so as to record one line, and, then, recoding of a next line is performed after feeding the print paper 113 by a predetermined distance. Upon receipt of a recording end signal or a signal which indicates that the trailing edge of the print paper 113 reaches a recording area, the recording operation is ended and the print paper 113 is ejected.

A recovery device 147 for recovering discharge failure of the heads 124 is located at a position outside the recording area on the right end side in the moving direction of the carriage 123. The recovery device 147 has a capping means, a suctioning means and a cleaning means. The carriage 123 is moved to the side of the recovery device 147 during print standby, and the heads 124 are capped by the capping means. Thereby, a discharge port part is maintained at a wet state, which prevents generation of discharge failure due to dry ink. Additionally, by discharging ink, which is not used for recording, during the recording, viscosity of ink at all discharge ports is maintained constant, thereby maintaining a stable discharge performance.

When a discharge failure occurs, the discharge ports (nozzles) of the heads 124 are sealed with the capping means. Then, air bubbles etc. are suctioned out of the discharge ports together with ink by the suctioning means. Additionally, ink and dusts adhering to the discharge port surface are removed by the cleaning means. Thereby, a discharge failure is recovered. The suctioned ink is ejected to a waste ink reservoir (not shown in the figure) and is absorbed by an ink-absorbing material in the waste ink reservoir.

Thus, since the above-mentioned inkjet head is equipped with the inkjet head which is the droplet discharge head according to the present invention, there is little variation in the discharge characteristic of ink droplet and recording of high-quality images can be achieved.

Although, in the above description, the inkjet recording apparatus equipped with the inkjet head using the electrostatic actuator according to the present invention is explained, the electrostatic actuator head according to the present invention may be used for a droplet discharge apparatus which discharges a liquid resist as a droplet. Additionally, the droplet discharge apparatus according to the present invention may be used as a liquid injecting apparatus which is used for a color filter manufacturing apparatus for manufacturing a color filter of a liquid crystal display. Moreover, the droplet discharge apparatus according to the present invention may be used as a liquid injecting apparatus for an electrode forming apparatus which forms electrodes of an organic electroluminescence (EL) display or a face luminescence display (FED). In this case, the liquid injecting apparatus injects an electrode material such as a conductive past from a droplet discharge head. Further, the droplet discharge apparatus according to the present invention may be used as a liquid injecting apparatus for a biochip manufacturing apparatus for manufacturing a biochip. In this case, the liquid injecting apparatus discharges a sample of DNA, a biological organic material or the like in the form of a droplet. Further, the liquid injecting apparatus according to the present invention is applicable to a liquid injecting apparatus of industrial use other than the above-mentioned liquid injecting apparatuses.

Figure 28:
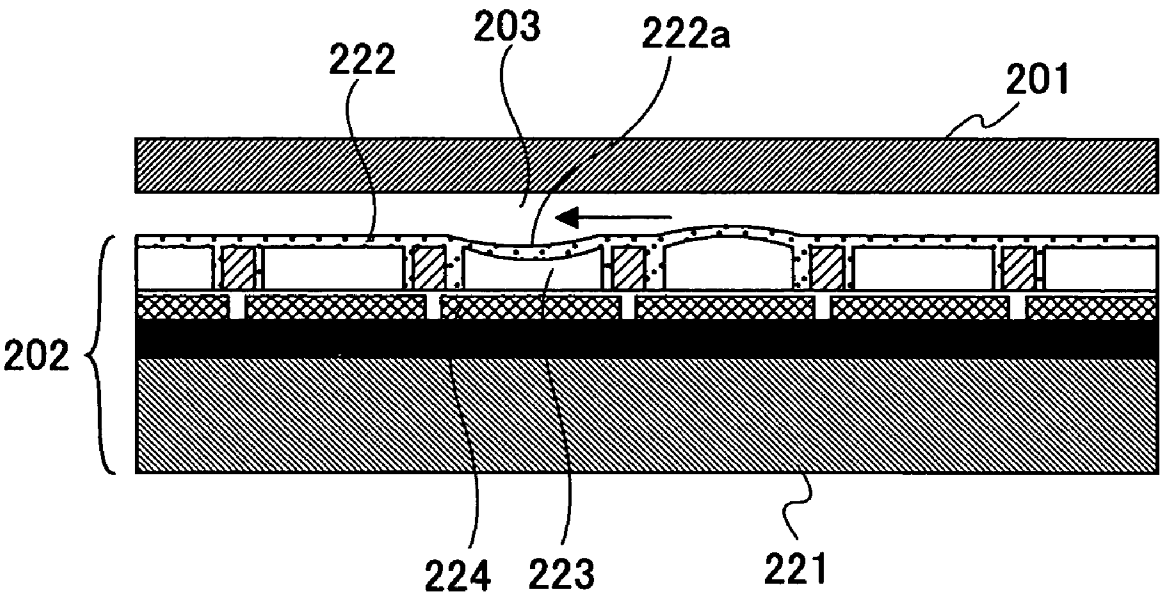
FIG. 28 is a cross-sectional view of a part of a micro pump according to the present invention.

A description will now be given, with reference to FIG. 28, of a micro pump as a micro device provided with the electrostatic actuator according to the present invention. FIG. 28 is a cross-sectional view of a part of a micro pump according to the present invention. The micro pump shown in FIG. 28 comprises a flow passage substrate 201 and an actuator substrate 202 which constitutes the electrostatic actuator according to the present invention. A flow passage 203 through which a fluid flows is formed in the flow passage substrate 201. The actuator substrate 202 comprises a vibration plate (movable plate) 222 which is deformable and forms a wall of the flow passage 203 and electrodes 224 opposite to respective deformable parts 222*a* of the vibration plate 222 with a predetermined air gap 223 therebetween. The surface of the actuator substrate 202 is formed in a substantially flat surface. The structure of the actuator substrate 202 is the same as the structure that has been explained in the embodiment of the inkjet head, and detailed descriptions thereof will be omitted.

Next, a description will be given of a principle of operation of the micro pump. Like the case of the inkjet head mentioned above, by giving a pulsed potential selectively to the electrodes 224, an electrostatic attraction force is generated between the vibration plate 222, and each deformable part 222*a* of the vibration plate 222 deforms toward the electrode 224. If the deformable parts 222*a* are driven sequentially one after another from the right side in the figure, the fluid in the flow passage flows in a direction of arrow, which enables transportation of the fluid.

In this example, the small micro pump of a low power consumption with little variation in characteristic is obtained by being equipped with the electrostatic actuator according to the present invention. It should be noted that although a plurality of deformable parts are formed in the vibration plate in this example, the number of deformable parts may be one. Moreover, in order to improve a transport efficiency, one or more valves such as, for example, check valves may be provided between the deformable parts.

Figure 29:
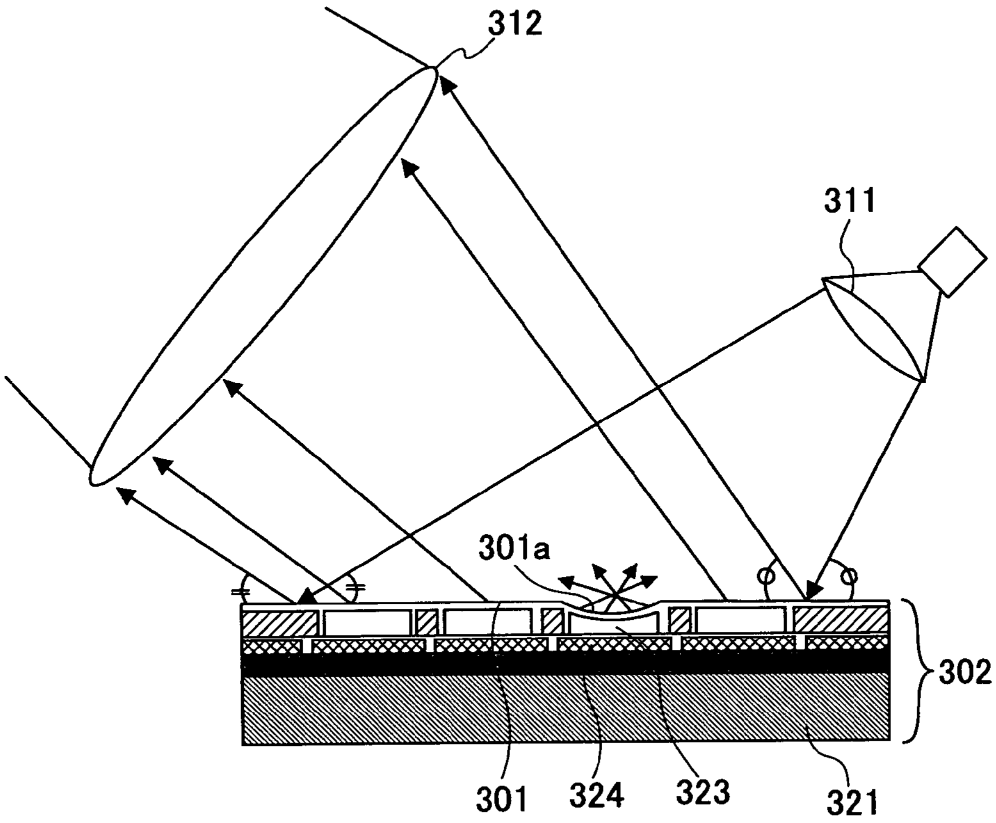
FIG. 29 is a cross-sectional view of an optical device according to the present invention.

A description will now be given, with reference to FIG. 29, of an optical device having the electrostatic actuator according to the present invention. FIG. 29 is a cross-sectional view of an optical device according to the present invention. The optical device shown in FIG. 29 comprises an actuator substrate 302 including a deformable mirror 301 having a surface capable of reflecting a light. It is preferable to form a dielectric multilayer film or a metal film on the surface of the mirror 301 so as to increase the reflectance.

The actuator substrate 302 comprises the deformable mirror 301 (corresponding to the vibration plate of the head) provided on a base substrate 321 and electrodes 324 facing respective deformable parts 301*a* of the mirror 301 with a predetermined air gap therebetween. The surface of the mirror 301 is formed in a substantially flat surface. The actuator substrate 302 has the same structure as the structure explained in the above-mentioned embodiment of the inkjet head except for the vibration plate having the mirror surface, and descriptions thereof will be omitted.

Here, the principle of the optical device is explained. Similar to the above-mentioned inkjet head, an electrostatic force is generated between the electrodes 324 and the respective deformable parts 301*a* of the mirror 301 by selectively applying the electrodes 324, and, thereby, the deformable parts 301*a* of the mirror 301 are deformed in a concave form and turn to concave mirrors. Therefore, when a light from a luminous source 310 is irradiated onto the mirror 301 through a lens 311 and the mirror 301 is not driven, light is reflected at an angle the same as the incident angle. On the other hand, when the mirror is driven, the driven deformable parts 301 turn to concave mirrors and the reflected light becomes a scattered light. Thereby, an optical modulation device is achieved.

Therefore, the small optical device of a low power consumption can be obtained with little variation in characteristic by being equipped with the electrostatic actuator according to the present invention.

Figure 30:
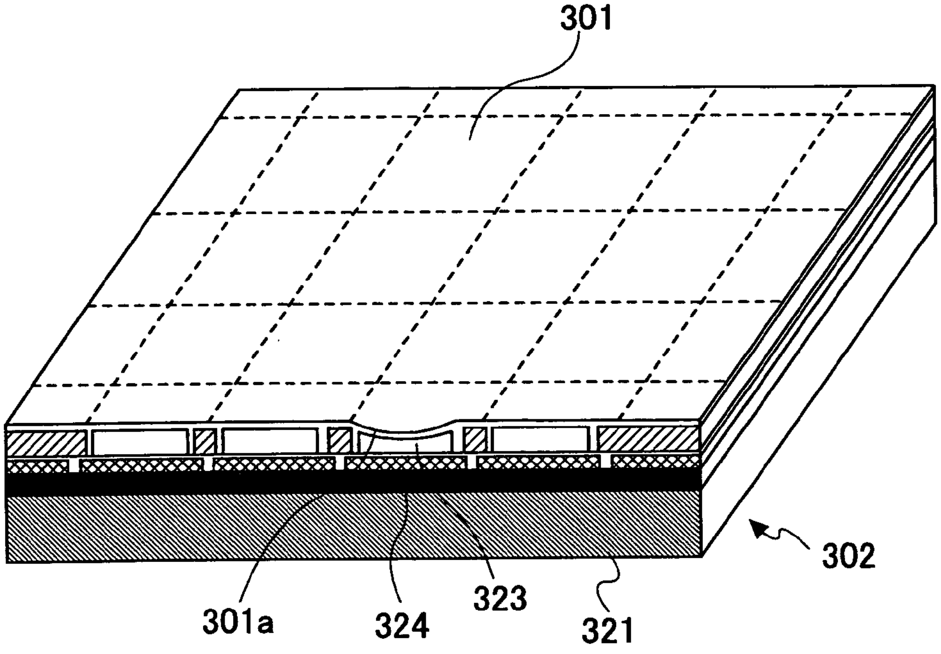
FIG. 30 is a perspective view of the optical apparatus according the present invention.

A description will be given, with reference to FIG. 30, of an application of the optical device. In the example shown in FIG. 30, a plurality of deformable parts 301 mentioned above are two-dimensionally arranged, and each of the deformable parts 301*a* is driven independently. It should be noted that although a 4×4 arrangement is shown, arranging more than this is also possible.

Therefore, like the structure shown in FIG. 29 mentioned above, a light from a luminous source 310 is irradiated onto the mirror 301 through a lens 311, and a part of the light incident on a part of the mirror 301 not driven is incident on a projection lens 312. On the other hand, a part of the mirror 301 where the deformable parts 301*a* are deformed by applying a voltage to the respective electrodes 324 is changed to a concave mirror, a part of the light is scattered and hardly incident on the projection lens 312. The light incident on the projection lens is projected onto a screen (not shown in the figure), and, thus, an image is displayed on the screen.

It should be noted that, in addition to the above-mentioned micro pump and optical device (optical modulation device), the electrostatic actuator according to the present invention is applicable to an actuator (optical switch) of a multi optical lens, a micro flow meter, a pressure sensor, etc.

The present invention is not limited to the specifically disclosed embodiments, and variations and modifications may be made without departing from the scope of the present invention.

The invention claimed is:

1. An electrostatic actuator comprising:

a substrate;

an electrode formed on said substrate;

a plurality of partition parts formed on said electrode;

a vibration plate formed on said partition parts, said vibration plate being deformable by an electrostatic force generated by a voltage applied to said electrode; and an air gap formed between said plurality of partition parts by etching a part of a sacrifice layer formed between said electrode and said vibration plate, wherein said partition parts comprise remaining parts of said sacrifice layer after said etching, wherein said sacrifice layer is formed of a conductive material, and said remaining parts of said sacrifice layer are electrically connected to one of said substrate, a dummy electrode and said vibration plate so that said remaining parts are at the same potential with said one of said substrate, said dummy electrode and said vibration plate.

2. The electrostatic actuator as claimed in claim 1, wherein said substrate is a silicon substrate.

3. The electrostatic actuator as claimed in claim 1, further comprising dummy electrodes at positions corresponding to said partition parts, said dummy electrodes being electrically separated from said electrode by separation grooves.

4. The electrostatic actuator as claimed in claim 3, wherein an insulating layer is formed on said electrode, and said separation grooves are filled with the insulating layer.

5. The electrostatic actuator as claimed in claim 4, wherein a thickness of said insulating layer is equal to or greater than one half of a width of each of said separation grooves.

6. The electrostatic actuator as claimed in claim 3, wherein said sacrifice layer is formed of a conductive material, and at least one of said remaining parts of said sacrifice layer and said dummy electrodes serve as a part of electric wiring.

7. The electrostatic actuator as claimed in claim 1, wherein said sacrifice layer is formed of a material selected from a group consisting of polysilicon, amorphous silicon, silicon oxide, aluminum, titanium nitride and polymer.

8. The electrostatic actuator as claimed in claim 1, wherein said electrode is formed of a material selected from a group consisting of polysilicon, aluminum, titanium, titanium nitride, titanium silicide, tungsten, tungsten silicide, molybdenum, molybdenum silicide and ITO.

9. The electrostatic actuator as claimed in claim 1, wherein said sacrifice layer is divided by separation grooves, and an insulating layer is formed on said sacrifice layer so that said separation grooves are filled with said insulating layer.

10. The electrostatic actuator as claimed in claim 9, wherein a thickness of said insulating layer is equal to or greater than one half of a width of each of said separation grooves.

11. The electrostatic actuator as claimed in claim 1, further comprising insulating layers on said electrode and a surface of said vibration plate facing said electrode, wherein said sacrificing layer is formed of one of polysilicon and amorphous silicon, and said insulating layers are formed of silicon oxide.

12. The electrostatic actuator as claimed in claim 1, wherein said sacrificing layer is formed of silicon oxide and said electrode is formed of polysilicon.

13. The electrostatic actuator as claimed in claim 1, wherein a through hole is formed in said vibration plate for removing by etching the parts of said sacrifice layer through said through hole so as to form said air gap.

14. The electrostatic actuator as claimed in claim 13, wherein said through hole is located near said partition parts.

15. The electrostatic actuator as claimed in claim 13, wherein a plurality of said through holes are arranged along a longer side of said vibration plate at an interval equal to or less than a length of the shorter side of said vibration plate.

16. The electrostatic actuator as claimed in claim 13, further comprising a member joined to an upper surface of said vibration plate, wherein said through hole is sealed by a joining surface of said member.

17. The electrostatic actuator as claimed in claim 1, wherein said vibration plate has substantially a rectangular shape, and a shorter side of said vibration plate is equal to or less than 150 .mu.m.

18. The electrostatic actuator as claimed in claim 1, wherein a distance of said air gap measured in a direction perpendicular to a surface of said electrode facing said vibration plate is substantially 0.2 .mu.m to 2.0 .mu.m.

19. The electrostatic actuator as claimed in claim 1, further comprising an insulating layer formed on a surface of said vibration plate facing said electrode, wherein a thickness of said insulating layer near a center between said partition parts adjacent to each other is larger than a thickness of said insulating layer near said partition parts.

20. The electrostatic actuator as claimed in claim 1, further comprising an insulating layer formed on said electrode, wherein a thickness of said insulating layer near a center between said partition parts adjacent to each other is larger than a thickness of said insulating layer near said partition parts.

21. An electrostatic actuator comprising:

a substrate;

an electrode formed on said substrate;

a plurality of partition parts formed on said electrode;

a vibration plate formed on said partition parts, said vibration plate being deformable by an electrostatic force generated by a voltage applied to said electrode;

an air gap formed between said plurality of partition parts by etching a part of a sacrifice layer formed between said electrode and said vibration plate, wherein said partition parts comprise remaining parts of said sacrifice layer after said etching; and a through hole formed in said vibration plate for removing the parts of said sacrifice layer through said through hole so as to form said air gap; and a resin film formed on a surface opposite to a surface facing said electrode, wherein said through hole is sealed by said resin film of said member.

22. The electrostatic actuator as claimed in claim 21, wherein a cross-sectional area of said through hole is substantially equal to or greater than 0.19 .mu.m.sup.2 and equal to or less than 10 .mu.m.sup.2.

23. The electrostatic actuator as claimed in claim 21, wherein a thickness of an insulating layer in a periphery of an opening of said through hole is substantially equal to or greater than 0.1 .mu.m.

24. The electrostatic actuator as claimed in claim 21, wherein said resin film has a corrosion resistance with respect to a substance to be brought into contact with said vibration plate.

25. The electrostatic actuator as claimed in claim 21, wherein said resin film is formed of one of a polybenzaoxazole film and a polyimide film.

26. An electrostatic actuator comprising:

a substrate;

an electrode formed on said substrate;

a plurality of partition parts formed on said electrode;

a vibration plate formed on said partition parts, said vibration plate being deformable by an electrostatic force generated by a voltage applied to said electrode; and an air gap formed between said plurality of partition parts by etching a part of a sacrifice layer formed between said electrode and said vibration plate, wherein said partition parts comprise remaining parts of said sacrifice layer after said etching, wherein a cavity is formed between electrode and said substrate, and said electrode has a connection through hole connecting said cavity to said air gap.

27. The electrostatic actuator as claimed in claim 26, further comprising insulating layers on both sides of said electrode, wherein a total thickness of said electrode and said insulating layers exceeds a thickness of said vibration plate.

* * * * *